(12) United States Patent
McLaughlin, Jr.

(10) Patent No.: US 7,206,805 B1
(45) Date of Patent: Apr. 17, 2007

(54) ASYNCHRONOUS TRANSCRIPTION OBJECT MANAGEMENT SYSTEM

(75) Inventor: Michael James McLaughlin, Jr., Colorado Springs, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1036 days.

(21) Appl. No.: 09/715,955

(22) Filed: Nov. 17, 2000

Related U.S. Application Data

(63) Continuation of application No. 09/658,658, filed on Sep. 8, 2000.

(60) Provisional application No. 60/153,464, filed on Sep. 9, 1999.

(51) Int. Cl.
*G06F 15/16* (2006.01)

(52) U.S. Cl. ........................ 709/203; 707/10; 707/202; 718/101

(58) Field of Classification Search ................ 709/238, 709/235, 201, 203; 707/10, 103, 202; 714/4, 714/15; 718/101
See application file for complete search history.

(56) References Cited

U.S. PATENT DOCUMENTS

| | | | |
|---|---|---|---|
| 5,546,582 A * | 8/1996 | Brockmeyer et al. ........ | 709/201 |
| 5,613,060 A * | 3/1997 | Britton et al. ................ | 714/15 |
| 5,799,305 A * | 8/1998 | Bortvedt et al. .............. | 707/10 |
| 5,835,757 A * | 11/1998 | Oulid-Aissa et al. ......... | 707/10 |

(Continued)

OTHER PUBLICATIONS

Jim Gray and Andreas Reuter, "Transaction Processing, Concepts and Techniques", 1993, Morgan Kaufmann Publisher, Inc.; ISBN: 1-55860-190-2; pp. 16, 34-39, 59, 60, 383-385, 562-573, 592-598, 638-651.*

(Continued)

*Primary Examiner*—John Follansbee
*Assistant Examiner*—Dustin Nguyen

(57) ABSTRACT

Described herein is a system for executing distributed transactions. A coordinator and one or more participants cooperate to execute a distributed transaction, the distributed transaction including for each participant a transaction executed by the participant. To manage the transaction, the coordinator and the participant communicate over a network using, for example, a stateless protocol. Before each participant commits the transaction, the participants determine that the coordinator has committed the transaction. The coordinator commits the transaction after receiving acknowledgment from all the participants that they will commit the transaction. To determine whether the coordinator has committed the transaction, a participant transmits a message to the coordinator to acknowledge that it will commit the distributed transaction. The participant commits its respective transaction if it receives an acknowledgement from the coordinator. For the particular transaction being executed by a participant, the participant prevents other transactions from modifying a data item affected by the particular transaction. The participant will prevent such modifications until termination criteria for the particular transaction is satisfied, in which case the participant terminates the transaction.

28 Claims, 32 Drawing Sheets

Coordinator

Participants

Orthogonal State Transitions 2500

U.S. PATENT DOCUMENTS

| | | | |
|---|---|---|---|
| 5,884,327 A * | 3/1999 | Cotner et al. | 707/202 |
| 6,012,094 A * | 1/2000 | Leymann et al. | 709/230 |
| 6,154,849 A | 11/2000 | Xia | |
| 6,170,017 B1 * | 1/2001 | Dias et al. | 709/235 |
| 6,209,038 B1 * | 3/2001 | Bowen et al. | 709/238 |
| 6,216,126 B1 * | 4/2001 | Ronstrom | 707/10 |
| 6,247,023 B1 * | 6/2001 | Hsiao et al. | 707/202 |
| 6,286,046 B1 | 9/2001 | Bryant | |
| 6,338,146 B1 * | 1/2002 | Johnson et al. | 714/4 |
| 6,401,080 B1 | 6/2002 | Bigus et al. | |
| 6,411,998 B1 | 6/2002 | Bryant et al. | |
| 6,442,552 B1 * | 8/2002 | Frolund et al. | 707/10 |
| 6,449,739 B1 | 9/2002 | Landan | |
| 6,529,932 B1 * | 3/2003 | Dadiomov et al. | 718/101 |
| 6,671,686 B2 * | 12/2003 | Pardon et al. | 707/8 |
| 6,678,696 B1 * | 1/2004 | Helland et al. | 707/103 R |

OTHER PUBLICATIONS

Puneet Sharma, et al., "Scalable Timers for Soft State Protocols," INFOCOM '97, IEEE, 1997, pp. 222-229.

* cited by examiner

*Fig. 1 - The client-server model  PRIOR ART*

Ack [ S | F ] = Acknowledgement [ Success | Failure ]
Rollback Ack [ S | F ] = Rollback Acknowledgement [ Success ]
Ack RPC [ S | F ] = Acknowledgement RPC [ Success | Failure ]
Send [ E | R ] = Send [ Execute | Rollback ]
Send [ R ] = Send [ Rollback ]
Send RPC [ E | R ] = Send RPC [ Execute | Rollback ]

Ack [ S | F ] = Acknowledgement [ Success | Failure ]
Ack RPC [ S | F ] = Acknowledgement RPC [ Success | Failure ]
Send [ E | R ] = Send [ Execute | Rollback ]
Send RPC [ E | R ] = Send RPC [ Execute | Rollback ]

CORBA IIOP architecture 800

Comparison of Computing Styles 1200

|  | Batch Processing | Time-Sharing Processing | Realtime Processing | Client-Server | Transaction-Oriented Processing |
|---|---|---|---|---|---|
| Data | Private | Private | Private | Shared | Shared |
| Duration | Long | Long | Very Short | Long | Short |
| Guarantees of Reliability | Normal | Normal | Very High | Normal | Very High |
| Guarantees of Consistency | None | None | None | None (?) | ACID |
| Work Pattern | Regular | Regular | Random | Random | Random |
| Number of Work Sources or Destinations | 10 | 100 | 1000 | 100 | 10000 |
| Services Provided | Virtual Processor | Virtual Processor | Simple Function | Simple Request | Simple or Complex Request |
| Performance Criteria | Throughput | Response Time | Response Time | Throughput & Response Time | Throughput & Response Time |
| Availability | Normal | Normal | High | High | High |
| Unit of Authorization | Job | User | None(?) | Request | Request |

*Fig. 12 PRIOR ART*

Initial_Transaction Procedure Definition 1910

```
METHOD
------
MEMBER PROCEDURE INITIAL_TRANSACTION
Argument Name                       Type                       In/Out
----------------------------        -----------------------    -------
TRANSACTION_ID                      NUMBER                     IN
TRANSACTION_PARENT_ID               NUMBER                     IN
TRANSACTION_SOURCE                  VARCHAR2                   IN
TRANSACTION_DESTINATION             DESTINATION                IN
TRANSACTION_TIME_STAMP              DATE                       IN
TRANSACTION_QUANTUM                 NUMBER                     IN
TRANSACTION_TYPE                    VARCHAR2                   IN
TRANSACTION_STATUS                  VARCHAR2                   IN/OUT
TRANSACTION_NAME                    VARCHAR2                   IN
DML_ACTION                          VARCHAR2                   IN
DML_ATTRIBUTES                      ATTRIBUTE                  IN
OBJ_NAME                            VARCHAR2                   IN
OBJ_ATTRIBUTES                      ATTRIBUTE                  IN
WHERE_CLAUSE                        ATTRIBUTE                  IN
```

*Fig. 19*

Initial_Transaction Procedure Definition 2110

```
METHOD
------
MEMBER PROCEDURE INITIAL_TRANSACTION
Argument Name                    Type                      In/Out
-----------------------------    ----------------------    ------
TRANSACTION_ID                   NUMBER                    IN
TRANSACTION_STATUS               VARCHAR2                  IN/OUT
TRANSACTION_SOURCE               VARCHAR2                  IN
TRANSACTION_DETAIL               TRANSACTION               IN
```

*Fig. 21*

Transaction Object Definition 2210

```
OBJECT TYPE (TRANSACTION)
-------------------------
Argument Name                    Type                     In/Out
------------------------------   ----------------------   ------
TRANSACTION_ID                   NUMBER                   IN
TRANSACTION_PARENT_ID            NUMBER                   IN
TRANSACTION_SOURCE               VARCHAR2                 IN
TRANSACTION_DESTINATION          DESTINATION              IN
TRANSACTION_TIME_STAMP           DATE                     IN
TRANSACTION_QUANTUM              NUMBER                   IN
TRANSACTION_TYPE                 VARCHAR2                 IN
TRANSACTION_STATUS               VARCHAR2                 IN/OUT
TRANSACTION_NAME                 VARCHAR2                 IN
DML_ACTION                       VARCHAR2                 IN
DML_ATTRIBUTES                   ATTRIBUTE                IN
OBJ_NAME                         VARCHAR2                 IN
OBJ_ATTRIBUTES                   ATTRIBUTE                IN
WHERE_CLAUSE                     ATTRIBUTE                IN
```

*Fig. 22*

CORBA Transaction-Messaging Matrix 2310

| Number of Components Involved ||| Number of Messages ||||
|---|---|---|---|---|---|---|
| Web Browser | Web Server | Application Server | Initial | Ready | Commit | Total Messages |
| 1 | 1 | 1 | 23 | 23 | 23 | 69 |
| 1 | 1 | 2 | 34 | 34 | 34 | 102 |
| 1 | 1 | 3 | 45 | 45 | 45 | 135 |
| 1 | 1 | 4 | 56 | 56 | 56 | 168 |
| 1 | 1 | 5 | 67 | 67 | 67 | 201 |

Orthogonal State Transitions 2510

Coordinator          Participants

Orthogonal State Transitions 2520

Coordinator　　　　　　　　　　Participants

*Asynchronous Transaction Object Management System Architecture Diagram 2600*

Asynchronous Transaction Object Management
System operating system architecture 2750

Asynchronous Transaction Object Management
System operating system architecture 2700

Chart 2901 Statistical Process Control Methods – p-chart

ASYNCHRONOUS TRANSCRIPTION OBJECT MANAGEMENT SYSTEM

RELATED APPLICATIONS

This application claims benefit of priority of the following applications:

This application is a continuation of U.S. application Ser. No. 09/658,658, entitled "Monitoring Latency of a Network To Manage Termination of Distributed Transactions", filed by Michael James McLaughlin Jr. on Sep. 8, 2000, the contents of which are herein incorporated by reference, and which claims benefit of priority of the following application; and U.S. Provisional Application 60/153,464, entitled "ACID Compliant Transaction and Distributed Transaction Architecture Across HTTP and Active Simulation to Optimize Transaction Quantums Across HTTP", filed by Michael James McLaughlin Jr. on Sep. 9, 1999, the contents of which are herein incorporated by reference.

FIELD OF THE INVENTION

The present invention relates to execution of distributed transactions, and in particular, executing a distributed transaction over a network in a manner that is ACID compliant.

BACKGROUND OF THE INVENTION

Application 3-Tier Architectures

The nature of application architecture is important to understanding the efficacy of computing solutions in any software-engineering domain because selecting system architecture imposes operating constraints on a software problem. For example, a two-tier, or client-server, solution requires a means for client computers to communicate to a server computer [1] and the communication means is typically a network—physical network interface cards, a communication protocol like TCP/IP and networking software like Novell NetWare or Windows NT [2]. Likewise, there are numerous design issues linked to implementing client-server architectures.

FIG. 1 is a block diagram that depicts a classic client-server model. Initial client-server computing solutions were two-tier architectures. Clients, such as client 101, share computing resources with a lone server 102 connected across a network 104.

The term client-server computing invokes an image of shared processing similar to a limited scope multiple-computer distributed processing model [3]. However, while client-server computing in a computer science vein connotes shared processing between client- and server-tier computers (two-tier computing architecture), industry interprets client-server computing as a spectrum of computing solutions [5]. For example, the classic client-server or two-tier architecture described above is one possibility in a spectrum that spans solutions from a file archival process to complex computing architecture, which can be defined as follows:

1. File Archival Process—a client-server solution where the only shared processing is when a document or replicated file is physically stored on a file server across a network or by removable storage media [1] [4].
2. Complex Computing Architecture—a client-server solution where computing is shared between different computers that (a) may or may not have multiple computer processing tiers; (b) may or may not maintain a global state; or (c) may or may not enforce processing through algorithmic optimization [5].

In the former case, client-server computing is a poor moniker for the model whereas two-tier computing is a more accurate description—one tier to process the data and another to store the data [5]. Two-tier architecture is a better description because it does not carry the computer science expectation that the file storage process described above will be across a network [4] but requires the method of shared computing to be qualified during design between one or more clients and a server. In the complex computing architecture case, client-server computing is a convenient moniker but an inaccurate means of describing a computing architecture. While two-tier architecture can generally describe (1) a classic client-server model with a client- and server-tier or (2) a manual business process with a client and repository-tier employing an intermediary removable storage device, two-tier architecture actually only defines an attribute of a computing architecture. However, labeling the number of tiers in a computing architecture does qualify an important direct measurement attribute of a computing architecture entity [6]. FIG. 2 is a block diagram that depicts a two-tier architecture, where processing is shared between one or more clients 201 and a server 202 across a network 204, expanding on the client-server model.

In two-tier application architecture, the client interface is typically stored on the client computer and the application program and file system or database is stored on the server computer. A variation on two-tier application architecture exists when the client uses a network browser (e.g., Netscape Navigator or Microsoft Internet Explorer) to access the application on the server computer. In a browser scenario, a copy of the application components from the server computer is copied to the client computer and then executed from within the browser [7]. However, two-tier computing can impose severe limits on the server's computational resources when both the application and the file system or database are co-located. Separating the application and database components to different physical devices can ameliorate an application server's computing resource limits [8]. When the application and database components are separated the architecture moves from a two-tier to three-tier architecture—client, application and database server. FIG. 3 is a block diagram that depicts a three-tier architecture where processing is shared between one or more clients 301, one or more application servers 309 (middle-tier servers) and a database server 310 across a network 304, expanding on the two-tier architecture.

Transaction Processing Concepts

In order to understand what transaction processing concepts are, it is helpful to first understand what a transaction is. A transaction is as a collection of operations on the physical and abstract application state [9]. For example, if a system begins with an object state of "$X_0$" and event "A" changes the object state, the new data state is "$X_1$," and the difference between "$X_0$" and "$X_1$" is the collection of operations effected by event "A." A transaction processing system typically includes application generators, operations tools, one or more database systems, utilities and networking sockets [8] [9]. The acronym for Transaction Processing Systems is TP Systems; however, historically TP Systems were Tele-Processing systems and not transaction processing systems. Early transaction processing systems evolved from teleprocessing systems and hence the acronym can have duality of meaning. The term TP system is used herein to refer to a transaction processing system.

Transactions are a collection of operations that act on an object state and possess ACID transaction properties—Atomicity, Consistency, Isolation and Durability [9]. A corollary to the concept of transaction processing is contract law. For example, if nothing goes wrong in a commercial transaction like refinancing a home mortgage through a broker, then the contract between buyer and broker was no more than overhead. However, if something goes wrong during the transaction, then the contract arbitrates the dispute or nullifies itself. The ACID transaction properties are necessary to ensure that each computer transaction can be efficaciously arbitrated by algorithm and reversed in the event of an error during the transaction process. The ACID transaction properties are primarily concerned with achieving the concurrency transparency goal of a distributed transaction. The ACID transaction properties are defined as noted below [10]:

1. Atomicity: Either all of the operations in a transaction are performed or none of them are, in spite of failures.
2. Consistency: The execution of interleaved transactions is equivalent to a serial execution of the transactions in some order.
3. Isolation: Partial results of an incomplete transaction are not visible to others before the transaction is successfully committed.
4. Durability: The system guarantees that the results of a committed transaction will be made permanent even if a failure occurs after the commitment.

Flat transactions with or without savepoints, chained transactions, nested transactions, multilevel transactions and long-lived transactions are the principal transaction types [11]. A flat transaction is the simplest type of transaction and the basic building block for organizing an application into atomic actions. When a transaction exists in one layer of control and everything within that layer of control either succeeds or fails together, then the transaction is a flat transaction. The all or nothing characteristic of flat transactions poses a major processing restriction because there is no way to commit or abort parts of a flat transaction. However, if a flat transaction includes one or more savepoints then all work up to the last successfully completed savepoint can succeed even when the transaction fails [21]. Chained transactions are a variation on the theme of flat transactions with savepoints. However, chained transactions are different because their purpose is to ensure that any open Standard Query Language (SQL) cursors remain open after a transaction is committed while processing subsequent transactions (e.g., standard ANSI SQL closes all open SQL cursors when other than a chained transaction is committed) [11]. A nested transaction is a complex transaction type [31]. For example, a nested transaction is a hierarchy of transactions and the root of the transaction hierarchy tree is called the top-level transaction. All subordinates of the top-level transaction are called subtransactions and a transaction's predecessor in the tree is called a parent while a subtransaction at the next lower level is called a child. If an error occurs in a nested transaction at any subtransaction level then all components within the top-level transaction fail and if they have completed prior to the failure are rolled back to their prior object states.

Multilevel transactions are a generalized and more liberal type of nested transaction and allow for the early commit of a subtransaction (also called a pre-commit). Multilevel transactions forego the unilateral rollback of subtransactions and depend on a compensating transaction to explicitly roll back committed transaction states outside of the top-level transaction. Multilevel transactions rely on a homogeneous environment and have a dependency that no object state can be modified before a compensating transaction can effect a lock to roll back the multilevel transaction object state changes. A homogeneous environment is an environment in which participating servers and databases within the scope of transaction processing are part of a distributed system that is administered by an administrative authority. An administrative authority is a process responsible for determining whether transactions executing on a system may be committed or should be aborted. Long-lived transactions are transactions that require simultaneous update of many object states and cannot maintain ACID properties in any of the other transaction models described.

Transaction processing outside of the homogeneous environment may act in a more complex transaction arena, like a heterogeneous environment where transaction processing occurs as a compound multilevel transaction. A heterogeneous environment is an environment in which transaction processing is distributed across multiple systems (e.g., where individual systems may be single or distributed servers) that are each administered by a separate administrative authority. A complex compound transaction has two or more nested or multilevel transactions managed by a Transaction Processing (TP) monitor [14] [15] across a heterogeneous environment, where the two or more nested or multilevel transactions include at least one transaction administered by one administrative authority and another transaction administered by another administrative authority. A CORBA compliant Internet application [7] is an example of complex compound transaction. Complex compound transactions include a TP monitor component that is part of a transaction processing function across a heterogeneous environment [14] and that encapsulates the implementation detail of whether the transaction is a nested or multilevel transaction type.

A definition of nesting and multilevel structure is helpful to a discussion of multilevel transaction structure and can be paraphrased into five attributes using Moss' seminal work on nested transactions and reliable computing [13] as follows:

1. Nested transactions are trees of transactions and the sub-trees are composed of either nested or flat transactions.
2. Transactions at the leaf level are flat transactions and the distance from the root to the leaves can be different for various parts of the same tree.
3. Transactions have a root-level transaction at the top of the transaction hierarchy tree. The root-level transaction is the top-level transaction while all nested transactions are called subtransactions. A subtransaction predecessor is a parent transaction and an antecedent's subtransaction is a child transaction.
4. Subtransactions can either commit or rollback. The subtransaction commit will not take effect unless (a) the subtransaction parent transaction and parent transaction antecedents commit and (b) all sibling transactions within the transaction, or below the root-level transaction, commit.
5. Rollback of transactions anywhere in the tree causes all subtransactions to rollback.

Nested and multilevel transactions share the first three attributes noted above, however, multilevel transactions are a more generalized form of nested transactions and do not share attributes four and five. The difference between nested and multilevel transactions is that multilevel transactions allow for the early commit of a subtransaction (also called a pre-commit). The multilevel transaction thereby eliminates the possibility of a unilateral rollback of the update [11] because a multilevel subtransaction commit relies on a compensating transaction to explicitly roll back the committed subtransaction states. The compensating transaction may exist at any level in the hierarchical transaction tree and be implemented by various event trigger strategies [11]. For example, multilevel transactions may compromise the ACID property of isolation with the occurrence of any of the following [11]:

1. A subtransaction commit has been executed.
2. The multilevel transaction experiences an abnormal termination that nullifies the compensating transaction within the context of the top-level transaction.
3. The multilevel transaction local object-state becomes a global object-state.

If another concurrent process establishes a lock on the failed multilevel transaction object-state before the compensating transaction locks the object-state for exclusive update, then the multilevel transaction recovery process will fail [11]. FIG. 4 is a state diagram that depicts multilevel transaction 400 and highlights the fail points, or the abort rollback success events, which can compromise the isolation property of ACID compliant transactions. For example, the diagram depicts a top-level transaction (TL), two child transactions (A and B) of the top-level transaction, two pairs of subtransactions (A1 and A2) and (B1 and B2) and two compensating transactions (C1 and C2). The child transactions (A and B) of the top-level transaction do not execute subtransaction commits but spawn concurrent child transactions (e.g., the leaf transactions A1, A2, B1 and B2) that provide success acknowledgement to their respective parents after completing their respective subtransaction commits. If failure occurs within multilevel transaction 400 and no option to retry the transaction is available, then detection of failure is acknowledged to the top-most transaction which sends a message to abort rollback success (e.g., in the diagram this is a Send [R] message event). The transaction maintains its thread of control until receiving acknowledgement from both containment transactions that all leaf transaction pre-commits, or subtransaction commits, are successfully rolled back to their original object-state. In multilevel transaction 400 fail points are the containment transactions (C1 and C2). If an abnormal event terminates the process, or top-level transaction, before the containment transactions reverse the subtransaction commits then the isolation property of ACID compliant transactions is violated [11].

Having discussed nested and multilevel transactions in a homogeneous environment, the dynamics of complex compound transactions (e.g., compound multilevel or nested transactions) are examined. A complex compound transaction operates across a heterogeneous environment and requires transaction process management, typically in the form of a transaction processing (TP) monitor [14] [15]. There are two differences between a complex compound transaction and a multilevel or nested transaction executed in a homogeneous environment. First, a complex compound transaction's top-level transaction acts as a remote controller (RC) transaction service and each branch of the multilevel transaction hierarchy tree has a root-level, or top-level, transaction equivalent to the top-level transaction depicted in FIG. 4. Second, a complex compound transaction is a distributed transaction across multiple systems (e.g., where individual systems may be single or distributed servers) that are administered by more than one administrative authority.

FIG. 5 is a state diagram that depicts compound multilevel Transaction 500. The distribution of a compound multilevel transaction adds a layer of complexity through the remote controller (RC) level transaction and remote procedure call (RPC) functionality. Further, the compound multilevel transaction weakens the likelihood of ACID compliant isolation because the containment transaction is now more likely to experience an abnormal termination of the RPC connection between the remote controller transaction service (RC) and the discrete top-level (TL) transactions of participating heterogeneous systems. Thus a compound multilevel transaction type may not guarantee an ACID compliant transaction across a heterogeneous environment because the containment transaction architecture cannot adequately vouchsafe the ACID atomicity and isolation properties of a compound multilevel transaction using conventional techniques.

Substituting a compound nested transaction type for a compound multilevel transaction type (1) eliminates the subtransaction commit process and containment transaction and (2) vouchsafes an all or nothing commit for the distributed transaction components [11]. A compound nested transaction is the distributed transaction model contained in the X/Open Distributed Transaction Protocol (DTP) reference model [16] [17] and a standard adopted by most commercial distributed databases [18] [19]. FIG. 6 is a state diagram that depicts compound nested transaction 600. The state diagram of a compound nested transaction 600 by comparison to compound multilevel transaction 500 is more simple and robust as a transaction architecture. For example, the compound nested transaction 600 is more capable of sustaining the ACID isolation property in complex compound transactions across heterogeneous environments especially when scalability is factored in to an evaluation [18]. Further discussion of the X/Open DTP reference model and compound nested transactions [17] will be addressed later in this paper.

Having lain a foundation of transaction types in a homogeneous and heterogeneous environment and having discussed the merits of compound nested and multilevel transaction types, the major transaction processing and transaction processing or management components in the context of a transaction processing (TP) monitor will be discussed [14] [15]. There are eight principal transaction processing or management components in TP monitors [14]. The eight TP monitor components are noted below with brief descriptions of the services that they provide to transaction processing management. The relationship between the TP monitor components is depicted in Gray's Flow Through TP monitor flow depicted by FIG. 7; however, the load balancing and repository management components are not depicted in the diagram.

1. A presentation service 710 defines interfaces between the application program and the devices that are connected to the presentation service.
2. Queue management supports the queuing of submitted transactions.
3. Server management 714 ensures that connections have servers available and is principally engaged in (a) creating processes and queues, (b) loading the application code into memory space, (c) determining process privileges, (d) domain switches and coordination with the load balancing component.
4. Request scheduling locates services, polls the availability of service and invokes the load-balancing component if new servers are required.

5. Request authorization 716 validates and grants security rights and privileges.
6. Load balancing is responsible for maintaining servers to support the number of connections submitted to the presentation service and managing transaction loads by queuing transaction requests while spawning additional servers or when all server resources are in use.
7. Context management stores transaction processing context that spans transaction boundaries (e.g., a heterogeneous environment) and retrieve transaction processing context during subsequent transactions.
8. Repository management maintains the metadata of the transactional environment, such as the TP monitor system dictionary and description of transaction processing environment.

Unfortunately, though transaction types apply in both homogeneous and heterogeneous environments, the TP monitor depicted FIG. 7 does not apply in heterogeneous environments. A traditional TP monitor does not work in a heterogeneous environment because the application program, recovery manager, log manager, database and resource manager are on discrete systems in a three-tier architecture administered by more than one administrative authority and recovery processes are outside of the TP monitor's span of control [14].

Common Object Request Broker Architecture (CORBA)

The Object Management Group (OMG) began developing an open-software bus specification and architecture in 1989. The goal was to develop a specification that would enable object components written by different vendors to interoperate across networks and operating systems [20]. The Common Object Request Broker Architecture (CORBA) is the result of years of hard work by OMG and CORBA 2.0 is a fairly comprehensive open-software specification [21]. The CORBA specification defines an object-oriented open-software bus named an Object Request Broker (ORB). The CORBA ORB, or open-software object bus, supports static and dynamic invocation of remote objects as a middle-tier in a three-tier application architecture—where the client-tier is an Internet client and the server-tier is another CORBA ORB potentially administered by a different administrative authority [22].

The alternative specification to the CORBA open-software object bus is Microsoft's proprietary Distributed Component Object Model (DCOM) specification. The principal difference between the two architecture specifications of CORBA and DCOM is whether the remote objects should be executed and stored locally or remotely [23]. For example, a CORBA transaction begins by connecting to a remote server and executes an object by static or dynamic invocation of the executable program stored on the server. The CORBA architecture specification is designed for remote object execution and storage transparently across operating systems. However, DCOM transactions behave differently because the DCOM architecture specification is designed for local object execution and storage with dependencies on the Microsoft family of operating systems. For example, when a DCOM transaction connects to a remote server it must perform validation and comparison operations before executing the object module in memory. Specifically, a DCOM transaction does the following:

1. Statically or dynamically identifies a target remote object, executable program, stored on the server.
2. Determines if a copy of the remote object exists on the client and then:
   a. If a copy of the remote object is found on the client it is compared against the object on the server to determine if the client object is current with the server object. If the server object is more current than the client's copy of the object, the server object is replicated from the server to the client; otherwise, the client copy is executed.
   b. If a copy of the object is not found on the client, then the server object is replicated to the client and client copy is executed.
3. The program code on the client is loaded into memory for execution.

There is substantial debate in the software industry on the efficacy of CORBA and DCOM client architectures. However, aside from background information relative to their client-invocation methods, a CORBA or DCOM client implementation is transparent to an ORB-brokered transaction because they both support the OMG Internet Inter-ORB Protocol (IIOP) specification [22] [23]. The IIOP specification makes it possible to use the Internet as a backbone ORB through which other ORBs can communicate via the General Inter-ORB Protocol (GIOP) specification [22] [23] [24]. Likewise, the GIOP specification enables inter-ORB communication between proprietary ORBs through the Environment-Specific Inter-ORB Protocols (ESIOPs)—the first application of which, Distributed Computing Environment (DCE), is covered in the CORBA 2.0 specification [22] [23]. CORBA 2.0 specification compliant ORBs must natively implement the IIOP specification or provide a half-bridge to it [22] [23].

The Internet-enabled CORBA 2.0 specification breadth means that the CORBA ORB middle-tier of distributed Internet commerce is not simply an application server in a three-tier architecture (as depicted in FIG. 3) but is an IIOP backbone ORB. Moreover, the IIOP backbone ORB enables the Internet to become a loosely coupled federation of ORBs capable of supporting e-commerce as a scalable middle-tier infrastructure. FIG. 8 is a block diagram that depicts CORBA IIOP architecture 800.

The IIOP backbone ORB component of the CORBA 2.0 specification changes the Internet transaction paradigm and creates an Internet heterogeneous middle-tier application server that is composed of federated ORBs. ORBs within the IIOP backbone must also provide the standard services defined in the CORBA 2.0 ORB specification, which are described below [21]:

1. Life cycle service defines operations for creating, copying, moving and deleting components on the ORB bus.
2. Naming service allows components on the bus to locate other persistent components on a variety of storage servers.
3. Persistence service provides a single interface for storing components permanently on a variety of storage servers, like DBMS and ODBMS.
4. Event service allows components on the ORB bus to dynamically register or unregister their interest in specific events.
5. Transaction service provides two-phase commit coordination among recoverable components using flat or nested transactions.
6. Concurrency control service provides a lock manager that can obtain locks on behalf of either transactions or threads.

7. Relationship service provides a way to create dynamic associations (or links) between components that know nothing about each other.
8. Externalization service provides a standard way for getting data into and out of a component using a stream-like mechanism.
9. Security service provides a complete framework for distributed object security.
10. Time service provides interfaces for synchronizing time in a distributed object environment.
11. Query service provides query operations for objects (e.g., a superset of ANSI SQL92 loosely based on the upcoming SQL3 and Object Database Management Group's (ODMG) Object Query Language OQL).
12. Licensing service provides operations for metering the use of components (e.g., using various available charging mechanisms).
13. Properties service provides operations that let you associate named values (or properties) with any component object.
14. Trader service provides a "Yellow Pages" for objects; it publicizes object components and their respective services.
15. Collection service provides CORBA interfaces to generically create and manipulate the most common collections.

Unfortunately, there are four unresolved issues with the CORBA 2.0 ORB specification that must be resolved before an IIOP backbone ORB can enable Internet e-commerce through loosely coupled and federated ORBs. The CORBA 2.0 ORB specification unresolved issues are: (1) Scaling the middle-tier server receiving incoming client messages [15] [25]; (2) Load balancing incoming transaction processing requests [15] [26]; (3) CORBA latency and scalability over high-speed networks [27]; and (4) Aggregate or heterogeneous transaction fault tolerance [28]. Unresolved issues numbers one and two above represent TP monitor features that are not included within the CORBA 2.0 ORB specification. Specifically, CORBA 2.0 ORB specification fails to deliver TP monitor component equivalent functionality for queue management, server class management, request scheduling and load balancing. Supplementing the CORBA 2.0 ORB specification, there are four commercial TP monitor solutions that address unresolved issues one and two; and they are: (1) IBM's Business Object Server Solution™ (BOSS); (2) BEA Systems' Tuxedo-based ObjectWare™; (3) Oracle's WebServer™; and (4) Microsoft's DCOM solution Viper™. The unresolved CORBA latency and scalability over high-speed networks is currently an active research topic at Washington University [27] and it appears that a favorable solution is in the process of being developed. However, the last unresolved issue, number four, is the same as that noted above with traditional TP monitors that fail to vouchsafe transaction integrity for a complex compound transaction. TP monitors do not work in a heterogeneous environment because of two related issues. First, the application program, recovery manager, log manager, database and resource manager are on discrete systems in a three-tier architecture. Second, the application and program services are administered by more than one administrative authority and their recovery processes are outside of the TP monitor's span of control [14]. In a CORBA IIOP ORB implementation, the application program may exist within the middle-tier ORB or a server-tier application server, while the recovery, log, database and resource managers are on server-tier systems. The fail point for the CORBA IIOP ORB services across heterogeneous transaction environments is the X/Open Distributed Transaction Processing (DTP) reference model [18].

Internet Commercial Issues

Internet commerce or e-commerce is a burgeoning business and recently matched consumer sales volumes for shopping malls during the 1998 Christmas season. However, e-commerce is limited in the current web-enabled model of a single client and server because e-commerce requires more than ACID compliant transactions. E-commerce transactions must be perfectly secure from programs that would observe the transaction and compromise the privacy of the transaction. Privacy has two components in an e-commerce transaction. First, the purchaser and seller do not want the nature, content and price of the purchase disclosed. Second, the purchaser does not want the purchasing instrument's (e.g., credit card account) authorization process and code compromised by parties that are external to the e-commerce transaction.

Netscape's Secure Socket Layer (SSL) provides transaction encryption on browser submitted transactions; however, web spoofing can compromise the integrity of an SSL encrypted transactions as demonstrated by the Safe Internet Programming team at Princeton University [29] [30]. Closing the e-commerce security gap is a major commercial initiative and academic research topic that focuses on implementing web servers that employ hostname, IP address, user, password and digital certificates as security attributes or component mechanisms [30]. Unfortunately, these security attributes are inadequate because the remote objects or Common Gateway Interface (CGI) programs executed in a CORBA IIOP ORB that make e-commerce possible pose risks to web servers. Some CGI program risks are that they may: (1) Read, replace, modify or remove files; (2) Mail files back over the Internet; (3) Execute programs downloaded on the server such as a password sniffer or a network daemon that provides unauthorized telnet access; and (4) Launch a denial-of-service attack by overloading the server CPU [31]. There are some ways to mitigate the CGI program security risks; however, they require security design and impose marginal transaction overhead. Other vulnerable areas for web servers are the database and buffer overflows that require two additional levels of security awareness to protect the integrity and privacy of e-commerce transactions.

When e-commerce is removed from the single client and server paradigm and complex compound transactions between a single client and multiple heterogeneous servers are added to the transaction scope, the potential problems extend beyond traditional security attributes of e-commerce transactions. For example, when a client transaction wants to withdraw money from one bank and deposit money to another bank across heterogeneous transaction environments the e-commerce transaction must guarantee ACID compliance of a complex compound transaction. Current e-commerce transactions do not provide a standard for a complex compound transaction as described in this paper. Though current e-commerce single client and server transactions are moving toward the secure electronic transaction (SET) specification, which is inching its way forward as an industry standard [30], it appears that there is a need for a system to execute a complex compound e-commerce transaction in an ACID compliant manner.

The CORBA Object Transaction Service (OTS) fails to provide a reliable online transaction processing (OLTP) middle-tier to dynamically bound heterogeneous, discretely administered and loosely coupled systems because it does not provide write consistent and recoverable asynchronous symmetrical replication of data [32]. The failure of the Object Transaction Service (OTS) is linked to the adoption of the X/Open Data Transaction Processing (DTP) Reference Model. The X/Open DTP Reference Model uses a 2PC protocol that does not guarantee write consistency or transaction recoverability in a heterogeneous, discretely administered and loosely coupled system architecture [17] [33].

The clearest and simplest example of the write inconsistency in the X/Open DTP Reference Model can be illustrated in Oracle's symmetrical database server [34] [35]. For example, assume databases "A" and "B" are unique and configured for symmetrical replication, and when a transaction in database "A" is submitted, the following steps occur absent a system or network fault:

1. Database "A" locks a row in a database object (e.g., where the object is a table or cluster) and writes a pre-commit event to the session image and rollback log file (e.g., Oracle calls the rollback log file the "redo log file").
2. The successful pre-commit event then fires a table-level database-trigger that invokes a remote procedure call (RPC) to database "B" through a configured database link.
3. The RPC opens a communication channel, navigates the network and establishes a local database session with database "B;" and then the RPC:
    a. Locks the equivalent object row and writes a pre-commit event to the local session image and rollback log file of database "B;"
    b. Writes a commit event to the local session image and rollback log file of database "B;"
    c. Returns a successful program execution acknowledgement signal to database "A."
4. The successful trigger event then enables database "A" to write a commit event to the local session image and rollback log file of database "A."

Unfortunately, when a fault happens between the completion of the remote procedure call (RPC) event on database "B" (e.g., Step 3b) and the receipt of RPC acknowledgement by database "A" (e.g., Step 3c), then the two databases are in write inconsistent states. In Oracle's implementation of symmetrical replication, this type of failure will result in both databases becoming unavailable and forcing point-in-time symmetrical recovery of both database servers. The recovery process requires that both servers be brought online with symmetrical replication disabled. The database administrator must then make a physical inspection of the pre-commit entries in the rollback log files and data states of the replicated database. Based on the example above, when a pre-commit entry in the rollback log file of database "A" is found and the transaction has been written to database "B," the database administrator must do one of two things. Option one is to manually apply the pre-commit event entry found in the rollback log of database "A." Option two is to enter a transaction that removes the event from database "B" that did not occur in database "A" and restore the object state in database "B" to the object state in database "A." Either of these manipulations forces the re-synchronization of the data states in database "B" with the data states in database "A."

Oracle's implementation of X/Open DTP Reference Model is based on a homogeneous environment within a single management structure and is heavily reliant on fault recovery through manual intervention and point-in-time recovery. Outwardly, this mechanism seems simple and direct but when the number of synchronized databases and number of transactions per second grows, so does the problem in a homogeneous environment. However, in a CORBA Object Transaction Service (OTS) that does not have a persistent data store of transaction data states (e.g., recoverable objects, recoverable object references, and transaction regeneration after failures), the possibility of heterogeneous recovery is non-existent [32] [18].

For a CORBA Object Transaction Service (OTS), providing recoverability across heterogeneous, discretely administered and loosely coupled systems could be accomplished by implementing techniques used for multidatabase management systems (MDBMS). The problem, however, is that the CORBA Object Transaction Service specification excludes methods to make persistent the recoverable state of an Object Transaction Service's recoverable objects, to recover object-references, and regenerate transactions after failure [32]. Specifically, the CORBA Object Transaction Service specification defines the persistent state of the following multidatabase management system global state variables as being beyond the scope of the specification [32] and as being implementation dependent issues:

1. Recoverable objects—the transaction data states.
2. Recoverable object-references—the transaction identifier (XID), URL addresses and status of transaction and subtransaction completion; and
3. Transaction regeneration after failure—the method of invoking and managing transaction regeneration when a failure occurs; and especially when the failure propagates registered resources in non-synchronized object states.

Unfortunately, the persistent state of recoverable objects, recoverable object-references and transaction regeneration after failure issues are the same as those illustrated above in Oracle's implementation of the X/Open DTP Reference Model. In the symmetrical replication example above, a recoverable object is the (1) rollback log file or (2) database object (e.g., table or cluster). The CORBA Object Transaction Service recoverable object-references are equivalent to the unique database instance names stored in the database links maintained within each of the symmetrical database servers. However, there is no system component in the Oracle implementation to automatically regenerate a recoverable object-state. The Oracle symmetrical database manual recovery process described above is the equivalent to the transaction regeneration method missing from the CORBA Object Transaction Service specification.

The failure to make persistent the recoverable state of an Object Transaction Service's recoverable objects, recoverable object-references and transaction regeneration after failure [32] means that the CORBA Object Transaction Service specification lacks the necessary global state attributes of a multidatabase management system (MDBMS) to guarantee commercial OLTP across the Internet.

Therefore there is a need to provide techniques for executing a complex compound transaction in an ACID compliant manner, and in particular, a need for a technique that may be used to implement a write consistent and recoverable transaction protocol across heterogeneous, discretely administered and loosely coupled systems, for multidatabase systems and CORBA Object Transaction Services.

Transaction Quantums

Transaction overhead cost, or the frequency of object messaging, transaction recovery and rebroadcast transactions across the Internet is a complex issue that does not have a single independent solution. One factor that affects transaction overhead for transactions executed across the internet are quantum values. A quantum value specifies the timeout period associated with a transaction acknowledgement. When the time out period ends, the transaction expires and may be aborted.

Transactions abate recovery until the longer quantum expires. To reduce the number of transaction recovered, the quantum values may be lengthened. Lengthening quantum values increase the number of transactions that delay recovery, and the increases number resources that are held longer, increase the number recovery processes delayed, and increases the likelihood of unnecessary event messages. There is therefore a need for a mechanism for managing quantum values in a manner that both reduces the number of transactions aborted and transaction overhead.

SUMMARY OF THE INVENTION

Described herein is a system for executing distributed transactions. According to an aspect of the present invention, a coordinator and one or more participants cooperate to execute a distributed transaction, the distributed transaction including for each participant a transaction executed by the participant. To manage the transaction, the coordinator and the participant communicate over a network using, for example, a stateless protocol. Before each participant commits the transaction, the participants determine that the coordinator has committed the transaction.

According to another aspect of the invention, the coordinator commits the transaction after receiving acknowledgment from all the participants that they will commit the transaction. To determine whether the coordinator has committed the transaction, a participant transmits a message to the coordinator to acknowledge that it will commit the distributed transaction. The participant commits its respective transaction if it receives an acknowledgement from the coordinator. For the particular transaction being executed by a participant, the participant prevents other transactions from modifying a data item affected by the particular transaction. The participant will prevent such modifications until termination criteria for the particular transaction is satisfied, in which case the participant terminates the transaction.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 is a matrix contrasting and comparing the attributes of the five computing styles according to Gray and Reuter;

FIG. 19 is a table containing a definition of the Web-transactions initial transactions procedure;

FIG. 21 is a table that shows a procedure definition of an object for executing a complex compound transactions;

FIG. 22 is a table that shows a structure of an object for executing complex compound transactions;

DETAILED DESCRIPTION OF THE PREFERRED EMBODIMENT

Figure 1:
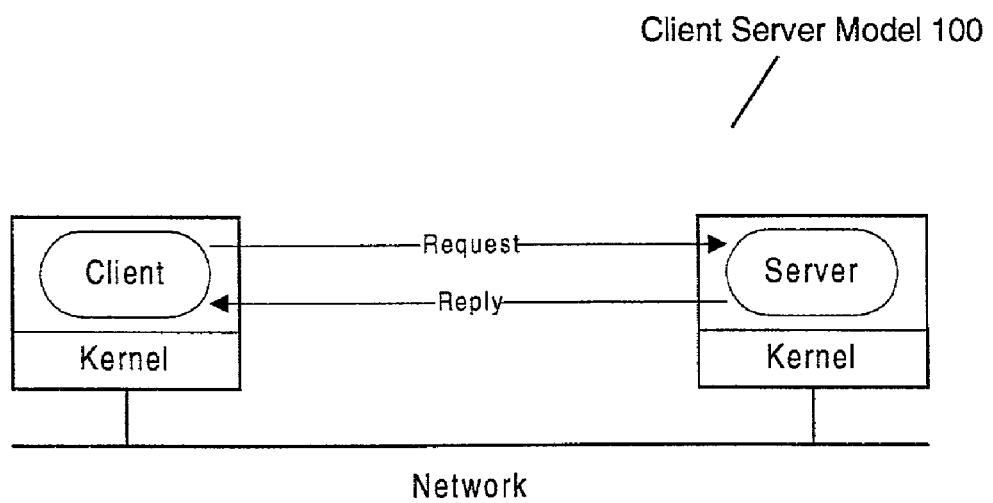
FIG. 1 is a block diagram that depicts a classic client-server model.
Figure 2:
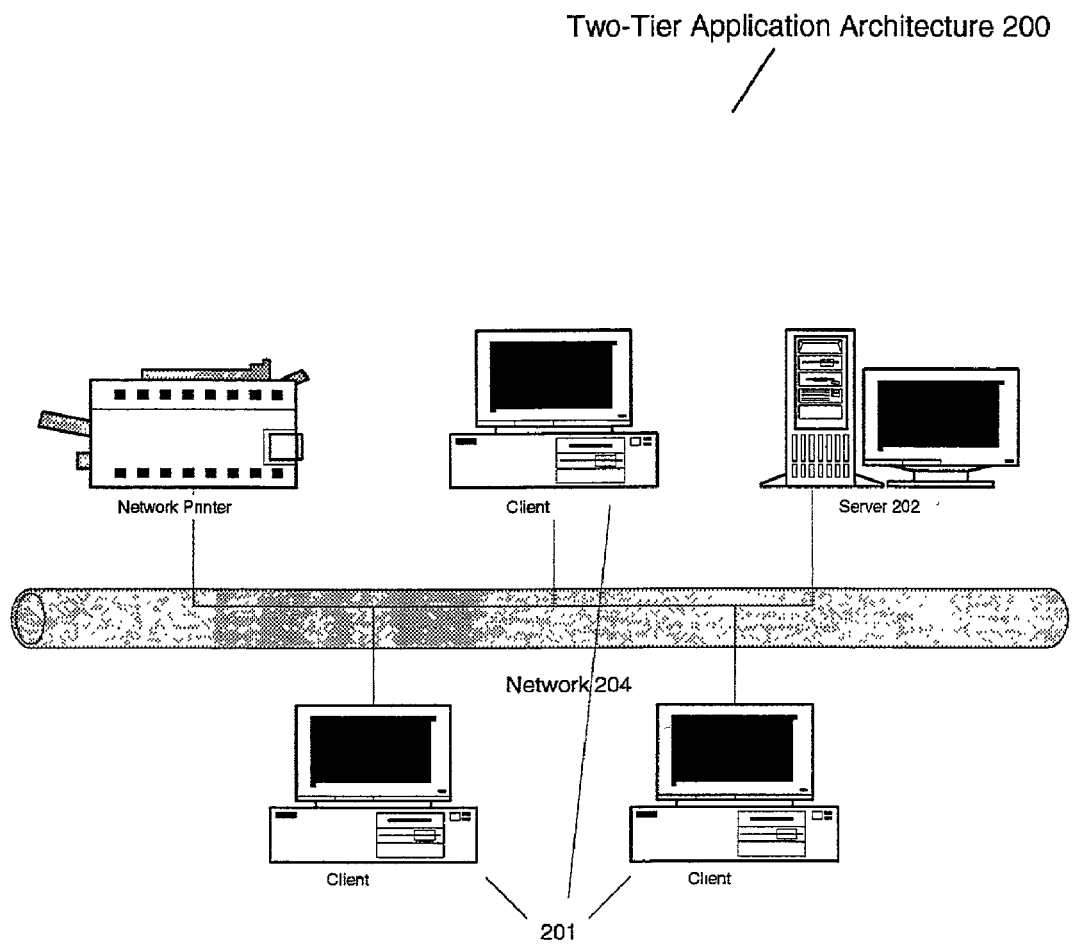
FIG. 2 is a block diagram that depicts a two-tier architecture client-server model.
Figure 3:
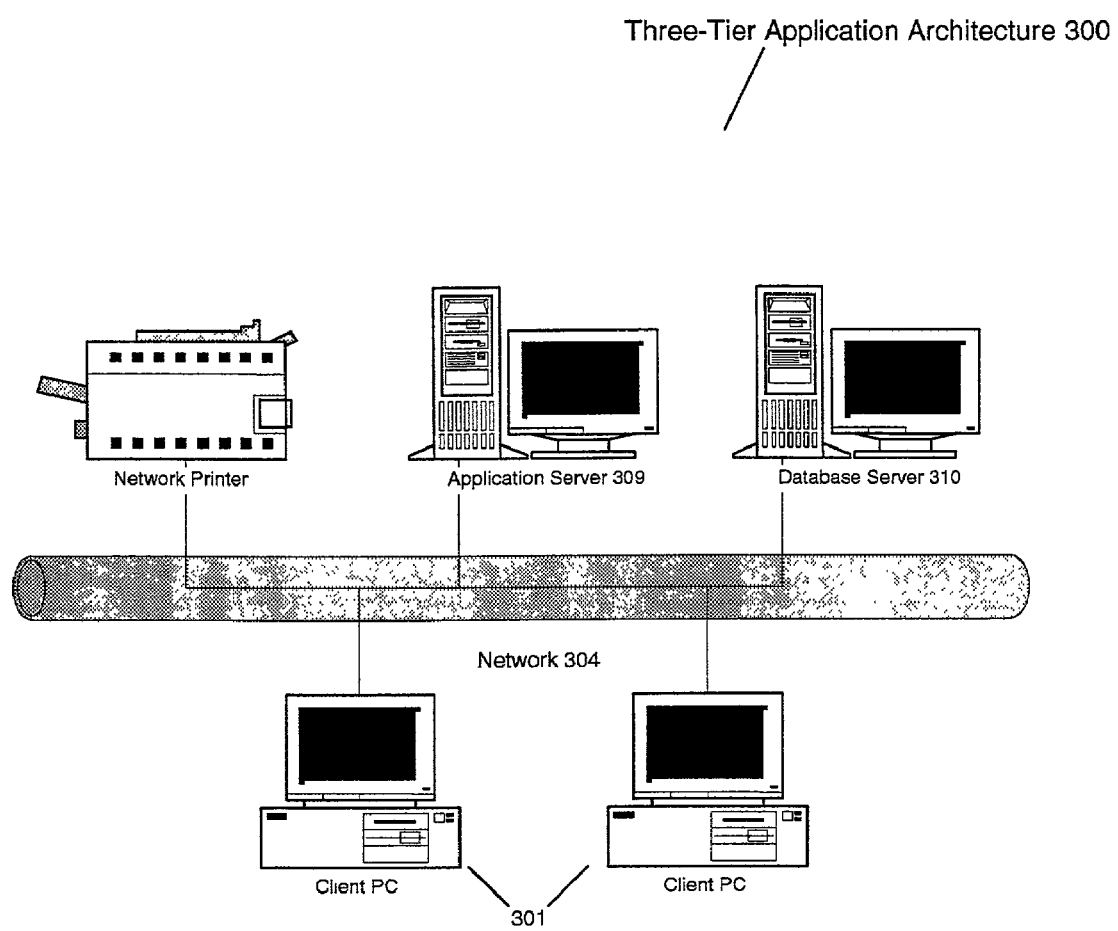
FIG. 3 is a block diagram that depicts a three-tier architecture client-server model.

A method and apparatus for executing a distributed transaction is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Disclosed herein are techniques for performing compound complex transactions in an ACID compliant manner. The compound complex transaction includes transactions that are each discretely administered by a system from a set of heterogeneous systems that are dynamically bound and loosely coupled. The systems may be dynamically bound and loosely coupled together by a stateless network protocol, such as HTTP. In addition, the techniques for performing ACID compliant complex compound transactions may be combined with active simulation and reflective distributed artificial intelligent agents that dynamically control quantum values. As a result, transaction overhead is reduced.

A system of executing a complex compound transaction is illustrated using a CORBA Object Transaction Service (OTS) to execute a complex compound transaction. Complex compound commercial transactions may involve two or more discrete servers, coupled over the Internet through a stateless protocol, each discrete server administering a transaction that is part of the complex compound transaction. For example, a transaction that (1) withdraws money from a bank account at Bank "A" and (2) deposits money into a bank account at Bank "B" is a single complex compound transaction.

The CORBA OTS supports dynamically bound independent heterogeneous, discretely administered and loosely coupled systems, and follows a minimalist transaction protocol that extends the portability of the X/Open DTP Reference Model in the CORBA OTS specification. In addition to the minimalist transaction protocol, the technique involves a recovery process capable of spawning recovery activities when (1) multidatabase write consistency failures occur across independent heterogeneous, discretely administered and loosely coupled systems while executing a complex compound transaction, (2) and the CORBA ORB has experienced a fault and is manually restarted. The latter recovery process enables the architecture to determine if a multidatabase write consistency occurred before the CORBA ORB experienced a service interruption.

The ACID compliant transaction architecture may incorporate techniques for dynamically controlling quantum values. These techniques use a combination of active simulation and reflective distributed artificial intelligent agents to control quantum values. The combination of these components enables a selective process that lengthens or shortens quantum values based on active statistical simulation of node latency and remote transaction responsiveness. Selective lengthening of quantum values against specific URL addresses or routing patterns across the Internet minimizes transaction overhead cost by reducing hold times for resources and expediting necessary recovery processes and minimizing rebroadcast messaging events. The selective lengthening of quantum values succeeds in reducing overhead when the lengthened quantum values are correlated to real time connection values collected by reflective distributed artificial intelligence agents. Transaction efficiency is increased because rollback messages that would be executed against a static quantum value are held in abeyance when known network latency is beyond the standard quantum value.

Organizational Overview

The techniques for executing complex compound transactions in an ACID compliant manner are illustrated using a CORBA Object Transaction Service that involves discrete systems loosely coupled over a stateless network. These techniques may be combined with techniques to dynamically control quantum values. The dynamic control of quantum values employs active simulation and reflective distributed artificial intelligent agents. Therefore, it useful to explain in greater detail CORBA Object Transaction Services, Transaction Processing, Active Simulation, Reflective Objects, HTTP, and other related concepts.

Next, various ACID compliant transaction protocols and transactions are described for executing complex compound transactions across a connection using HTTP. First, an ACID compliant transaction architecture is illustrated using a web browser client, web server and single application server to execute a distributed transaction. Second, an ACID compliant transaction architecture is illustrated using a web browser client, web server and two or more application servers that participate in the execution of a complex compound transaction. Finally, techniques for dynamically controlling quantum values and reducing transaction overhead are discussed.

CORBA Services: Object Transaction Service (OTS)

The CORBA 2.0 specification delivers fifteen services that are required components in a compliant CORBA 2.0 ORB (as covered in the earlier section on CORBA) [21]. One of those fifteen CORBA services is the Object Transaction Service (OTS). The OTS service provides synchronization across the elements of distributed applications by managing a two-phase commit coordination among recoverable components using flat or nested transactions based on the adoption of the X/Open DTP reference model [38]. The scope of the transaction is defined by a transaction context that is shared by participating objects; the OTS places no constraints on the number of objects involved in the transaction, topology of the application or way in which the application is distributed across a network.

In an example of an OTS transaction, a client begins a transaction (by calling an OTS defined object) that establishes a transaction context tied to the client thread; and the client then transmits requests. The transmitted client requests are implicitly linked to the client's OTS transaction context and treated as components of a complex compound transaction if two or more recoverable servers are participants in the transaction context. At some point, the client determines the transaction is complete and ends the OTS transaction context. When the client transmits an end transaction request, the transaction components are committed provided an error did not occur; however, if an error occurs, the OTS transaction context will rollback all transaction components or subtransactions. In this scenario, the distributed application is using an implicit transaction propagation method—where there is no direct client-side intervention in the transaction [39]. For example, the client-spawned OTS transaction context is transmitted implicitly to all participating objects and the details of the transactions are transparent to the client. An alternative to implicit transaction propagation is explicit transaction propagation. However, the method of implementing an ORB transaction service may produce a CORBA compliant ORB that limits the client's ability to explicitly propagate the transaction context [40].

The CORBA OTS does not require that all requests be performed within the scope of a transaction but all requests outside the scope of the transaction context are separate threads of execution (e.g., threads adhering to the isolation property of ACID compliant transactions) [10] [39]. Distributed applications that use CORBA IIOP as a middle-tier application server have the following transaction components to ensure transaction processing integrity [39]:

1. Transaction client—is an arbitrary program that can invoke operations belonging to many transactional objects in a single transaction (e.g., a program that can effect a complex compound transaction).
2. Transaction object—is an object whose behavior is affected by invocation within the scope of a transaction. A transaction object maintains its state by some form of persistent storage during the life of an object's invocation.
3. Recoverable object—is a transactional object that participates in a transaction service protocol by registering an object called a resource with the transaction service. Recoverable objects maintain a stable or persistent storage of their respective object state during the object instantiation life-cycle—the duration of time from an object instance's invocation to termination.
4. Transactional server—is a collection of one or more non-recoverable objects and whose behavior is affected by a transaction.
5. Recoverable server—is a collection of one or more objects, at least one of which is recoverable, and whose behavior is affected by a transaction. Recoverable servers register one or more resources with a transaction service protocol managing a transaction's thread of execution. The CORBA object transaction service controls the commit protocol by making requests to a recoverable server's invoked resources.

Distributed applications use these five transaction components to build three-tier application architectures. For example, in a transaction context involving one client and one database server, the middle-tier of a three-tier distributed application is a transactional server that contains a transactional object, while the database server-tier contains a recoverable server with a recoverable object and resource for each transaction. However, when the transaction context involves two database servers in a complex compound transaction, the middle-tier becomes a transaction service containing three instances of a transactional server and object [41]. The first instance of the transactional server, root transactional server, and object does three things [41] [42]. First, the root transactional server spawns two incremental transactional servers and transactional objects, one for the connection to each database server participating in the complex compound transaction [42]. Second, the root transactional server instantiates a remote controller (RC) object within the root transactional server context to manage the spawned transactional servers which act as separate threads of execution with unique subtransaction context [42]. Third, the root transactional server instantiates a transaction context for the two spawned transactions which are subsets of the transaction context or subtransaction context [42].

Figure 9:
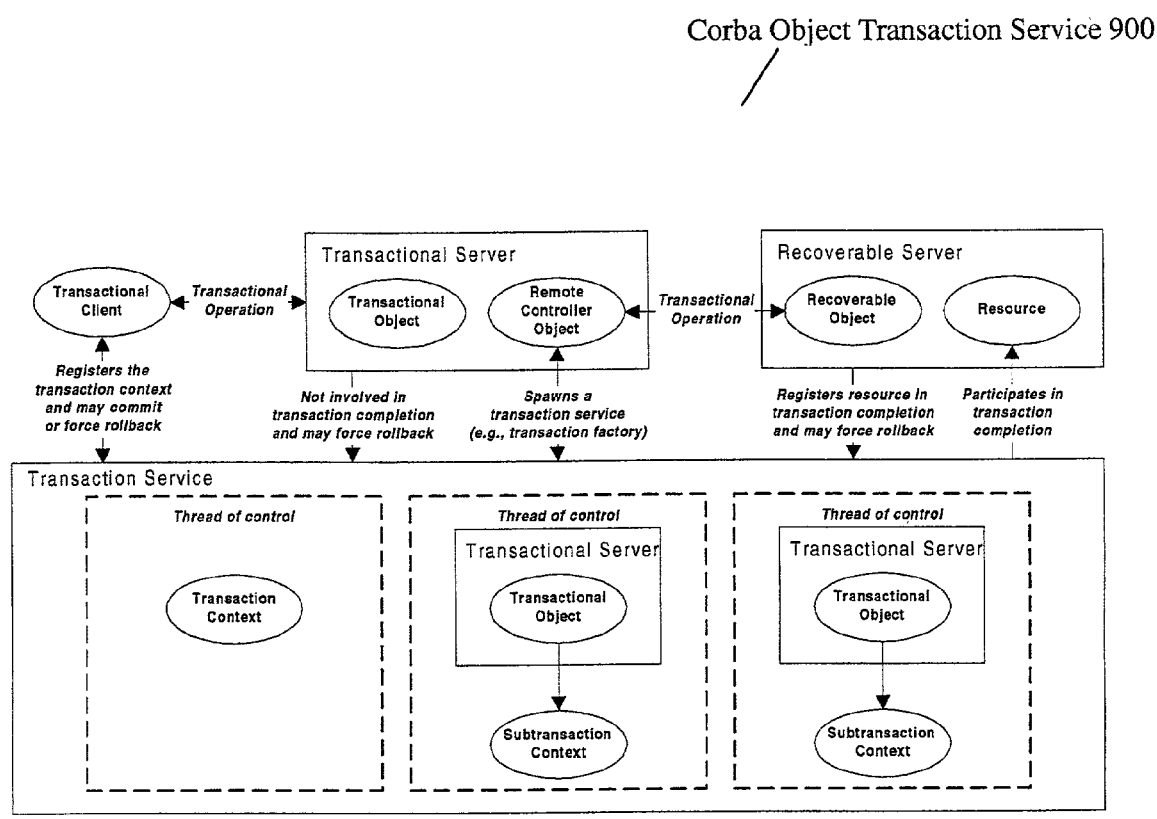
FIG. 9 is a block diagram that depicts a CORBA object transaction service.

FIG. 9 is a block diagram that depicts CORBA object transaction service 900 CORBA object transaction service manages a complex compound transaction and follows an ACID compliant transaction protocol that separates the subtransactions into distinct threads of control; however, unlike threads within a single process, the transaction protocol for a complex compound transaction is contained within four processes. The client-tier and transaction server (or middle-tier) each have a distinct process that shares the transaction-context state in the transaction service and each subtransaction, or spawned thread, of the root transaction server has a process created within the context of the transaction service. The shared transaction-context state between the client-tier and transaction server ensures that a transaction brokered by a transaction server between a single client and database server will either succeed or fail completely. However, when a complex compound transaction between a single client and multiple database servers is the object of interest, the independent nature of the transaction service's forked process threads of control for each subtransaction fragments the atomic property of an ACID compliant transaction. For example, in a complex compound CORBA OTS transaction, it is possible that only one of the subtransaction processes may complete successfully while the other rolls back the transaction because each of the spawned transactional servers instantiates independent ACID compliant transactions or discrete forked processes.

The scenario and the outcome can occur because compound complex CORBA OTS transactions function like a compound nested transaction across heterogeneous environments, vis-à-vis the X/Open DTP reference model (as covered in the transaction processing section) [17] [38]. When one subtransaction succeeds and the other fails in a complex compound CORBA OTS transaction, the RC object of the root transactional server must provide a containment transaction to vouchsafe the transaction's atomicity. The RC object's containment transaction must (1) recover the prior state of the successful subtransaction or (2) complete the failed subtransaction. Unfortunately, as discussed earlier with compound multilevel transactions, when a subtransaction in a heterogeneous environment writes a permanent state to a recoverable server, the isolation property of ACID compliant transactions is violated.

The isolation property is violated because the altered state becomes the permanent transactional object-state until a remote containment transaction can effect an exclusive lock on the object and rollback the transaction state [10]. However, if another process places a lock on the object and alters the object-state before the containment transaction executes, then the containment transaction may or may not be able to recover the object to its prior object state. Likewise, the intervening transaction that secured an exclusive lock on the object may have succeeded or failed based on a transaction state that should not have existed. If a subsequent transaction on the same object-state occurred between when the RC object's subtransaction completed and the RC object's containment transaction rolled back the object-state, there is virtually no efficacious way of correcting the error. Therefore, the X/Open DTP reference model's compound nested transaction architecture though more capable than a compound multilevel transaction across heterogeneous discretely administered and loosely coupled system architecture [17] [33] is not fully an ACID compliant transaction protocol [10].

X/Open Distributed Transaction Processing (DTP) Reference Model

Open Group is a vendor-neutral, international organization composed of users and software and hardware vendors.

The purpose of the Open Group is to help cultivate a viable global information infrastructure. The X/Open Distributed Transaction Processing (DTP) Reference Model was developed by Open Group and the principal deliverable of the X/Open Distributed Transaction Processing (DTP) Working Group. When the X/Open DTP Reference Model was designed and engineered, transaction-processing systems were complete operating environments or homogeneous environments, from the user-interface to the database [14] [43]. Unfortunately, as previously discussed, transaction processing systems are no longer solely homogeneous transaction processing environments and now include heterogeneous, discretely administered and loosely coupled system solutions which were not considerations while designing the X/Open DTP Reference Model.

Figure 10:
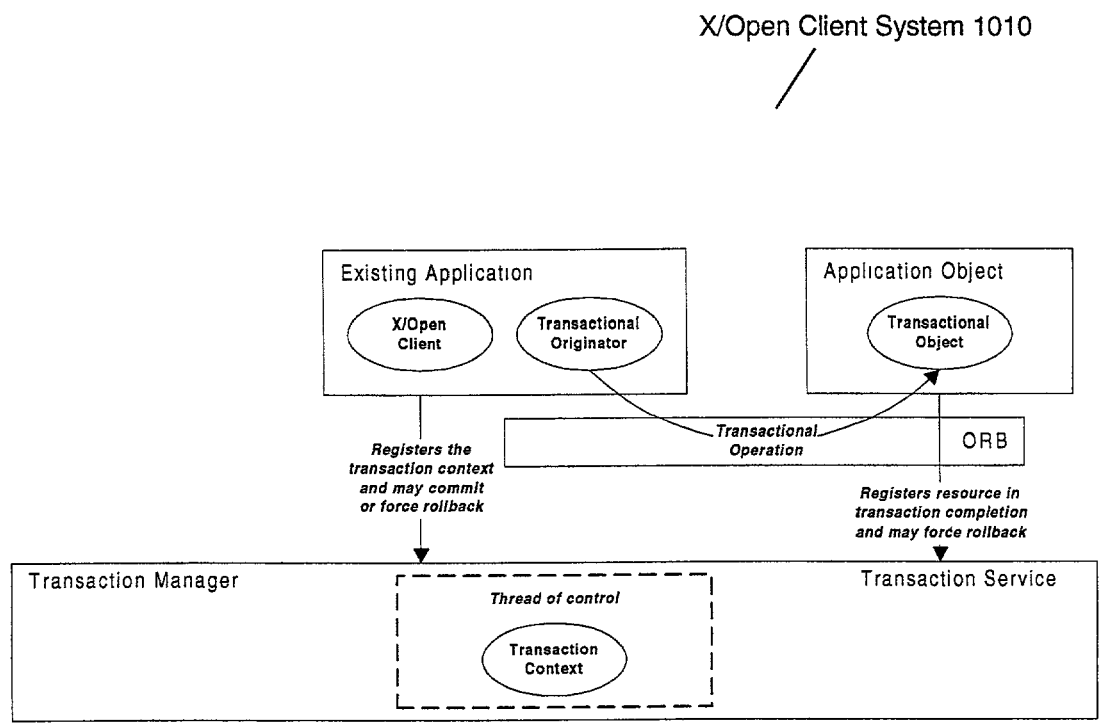
FIG. 10 is a block diagram that depicts a X/Open Client System.
Figure 11:
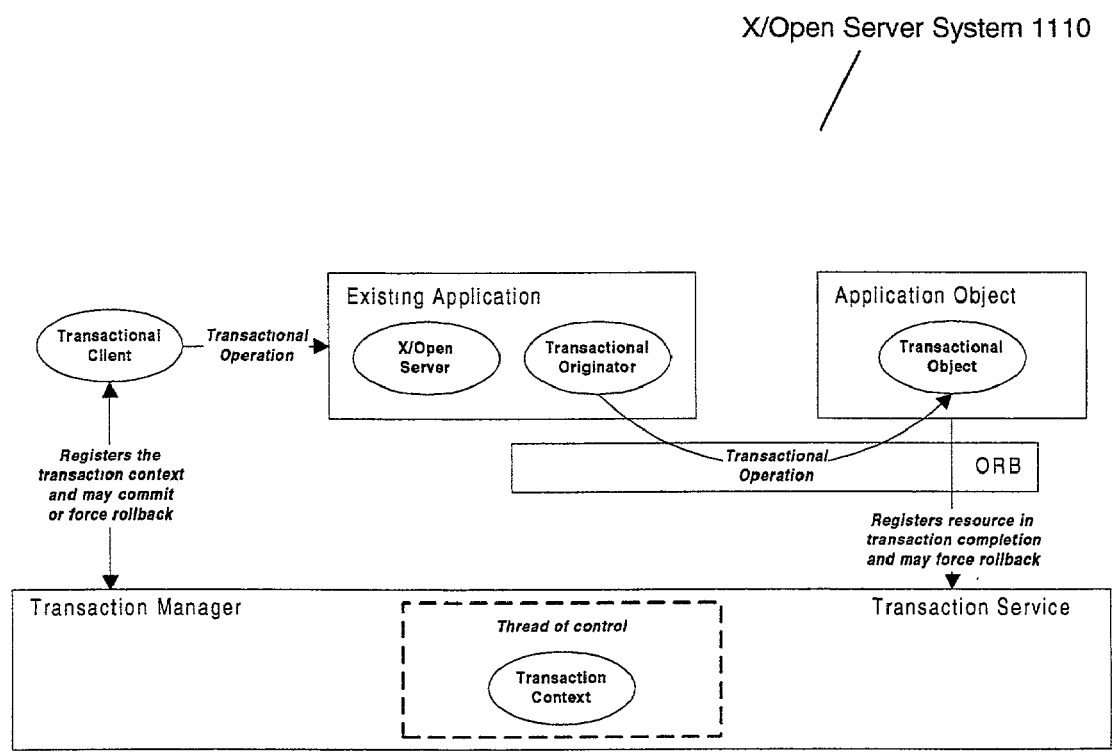
FIG. 11 is a block diagram that depicts a X/Open Server System.

The X/Open DTP Reference Model has two key models, four standard components and two interface protocols within one standard component [17] [33] [44]. The two models are (1) the X/Open client that supports a two-tier computing model and (2) the X/Open server that supports a three-tier computing model. X/Open Client System 1010 is shown in FIG. 10, and X/Open Server System 1110 is shown in FIG. 11. The four standard components are the transaction manager, resource manager, application program and interface server [44]. The two interface protocols are the TX protocol that supports transaction management and XA protocol that supports resource management in a two-phase commit protocol. The transaction manager component coordinates transactions by defining the transaction scope, transaction global state or transaction context between the X/Open client, which may be located on the same device as the resource and application components in a client model, and the X/Open server [33] [44]. The X/Open resource manager component creates a transactional object that registers itself within the transaction context, establishes a connection to a local or remote database and manages an ACID compliant two-phase commit transaction protocol [9] [33] [44]. In a distributed model, the X/Open resource manager calls a communication manager or remote controller and manages the invocation and control of remote procedure calls [43]. The application component manages the process of invoking the transaction manager to begin the session, invoking the resource manager to access the database, and invoking the transaction manager to terminate the session [33] [43] [44]. The interface server component provides the two transaction protocols—they are the TX and XA protocols [16] [17].

The transaction manager uses the TX protocol to begin and end transactions and the TX protocol manages transactions through three services—tx_begin, tx_commit and tx_rollback [16]. The X/Open client sends a tx_begin to transmit programming instructions, tx_commit to commit a transaction and tx_rollback to terminate a partially complete transaction (e.g., a transaction prior to a tx_commit). The interface between the transaction and resource managers is the XA protocol and the XA protocol has two services—xa_prepare and xa_commit, which are triggered by receipt of a tx_commit from a X/Open client [17]. The transaction manager uses a two-phase commit protocol where the xa_prepare service to advise the resource manager to effect a pre-commit and the xa_commit to effect a commit (e.g., as phase one and two of a two-phase commit protocol) [44]. The transaction manager issues the xa_commit only on receipt of confirmation that all resource managers or communication managers (e.g., in a distributed transaction) can commit [44].

The weakness in the X/Open DTP reference model is the resource manager spawned communication manager because it was not originally designed to manage complex compound heterogeneous, discretely administered and loosely coupled ACID transactions. Specifically, the communication manager or remote transaction controller forks independent processes to establish unique transaction connections when two or more servers are participants in an ORB brokered X/Open DTP complex compound transaction [33]. Hence, in an ORB brokered X/Open DTP complex compound transaction that involves connectivity between a client and two or more new applications (i.e., database servers), the threads of control discussed in the CORBA specification are actually independent processes with unique transaction context or process control blocks [33] [45]. For example, when a client connects via the TX protocol to the transaction manager to execute a complex compound transaction, the following sequence of event occurs:

1. The transaction manager creates a unique connection via the XA protocol to a resource manager.
2. The resource manager spawns a communication manager or forks a new discrete process that creates a resource manager for each remote third-tier participant server or database server within the scope of the complex compound transaction.
3. The communication manager acts as a router of TX protocol instructions to all third-tier participant servers and sends XA pre-commits and commits to spawned resource managers.

Online Transaction Processing (OLTP) Architecture

In Gray and Reuters 1993 seminal work *Transaction Processing: Concepts and Techniques* on transaction processing, five principal types of computing styles are explained and contrasted; they are batch, time-sharing, real-time, client-server and transaction-oriented processing [14]. Batch processing is a computing style based on large, independent and prescheduled programs (i.e., through a predefined job control program) that have well defined resource requirements [14] [46]. Time-sharing is a computing style based on a terminal user who submits periodic private jobs of varying length that may or may not have well defined resource requirements [14] [47]. Realtime processing has two distinct architecture patterns—hard- and soft-realtime systems [14] [48]. A hard-realtime system is a computing style where clock criticality is an absolute functional paradigm [48]; typically a computing style shaped by the demands of process control and embedded system requirements [14]. A soft-realtime system is a computing style where clock criticality is an important but not an absolute functional paradigm [48]; typically a computing style where ninety percent of tasks must complete within a transactional quantum (e.g., where the quantum time-event horizon is part of the system specification) [14] [49]. Client-server processing is a distributed time-sharing computing style that can exist across a wide variety of application architectures and may have background batch processing constructs to handle large, well-defined and resource intensive programs [14]. Transaction-oriented processing is a style that borrows from batch, time-sharing, realtime and client-server system architecture designs and perhaps can be best characterized as a leveraged soft-realtime system or by its popular moniker of online transaction processing (OLTP) [14] [49].

Online transaction processing architectures are varied and may span one-, two- or three-tier application architectures in homogeneous or heterogeneous CORBA IIOP-enabled environments. FIG. 12 is shows Comparison of Computing Styles 1200, a matrix contrasting and comparing the attributes of the five computing styles found in Gray and Reuter 1993 work, and portraying the scale and dynamics of transaction-oriented processing or OLTP systems [14].

Clearly, the chart oversimplifies some points. For example, hard-real time systems include concurrent hard-realtime systems that require concurrency controls and the concurrency controls certainly impose ACID transaction compliance through synchronization primitives [50]. However, on balance, the comparative matrix of Gray and Reuter (see FIG. 12) is a fair depiction of the high-level attributes of the five computing styles and correct in placing OLTP as the most complex and scalable computing style [14]. The complex and scalable architecture of OLTP systems is key to why most homogeneous business systems operate as OLTP systems [49]. It is important to understand the key quantitative and qualitative differences that set OLTP apart from the other computing styles and how these differences make complex compound ACID compliant transactions across a heterogeneous, discretely administered and loosely coupled system a critical component in CORBA IIOP brokered transactions. Also, it is important to understand how current client-server and Java-based CGI applications have become enterprise, or Intranet, OLTP solutions.

The discussion of differences that set OLTP apart from the other computing styles has two facets. First, what are the differences between OLTP and client-server computing; and second, what are the differences between OLTP and batch, time-sharing and realtime processing computing styles. The differences between OLTP and batch processing, time-sharing processing and realtime systems have changed little from the early 1990s and will capitalize on the work of Gray and Reuter [14]. However, the differences between OLTP and client-server computing styles have all but disappeared. The OLTP comparison to batch, time-sharing and realtime processing computing styles will precede the OLTP and client-server discussion to lay a proper foundation.

Differences: OLTP and Other than Client-Server Computing Styles

The differences between OLTP and batch, time-sharing and realtime processing computing styles will address the attributes found in the work of Gray and Reuter (as previously depicted in FIG. 12) [14]. The attributes to be discussed are data, duration, guarantees of reliability, guarantees of consistency, work pattern, number of work sources or destinations, services provided, performance criteria, availability and unit of authorization.

The data attribute describes whether data is distributed or not and in the case of batch, time-sharing and realtime processing computing styles data and processing is not distributed. However, OLTP may have intelligent clients connected across a network and the host and clients may share processing and hence the data is a shared resource [14] [49]. The potential distributed nature of OLTP in the work of Gray and Reuter indicates that the lines between OLTP and client-server computing were beginning to blur in the early 1990s [14].

The duration attribute qualifies the length of transaction processing in each of the computing styles. Duration is long in batch and time-sharing processing because most activities in those models require long cycle time to resolve the computing problem; whereas, realtime processing has a very short duration because timing correctness is a critical criterion and tasks are tightly scoped processing activities [14] [51]. OLTP is provided a short duration because it most likely excludes background batch processing.

The guarantee of reliability attribute qualifies the degree of system availability in computing styles. For example, in batch and time-sharing processing system availability is normal; unfortunately, the work by Gray and Reuter makes no effort to qualify what one might find to be normal availability [14]. On the other hand, realtime systems are classified as very high availability, which may be interpreted as one hundred percent of scheduled availability because a hard realtime embedded system must always work [48]. The OLTP computing style mirrors realtime systems in that system availability must be very high, or one hundred percent of scheduled availability [14] and timing correctness must occur ninety percent of the time within a transaction critical clock interval [52].

The guarantee of consistency attribute measures the degree of ACID compliance during processing and the degree of transaction recoverability [14]. In this attribute Gray and Reuter are in error because they assign time-sharing and realtime processing no guarantee of consistency. This is patently untrue because time-sharing and realtime processing typically are implemented with some degree of concurrency which at a minimum must be implemented with the atomic, consistency and isolation properties of ACID compliant transactions [53]. However, the batch processing computing style is typically a sequence of flat or chained transactions that may be implemented without consistency, isolation or durability properties of ACID compliant transactions. The difference between batch and non-concurrent time-sharing and realtime processing computing styles without ACID compliant transactions and OLTP is significant because OLTP requires a guarantee of an ACID compliant transaction one hundred percent of the time [10] [14].

The work pattern attribute measures whether the processing is scheduled or unscheduled. Batch and time-sharing processing are typically scheduled processing while realtime, client-server and OLTP are generally unscheduled or demand activities [14]. However, while most processing demands are unscheduled, roughly ninety percent of transaction volume [52], in an OLTP computing style, the remaining OLTP processing consists of jobs that run as scheduled jobs [49]. At the time of publication, Gray and Reuter were limited to the model of batch and time-sharing computing styles as scheduled processing; however, the qualification of realtime, client-server and OLTP as unscheduled processing is not supportable. For example, hard realtime systems' predictable patterns of execution link to timing correctness and client-server systems of that short era were very much like OLTP systems with a small fragment of scheduled processing [49] [52].

The number of work sources and destinations attribute measures the concurrent number of connected users in any generic computing style. The scale moves generally upward starting with batch processing and moving through time-sharing and realtime computing styles, then dips for client-server computing before jumping dramatically upward for OLTP [14]. This concurrent user paradigm held until Oracle Corporation introduced three-tier client-server solutions in 1996 [54] that catapulted client-server computing to the level of OLTP concurrency, or ten thousand concurrent users, through the use of an application server middle-tier [55]. However, in 1998, Oracle Corporation introduced a webserver paradigm that extended concurrent users beyond ten thousand with the only limit imposed by the resource capability of the database server [56].

The services provided attribute measures the instruction complexity of transactions in each of the computing styles. Gray and Reuter map instruction complexity against four categories to describe the five computing styles—virtual processing, simple function, simple request and simple or complex function [14]. Batch and time-sharing processing computing styles are qualified as virtual processing which can be summarized as a set of large units of work that sequentially access data in a reserved and dedicated virtual memory space [14]. The realtime processing computing style is qualified as a simple function that can be summarized as a repetitive workload of dynamically bound devices to tasks in dedicated and virtual memory space [14] [49]. The client-server computing style is limited to a category of simple request while OLTP is placed in a category of simple or complex request. The classification of client-server computing style to a category of simple request is no longer true with the innovations delivered by Oracle Corporation in the application software market [56]. The appropriate category for client-server computing is simple or complex request because client-server solutions are now mainline OLTP solutions, as will be expanded later in the paper.

The performance criteria attribute measures the primary focus of computing resources in each of the computing styles. Throughput is the only criterion of importance for computing resources in a batch processing computing style [14]. Likewise, response time is the only criterion of importance for time-sharing and realtime processing computing styles [14] [48]. However, client-server and OLTP computing styles have two criteria that are important and they are throughput and response time [14] [49]. Client-server and OLTP computing styles act like time-sharing processing systems ninety percent of the time and batch processing systems ten percent of the time [52]; however, these numbers are arbitrary estimates and vary based on actual implementation [14] [49].

The availability attribute appears as a redundant corollary to the guarantee of reliability attribute discussed earlier [14]. Lastly, the unit of authorization attribute measures the granularity of a transaction's isolation property [14]. For example, batch processing is by user, time-sharing processing is by user, realtime processing is dependent on whether the system is a hard or soft realtime system and client-server and OLTP processing may be either a user or job [14]. In both client-server and OLTP processing computing style, the user is the unit of authorization during soft realtime processing and the job is the unit of authorization during batch processing [14] [49].

Differences: OLTP and Client-Server Computing Styles

The review of attributes that qualify the differences between OLTP and batch processing, time-sharing processing and realtime systems also touched on the differences between client-server and OLTP computing styles. However, the former discussion only compared and contrasted attribute qualifications between OLTP and client-server computing styles but did not address why the differences have almost disappeared. The differences were eliminated in the short span of five years—between 1993 and 1998.

For example, the change in the number of work sources or destinations attribute occurred due to the advent of Intranet-capable client-server solutions that have replaced IBM 3278/9, IBM 5215 and VT character emulation. The key quantitative and qualitative differences between client-server and OLTP have almost disappeared since the early 1990s when Gray and Reuter published their work. When Gray and Reuter wrote about paradigms of data, duration, guarantees of reliability, guarantees of consistency, work pattern, number of work sources or destinations, services provided, performance criteria, availability and unit of authorization, they did so from a perspective of the hardware and software available at that time. At that time, early adopters of client-server computing solutions, found client-server solutions were limited to small scale applications working with an inordinate dependence on a network operating system (NOS). Client server systems of that short era were typically deployed on local area networks (LANs) because the concept of collapsed corporate backbone networks running a single transmission protocol was impractical due to router, hub and concentrator technology limitations [57]. However, two things occurred since 1993 to change the client-server paradigm. First, routers, hubs and concentrated evolved and collapsed TCP/IP backbones became a reality in corporate Intranets. Second, Oracle Corporation introduced scalable client-server application architectures beginning with the release of Oracle Applications 10.7 Smart-Client in 1996 [55].

The Oracle Corporation client-server application architecture adopted a transmuted version of IBM's System Network Architecture (SNA) which was virtually the first three-tier network computing solution paradigm [58]. In the simplest form, an SNA network would consist of (1) a 3278/9 terminal as the client; (2) a 37×5 front-end processor, or complex of 37×5 front-end processors and 3274 remote controllers, as the middle-tier or pseudo application server; and (3) a host mainframe as the database server [58]. The three-tier Oracle Applications 10.7 Smart-Client architecture consists of (1) a PC running a shell of the Oracle client-based application [54]; (2) an application server running the Oracle Client System Manager™ (OCSM) as the middle-tier application server [55]; and (3) an Oracle database running on a scalable database server. The initial client-server application architecture in 1996 required the number of middle-tier servers to grow as the number of work sources or destinations grew [55]. Subsequent solutions in 1998 provided for a middle-tier metrics server to effect load balancing as the number of clients, or work sources and destinations, grew and fundamentally made the database server's maximum load the limiting factor in client-server computing [56] [59] [60]. This last change eliminated the significant difference between the number of concurrent clients in a client-server versus an OLTP computing style. In fact, the three-tier homogeneous Intranet client-server architecture of 1998 [60] is now no longer a different computing style but is an implementation permutation of the OLTP computing style that expands the possible number of maximum concurrent users.

The Intranet client-server implementation of the OLTP computing style has one critical shortfall as the world moves forward in the information age. The shortfall is that the Intranet client-server model is built to support a set of clients through the medium of a webserver or application server into a single database server—which by definition, as introduced earlier in the paper, is a homogeneous environment [56] [60]. Heterogeneous OLTP systems will evolve when an ACID transaction protocol can support write consistency in heterogeneous, discretely administered and loosely coupled systems.

Database Architectures

Database architectures have evolved significantly since the publication of E. F. Codd's seminal paper in 1970 on relational databases, "A Relational Model of Data for Large Shared Databanks" [61]. Certainly, few innovations in computer science other than the concept of relational databases have had such rapid adoption by industry; relational databases have become the de facto standard in OLTP data management [62] [49] [63]. The dramatic shift can be attributed to the fact that relational databases solved five limitations of file-based data processing—separation and isolation of data, duplication of data, data dependence, incompatibility of files and fixed queries [63] [64]. The separation and isolation of data in file systems architectures compelled development groups to create (1) programs to merge files and (2) new merged files to catalogue for each new business need found for existing data. Moreover, each development exercise increases the application complexity and data and program management cost and eventually makes the application too complex and large to effectively maintain. The duplication of data within file-based processing systems has two critical issues and they are (1) wasteful data duplication and (2) loss of data consistency. Wasteful data duplication occurs in file-based systems because each file is constructed to have a complete set of information which means that some fields may appear in multiple files. Loss of data consistency occurs in file-based systems because old programs and files are not modified when new application features are added that modify fields in only a subset of all files where the field occurs. Also, old programs that get bypassed when adding new features fail to increase scope to include new files that share field values that are modified by the program. The data dependence or program-data dependence of a file system is due to the positional nature of data in the file. For example, the first position of a field "A" within a line in a file depends on the number of positions taken by all preceding fields to the left of field "A" unless field "A" is the leftmost field in the line. Therefore, if the field length of a field to the left of field "A" changes, all programming code that addresses field "A" needs to change to reflect the new beginning position of the field within the lines in the file. The incompatible file formats limitation exists in file-based systems when the data structures are created by more than one application programming language. For example, the data structure of a file generated by a COBOL program may be different than the data structure created by a C or Ada programming language. Lastly, the fixed queries limitation exists in file-based systems because accessing the data is dependent on layered file structures and structured programming techniques in an environment where ad hoc reporting is typically disallowed. The inability of file-based systems to lower cost and provide flexible access to data led to management's push for greater accessibility and flexibility, which led to the adoption of relational databases. Relational databases eliminate the five limitations of file-based processing by the (1) use of metadata, (2) creation of program-data independence and (3) introduction of a structured query language (SQL) [65] [66].

There are many database system architectures. The most common architectures are networked, hierarchical, relational and object-oriented. Networked and hierarchical databases have a great deal in common and they are considered the first generation of databases. In early database systems, networked and hierarchical architectures organized objects (e.g., objects are entities because entities are defined in measurement science as objects of interest [6]) in a fixed structure based on the primary access patterns. Unfortunately, the rigid nature of a fixed access structure between objects made unforeseen or unorthodox data access patterns extremely expensive in terms of physical resources consumed by the database to resolve the relation. The relational architecture introduced in E. F. Codd's seminal paper on relational databases (RDBMS) [61], contributed to a revolution in database design. Specifically, Codd introduced in the relational model another tier of metadata to networked or hierarchical architectures and by doing so created the second generation of databases. The new metadata introduced was an object called an index. An index is an internally maintained, hence metadata construct, list of pointers to tuples within an object that may be based on a single object or composite object (e.g., view of multiple objects joined by SQL) [67]. Indexes remove some of the structural access limitations from networked and hierarchical databases because there can be multiple indexes on a single object or composite object and they may be readily created or deleted [67]. Unfortunately, RDBMS architecture limits the description of objects by constraining their description to the rules of normalization [68] and this functionally disables the RDBMS architecture from describing real-world objects [69]. Object-oriented databases (OODBMS) remove additional structural access limitations from relational databases by describing real-world objects and providing stored access methods to those objects [70]. However, it is uncertain whether OODBMS architecture will become the third generation database. The uncertainty comes from the introduction of object-relational database systems (ORDBMS) that provide real-world objects through definable relations and methods stored in a database object called an object type [71], such as Oracle's introduction of the Oracle8™ database product In addition to the database architectures described, there are two distributed architectures that can be implemented as coordinating structures in networked, hierarchical, relational or object-oriented databases. These architectures play a distinct role in understanding the issues to be discussed below. The term database management systems (DBMS) is used herein to describe all standalone database architectures as opposed to differentiating them by their specific acronyms (e.g., DBMS, RDBMS, OODBMS and ORDBMS) because the structural access method employed by DBMS is not necessarily relevant.

Relational databases are created and managed by a DBMS. A DBMS application provides (1) a system catalog or data dictionary that stores metadata, (2) a data definition language (DLL) and (3) a data manipulation language (DML) [65] [66]. The metadata stored in a DBMS catalog describes objects in the database (e.g., standard data types) and makes the access of those objects program-data independent. The DLL interface is used to create, alter and delete objects in the database. The DML interface is used to access and manipulate data in the database. The DLL and DML interfaces for relational databases are typically implemented with an American National Standards Institute (ANSI) standard SQL (e.g., which is a non-procedural language) and one or more procedural languages that support embedded SQL [65] [66]. Commercial DBMS architectures are founded on the ANSI-Standards Planning and Requirements Committee (SPARC) three-level approach that consists of external, internal and conceptual levels [65]. The external level describes the part of a database that is related to a specific user. The internal level describes the community level view or what data is stored in the database and the relationship among that data. The conceptual level describes the physical representation of the database or how the data is stored in the physical files at the operating system level. The functional attributes of DBMS systems should consist of at least the eight services qualified by Codd in 1982 [72] and have services to promote data independence and utility services (e.g., utilities like mass import, export and database monitoring tools) [65]:

1. Data storage, retrieval and update capabilities.
2. User accessible catalog.
3. ACID compliant transaction support.
4. Concurrency control services.
5. Recovery services.
6. Authorization services.
7. Support for data communications.
8. Integrity services.

A commercial DBMS, like Oracle8™ or Sybase™, provides all of the eight services mentioned above and more and is analogous to a TP monitor as discussed earlier. There are two significant differences between a commercial DBMS and TP monitor on a discrete system (e.g., single physical platform). First, the data dictionary, program library, context database, application database and resource manager repositories are stored in a single repository or database instance. Second, application components, specifically stored functions and procedures, are stored within a single repository or database instance (e.g., an instantiation of the DBMS). Commercial DBMS are significantly more capable than TP monitors because they support heterogeneous deployment on at least two or more physical platforms [18] [19] [73]. As discussed earlier, TP monitors are constrained to operate on a single platform because the application program, recovery manager, database and resource managers cannot be uncoupled. Perhaps, the simplest implementation of a distributed computing model on a commercial DBMS can be illustrated by the use of the two_task variable in Oracle7™ and Oracle8™ products [18] [19] [74]. The two_task variable enables the executable components of one DBMS to point to another DBMS that may reside on the same or a physically discrete platform. For example, the Oracle Applications™ have executable code that is constrained to a specific version of the DBMS (e.g., Oracle7™); however, newer versions of the DBMS provide enhanced features (e.g., Oracle8™). Through the use of two_task, the application code can execute against one DBMS code tree while the database instance runs against another DBMS code tree that may be on the same physical device or a discrete device to take advantage of the newer DBMS enhanced features [74].

Figure 4:
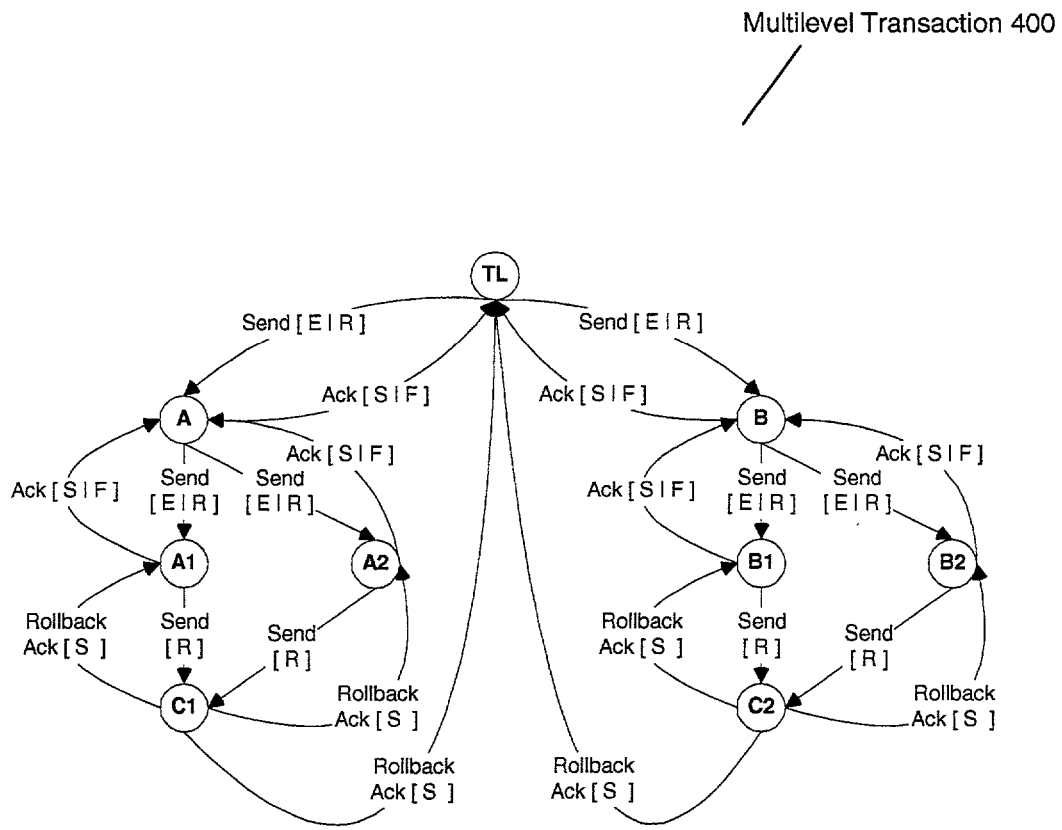
FIG. 4 is a state diagram that depicts a multilevel transaction.

The simple distributed computing model illustrated above is really only a distributed processing model that accesses a centralized database across a network [19]. In fact, the example above of a distributed computing model is an example of an n-tier OLTP transaction processing environment with a bifurcated database server; it does not illustrate a distributed database. A distributed database is a logically interrelated collection of shared data physically distributed across a network; a distributed database management system (DDBMS) is the software system that permits the management of a distributed database [18] [19] [75]. The DDBMS should make the distribution and replication of data transparent to the end-user. A DDBMS application is a complex distributed computing system that enables parallel processing of database transactions; all components of the DDBMS application are tightly coupled and administered by a single administrative authority in a homogeneous environment. DDBMS applications are modeled on the distributed computing model of a single instruction set and multiple data streams (SIMD) that is typically described as an array processor with one instruction unit that fetches an instruction and then commands many data units to carry it out in parallel [76]. ACID transaction compliance in a DDBMS application may be maintained by using a three-phase commit (3PC) protocol. When the DDBMS is on a single discrete device or physical device, the 3PC protocol is equivalent to the multilevel transaction state diagram discussed earlier (see FIG. 4). However, when the DDBMS is on two or more devices, the 3PC protocol is equivalent to either the compound multilevel transaction or compound nested transaction state diagrams discussed earlier (see FIG. 5 and FIG. 6). A DDBMS application is a specialized database system architecture that has specific benefits when used to support OLTP models that have large, resource demanding and frequently executed ACID compliant batch processing requirements because the batch processing transactions can be isolated on one parallel node [18] [19] [75].

The most complex database architecture is a multidatabase or multidatabase management system (MDBMS) [18] [75] that is an analog to multiple instruction sets and multiple data streams (MIMD) distributed systems architecture [19] [76]. A MIMD distributed systems architecture is a group of independent computers where each maintains its own program counter, program and data [76]. MIMD distributed systems can have two types of implementation. First, MIMD can be implemented in a shared memory mode. Second, MIMD can be implemented in a discrete memory mode. The most common MIMD implementation is the discrete memory mode because maintenance of global state memory is too difficult with blocking or non-blocking protocols [45]. Generally, MDBMS applications would adopt a discrete memory mode model whether implemented on homogeneous or heterogeneous platforms because MDBMS applications are implemented above the operating system level and do not have control to enforce shared memory constructs [18] [19] [75] [76]. A MDBMS application is a collection of federated DBMS applications where each federated DBMS application may be a single DBMS or DDBMS [18] [19]. ACID transaction compliance in a MDBMS application is maintained by using a three-phase commit (3PC) protocol. In like manner to the preceding discussion on DDBMS application, the MDBMS 3PC protocol has different behaviors when implemented on a single device versus a set of multiple devices. For example, when the MDBMS is on two or more devices, the 3PC protocol is equivalent to either the compound multilevel transaction or compound nested transaction state diagrams discussed earlier (see FIGS. 5 and 6) [77]. However, when the MDBMS is on one device, the 3PC protocol is equivalent to compound multilevel transaction or compound nested transaction state diagrams discussed earlier (see FIG. 4) provided the RPC state transitions are replaced with internal procedure calls (IPCs) [77] [78]. Notwithstanding the lack of commercial MDBMS environments, the MDBMS architecture on multiple devices is equivalent to the CORBA ORB brokered complex compound transaction across n-tiers discussed previously.

Active Simulation Defined

Internet CORBA OLTP requires new capacity models because of four key capacity modeling problems that set Internet computing apart from traditional Intranet computing solutions. First, the complexity of Internet nodes and network structures creates a dynamic network topology.

Second, Internet-enabled transaction load demands have no definitive or reasonably predictable patterns. Third, database servers in an n-tier computing solution have dynamic resource constraints and performance considerations. Fourth, the ownership and pattern of Internet routing, transaction load and database server resource limitations across an Internet transaction must be treated as unknowns because the Internet is a heterogeneous, discretely administered and loosely coupled system architecture [17] [33]. Therefore, resolution of the Internet's four key capacity modeling problems by traditional mathematical problem resolution is unlikely and if accomplished would be obsolete at its derivation because the inputs are too mutable, disparate and uncertain.

When traditional algorithmic solutions are impossible or too costly in computing time or resources, approximation is used for NP-complete problems. However, some problems cannot be approximated effectively because the problems are too complex. Complex problems that do not have mathematical resolution can be addressed by numeric computer-based simulation [79]. A simulation system falls into one of two categories and they are discrete and continuous simulations. A discrete system is a simulation in which the state variables change only at discrete points in time. A continuous system is a simulation in which the state variables change continuously over time. Also, discrete and continuous simulation categories may be classified as static, dynamic, deterministic or stochastic [79]. Unfortunately, most simulation systems are little more than closed systems and analytical tools for heuristic human decision making. In fact, it is quite common to use simulation tools in the planning and analysis phase of many large, complex projects [79] [80], especially when the project scope is something that has not been done before [81].

The closed system attribute of simulation systems imposes a fixed and defined boundary on both the problem and solution domain (e.g., as discussed later in the distributed artificial intelligent agent section) [82]. Whether a simulation system uses a discrete or continuous simulation model, the problem and solution boundary limits the simulation system to its runtime meta-state. In a discrete simulation system, the runtime meta-state invokes the system, instantiates object types and executes based on a set of possible object events or interactions. A continuous simulation system differs slightly from a discrete simulation in that instantiated object types may morph into any possible object type [83]. Unfortunately, continuous simulation systems typically have runtime behavior that is limited by the simulation system's meta-state, or programming and data structures built or extended from within the programming language and these exclude reflective object constructs [84].

This paper addresses the transaction overhead cost or the frequency of object messaging, transaction recovery and rebroadcast transactions across the Internet. Unfortunately, overhead cost is a complex issue that does not have a single independent or mathematically derivable solution. For example, if the quantum value, or time-out parameter, associated with a transaction acknowledgement message is lengthened, all transactions abate recovery until the longer quantum expires. When all transactions delay recovery due to a lengthened quantum value, limited resources within a CORBA Object Request Broker (ORB) are held too long, recovery processes are delayed and the likelihood of unnecessary event messaging increases. However, selective lengthening of quantum values against specific URL addresses or routing patterns across the Internet can minimize transaction overhead cost by reducing hold times for ORB resources and expediting necessary recovery processes and minimizing rebroadcast messaging events.

A simulation system capable of object reification and persistent meta-object state maintenance defines active simulation [85] [86]. Active simulation provides the means to selectively lengthen or shorten a transaction quantum. An analog to active simulation can be found in the Caltech Infospheres Project that maintains persistent virtual states across multiple temporary sessions in applets running within Java Virtual Machines [7]. However, active simulation must acquire better information continuously to improve its decision making output to reduce virtual transaction states; doing so is dependent on distributed artificial intelligence distributed artificial intelligence agents to acquire, analyze and update the active simulation's persistent meta-object state.

Reflective Objects

Many programs resolve tasks in a static computational domain. However, as programs become more complex and computational demands evolve to include multithreading, distribution, fault tolerance, mobile objects, extended transaction models, persistence and stateless protocols, the nature of programming archetypes must evolve. For example, the hypertext transfer protocol (HTTP) is a stateless protocol and the backbone protocol of the Internet and e-commerce and a protocol that redefines the client-server programming paradigm [87]. Reflective objects are fundamental object-oriented constructs enabling programs to address complex and computationally challenging tasks, such as those mentioned. According to the 1987 seminal work on reflection by Maes, when computation systems can "reason about and act upon themselves" and adjust themselves to changing conditions the computational system is reflective [88].

Program reflection in structural and object-oriented programs requires metaprogramming [88]. Metaprogramming is a programming style that separates functional from non-functional code, effectively separating policy algorithms from functional code and simplifying a program's structure [85] [86] [88]. Functional code is concerned with computations about an application domain and may be classified as base level code. Non-functional code is developed to supervise the execution of the functional code and may be classified as the meta level code. Metaprogramming requires that some aspects of the base level computations be reified. Reification is the process of making something explicit that is normally not part of the language or programming model; reification is necessary to enable non-functional or meta level code [89].

As discussed in Ferber's 1989 paper on computational reflection [89], there are two types of reflection—structural and behavioral. Structural reflection reifies the structural components of a program, like inheritance and data types in object-oriented programming languages [89]. For example, the C++ programming language implements structural reification with Run Time Type Identification (RTTI) by building a meta class to control a number of base classes [84]. Behavioral reflection reifies runtime behavior of functional code computations. For example, runtime behavior is supervised by the meta level, which is triggered into action by an event. When a triggering event occurs, the meta level synchronously suspends base level computation, copies the object type, reifies the behavior of the object, instantiates a new object type with state information from the original object type, and resumes base level computation [89].

Behavioral reflection is described herein in the context of distributed artificial intelligent agents (DAIs). Behavioral reflection is traditionally seen in the computer science venue as modifying behavior based on end-user inputs. However, the literature fails to treat behavioral reflection in artificial intelligence (AI) when the event trigger is external to the AI design scope. For example, in a robotic venue, the robot collects information through predefined sensors and qualifies events as stimuli, which can be compared to end-user inputs. When a stimulus is acknowledged, robots effect an action based on structured programming instructions or an inference from a rule base but the possible reactions and response times are not mutable. However, the mechanisms described herein are based on behavior reflection where response times are mutable by reification and active simulation.

Distributed Artificial Intelligent Agents

Figure 13:
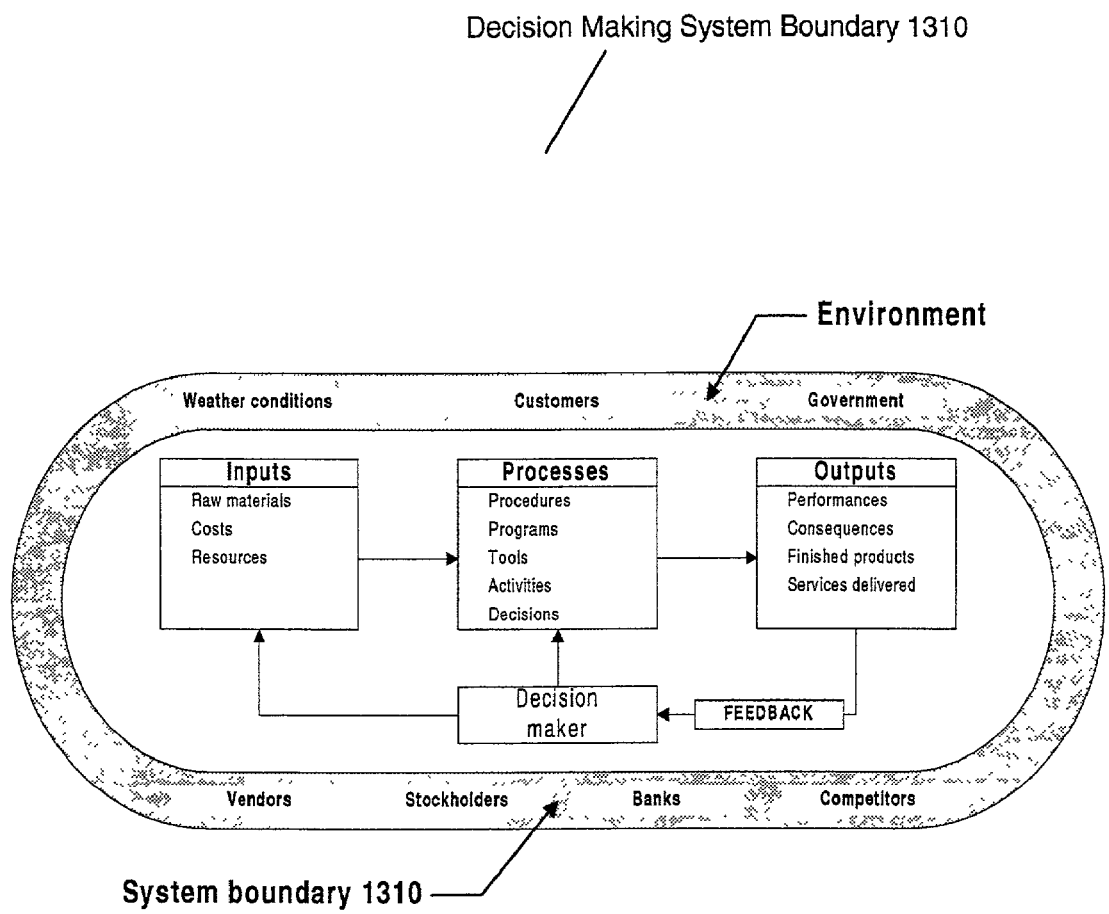
FIG. 13 is a block diagram that illustrates a decision system boundary.

For a knowledge-based system, knowledge system (KS) or artificial intelligent (AI) agent to define itself, it must be enabled to redefine its context or conceptual model [90]. The only problem with such enabling of the knowledge-based system is that when one alters the framework of the conceptual model any number of expert system paradigms must be verified, possibly modified and validated (e.g., rule base and related probability schema of the expert system must be rewritten). The difficulty in a knowledge base redefining itself is highlighted in the illustration of a system and its boundary, which sets the systems' cognitive limits [82]. FIG. 13 is a block diagram that illustrates decision making system boundary 1310.

A boundary defines the context of any system, though in some cases a boundary provides a defined method or interface to alter a system's self-awareness, or context. The means to alter a system's context is typically structured through parameters that determine the attributes of an object's instantiation, especially in the case of simulation models [91]. However, the difference between a simulation model and a knowledge-based system ends abruptly at that point. The former seeks to rationalize a static set of stochastic patterns to identify bottlenecks along an optimized path, while the latter seeks to help determine the optimal path of a decision-making process within a domain. Typically, the context of the domain defines the capabilities of the knowledge-based system and imposes similar static constraints on its ability to deal with unstructured information, or parameters outside of the defined rulebase [90].

The present state of the art fails to provide adequate content to support the implementation of a metamodel within a knowledge based system. What is provided is a series of definitions, or building blocks of ideas, from which inferences can be drawn to build a metamodel for knowledge-based systems. The conundrum of the knowledge acquisition process is based on two premises:
 1. A domain must be defined before knowledge can be decomposed; and
 2. Knowledge cannot be decomposed until the context of its value is defined and validated by a domain definition.

If these premises are true [90], then knowledge-based systems should have extremely finite limits for self-improvement. However, what if there was a (1) metaknowledge model [82] to keep track of context and knowledge decomposition for policy algorithms in a relational repository [92]; and (2) parametric simulation model [91] that facilitated restructure of knowledge-based models by an iterative process of verification and validation of context and rule base [93]. In that case, a metaknowledge model would meet the iterative criteria described by MacLeish's work defining a knowledge-base life-cycle approach [90]. Also, it would provide an environment where a knowledge-based system could dismantle, learn and regenerate itself into a progressively more intelligent software agent.

How a knowledge-based system learns is a challenging paradigm. There are two significant divisions of learning that occur in any knowledge-based system. First, a system must improve its abstract model of the domain reference model. A domain's reference model in the literature is labeled as the internal stream, or model-of-expertise. Second, a system must improve its management of real-world problems by constantly learning from occurrences outside of its domain, or system boundary [82].

Figure 14:
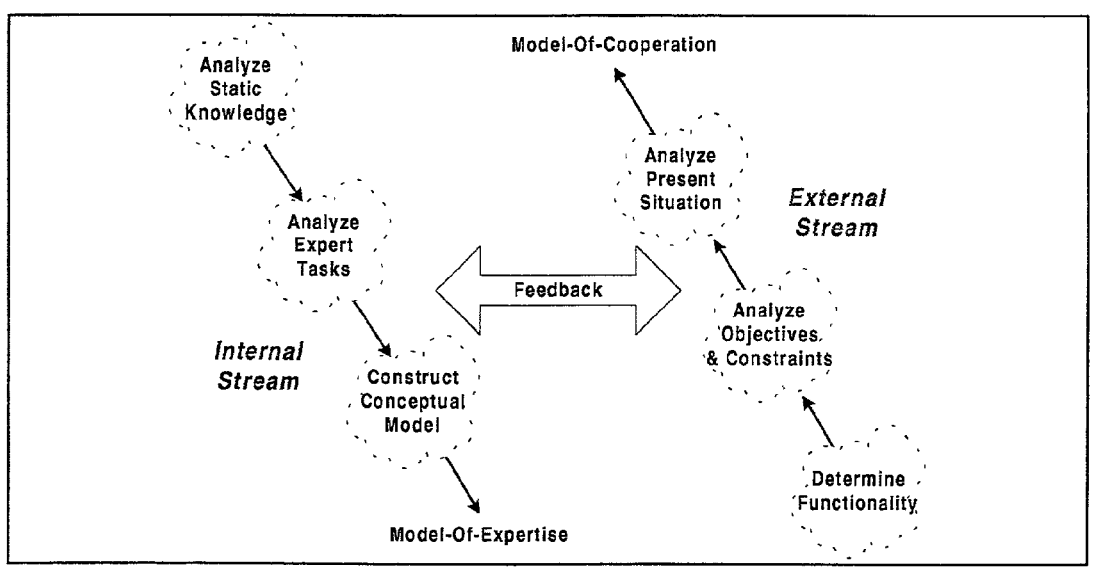
FIG. 14 is a block diagram that illustrates KADS requirement analysis.

Learning outside of the domain can have two aspects, expanding domain definitions and/or altering parameters (e.g., number or type of acceptable arguments or evolving semantics). These are referred to as the external stream, or part of the model-of-cooperation. McManus qualifies and builds on this paradigm by presenting the KADS Requirements Analysis method, evolved by Hickman et al in a paper presented in 1989 [90]. FIG. 14 illustrates KADS requirement analysis as KADS requirement analysis process 1410.

The KADS Requirement Analysis is pivotal to forming a working model of self-learning because it illustrates both the heuristic of learning as well as the evolving spiral method used in most knowledge-engineering development. For example, to analyze expert tasks one must define the objectives and constraints linked to each task. In like manner, the beauty of human learning is that when new objectives or constraints occur humans redefine their reference point by altering their definition, or context, of the problem domain—a heuristic thought process.

The KADS requirement analysis process 1410 (see FIG. 14) has three major context defining layers on the left, labeled as the internal stream; while on the right the external stream represents experience acquisition at each layer. The layers all share the common patterned relationship described between the context and the content. Each area of knowledge expertise can, and most often does, impose a different semantic method and require a unique formalism to represent its context and content, or metaformalism for any artificial intelligence application.

Therefore, in an artificial intelligent (AI) agent context the internal stream needs to be defined for each component knowledge base and the environment will need to have a realistic metamodel. The metamodel will require a metaknowledge base to codify the attributed relationships, semantics and rule-bases governing component definition and attributed relationships within an AI agent. The formalism of the metamodel semantic must include a cross- and self-referencing index between semantic paradigms that may diverge because of a specific heuristic encoding of knowledge-based components [82] [94] [95]. Notwithstanding the time taken to define the metamodel, the external stream activities are highly dependent on the implementation context. Hence, the larger the scope of an artificial agent the more overhead imposed [96]. For example, the feedback mechanism and definitions surrounding event processing are keys to implementing a self-aware knowledge-based system or AI agent.

If the implementation context is wrong when an AI agent is instantiated, self-learning cannot occur because an event violates a metamodel context constraint. However, as with all current computing technology, the system is also capable of triggering an event to get a human to encode and validate the knowledge when the metamodel is incapable of doing so because the metaknowledge base is unable to resolve ambiguity. However, DAI agents do not require human validation of ambiguity when the domains are narrowly defined enough to increase effectiveness and minimize overhead.

Global State Management

Distributed systems must maintain a global state. A distributed system's global state maintains values that create a virtual synchrony across all computers within the distributed system [78]. The most common and accepted communication primitive used in distributed systems is a reliable multicast. In a reliable multicast, if one processor (e.g., in a multiprocessor architecture) or server (e.g., in a multiple computer architecture) receives a message, then every processor or server must receive the message. There are many ways to implement multicast communication primitives. However, the most common implementation is virtual synchrony which is a two-phase commit (2PC) ACID compliant multicast loosely built on the view-based quorum algorithm [78].

MDBMS systems in homogeneous environments will maintain global state much the same as distributed systems [44] [97]. In fact, most commercial DDBMS products use the X/Open DTP reference model as the global coordinator under the hood [97] and implementation of a commercial MDBMS will build upon existing technology. The architecture of an MDBMS calls for write-recoverable 2PC ACID compliant DBMS or DDBMS systems as members of the MDBMS group. However, the MDBMS challenge is that virtual synchrony can only be maintained by adding a global voting step to a 2PC ACID compliant protocol maintained by members of the MDBMS group. Therefore, a three-phase commit (3PC) protocol is necessary to create a virtual synchrony multicast protocol in a loosely coupled DDBMS or MDBMS [77] [98].

Three-Phase Commit (3PC) Protocols

Figure 5:
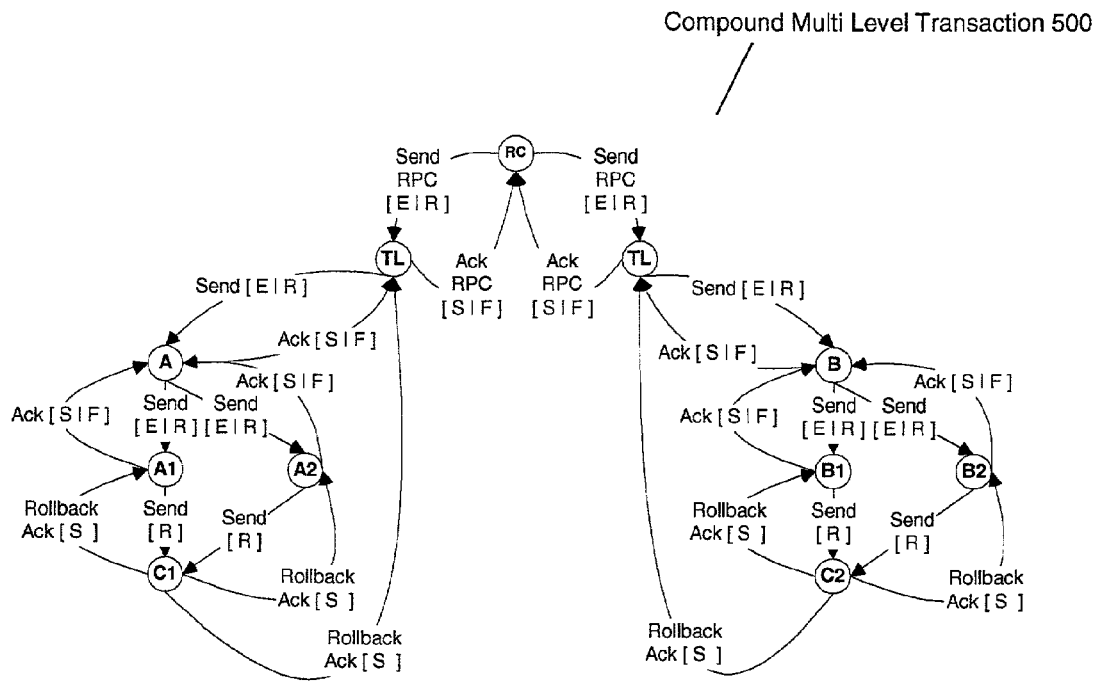
FIG. 5 is a state diagram that depicts a compound multi-level transaction.
Figure 6:
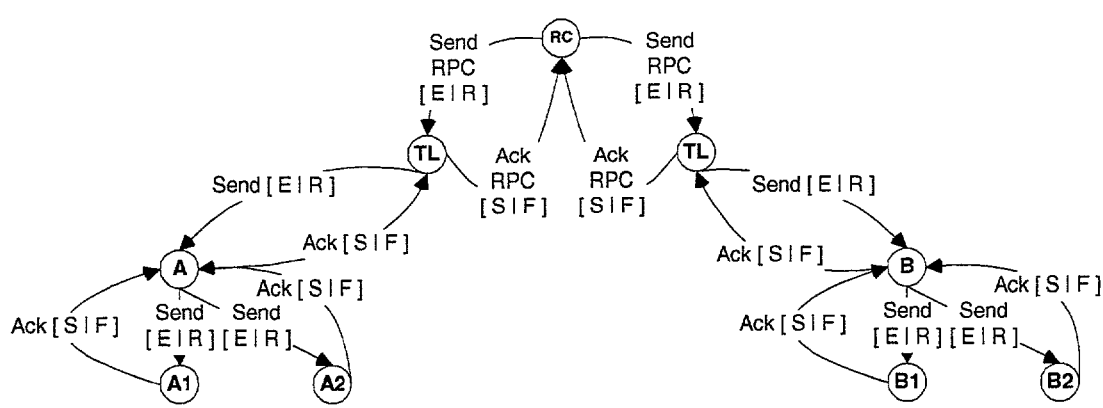
FIG. 6 is a state diagram that depicts a compound nested transaction.
Figure 7:
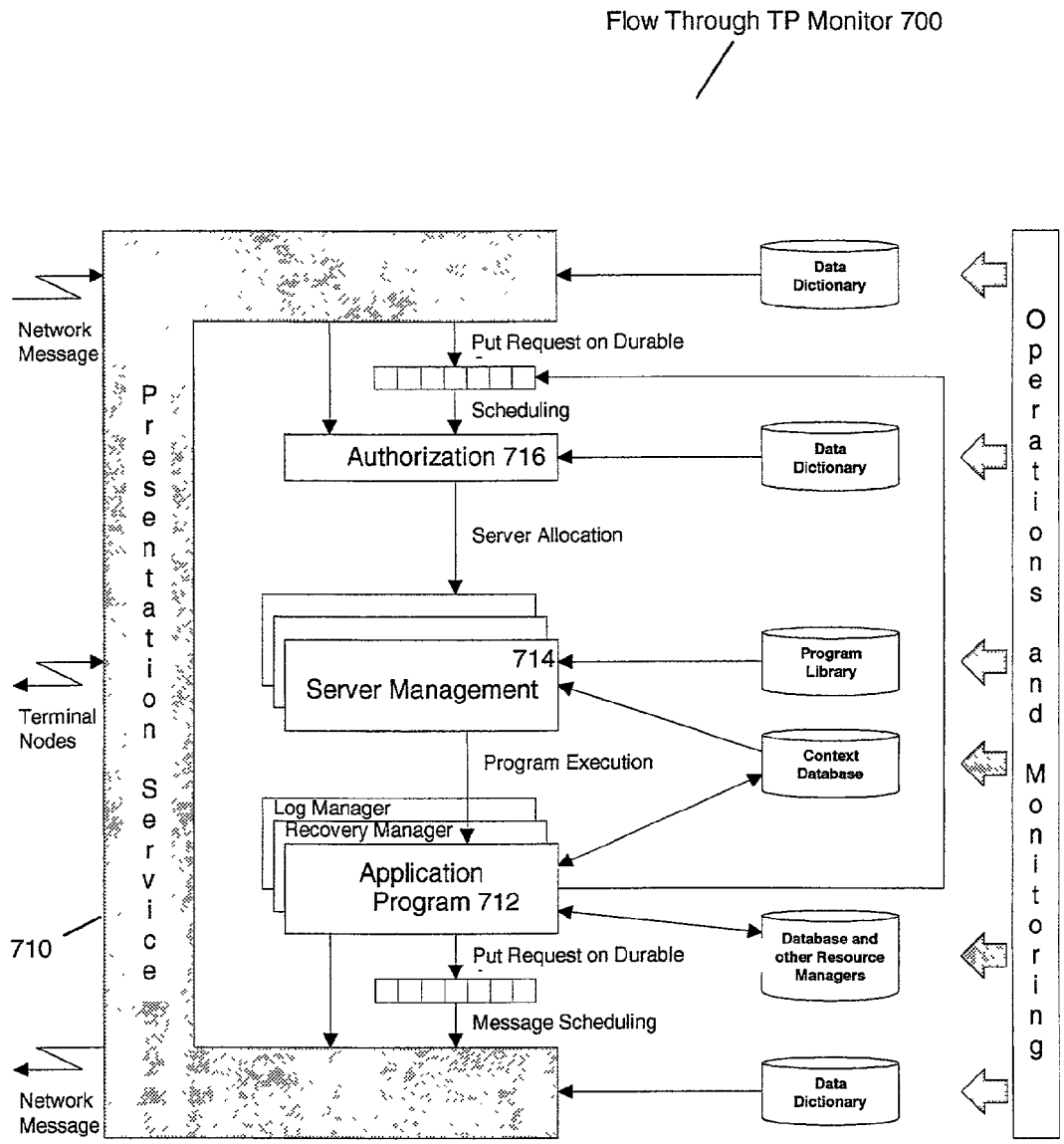
FIG. 7 is a block diagram that depicts a flow through TP monitor components according to Gray and Reuter.
Figure 8:
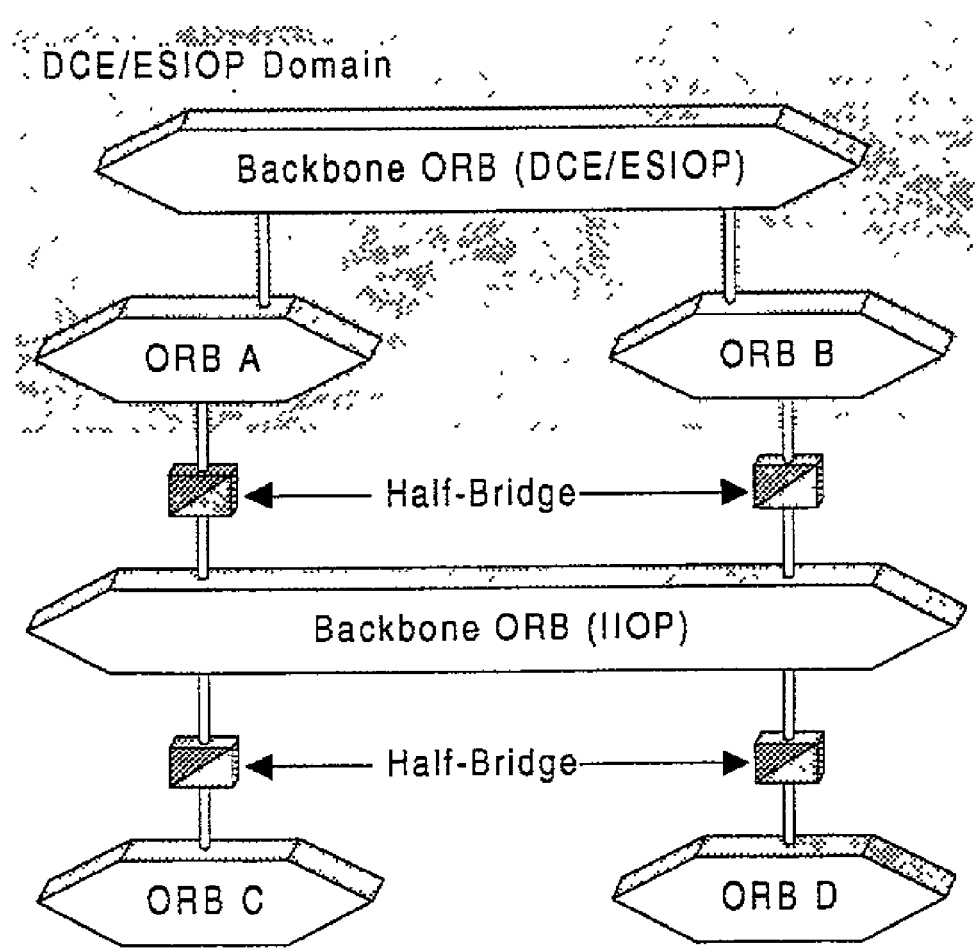
FIG. 8 is a block diagram that depicts a CORBA IIOP architecture.

In the introduction to this specification, complex compound transactions were defined in relation to compound multilevel and nested transaction state diagrams (refer to FIGS. 5 and 6). However, it is important to qualify the details of 2PC and 3PC protocols in distributed transactions. In distributed transactions within homogeneous environments, both the 2PC and 3PC protocols should provide ACID compliant transactions by a non-blocking termination protocol where possible [99] [100] [101]. Termination protocols are unique to distributed systems and manage events when one or more members of a distributed system fail [101] [102]. Non-blocking protocols permit a transaction to terminate at operational sites without waiting for recovery of a failed site(s) [99]. Along with termination protocols, distributed transactions require a recovery protocol to determine how to terminate a transaction that was executing at the time of a global failure [103]. Ideally, the recovery protocol can execute without consulting any other member of the global group as in the FivePacketHandshake protocol [103].

The salient difference between homogeneous and heterogeneous environments is twofold. First, a homogeneous environment may impose a blocking transaction protocol while a heterogeneous environment using a stateless transport protocol, like HTTP, cannot. The inability of heterogeneous environments to use a blocking protocol eliminates 2PC protocols as a CORBA ORB solution because 2PC protocols can only support weak termination. Therefore, 2PC protocols are blocking protocols that cannot work using a stateless transport protocol [99]. Second, a homogeneous environment can guarantee the uniqueness of UIDs but a heterogeneous environment may provide non-unique UIDs, which are necessary to establish the FivePacketHandshake protocol's proof [103]. For example, in a heterogeneous environment, the UID within the context of the ORB is unique to the receiving database server if and only if the node name appended to the UID is unique because any number of ORBs may use the same UID as a unique identifier. Within CORBA, the DCE universal unique identifier (UUID) provides a globally unique identifier for each ORB in lieu of a potentially non-unique node name. The DEC UUID is composed of three components separated by a colon and they are (1) the string "DCE," (2) a printable UUID string and (3) a version number string in decimal format [104]. In illustrations of techniques for performing a complex compound transaction in an ACID compliant manner described herein, it is assumed that (1) resolution of unique transaction UID is based on acceptance of the DCE UUID specification and (2) that use of a 3PC protocol is based on its non-blocking protocol capability.

2 Phase Commit Protocol

Figure 15:
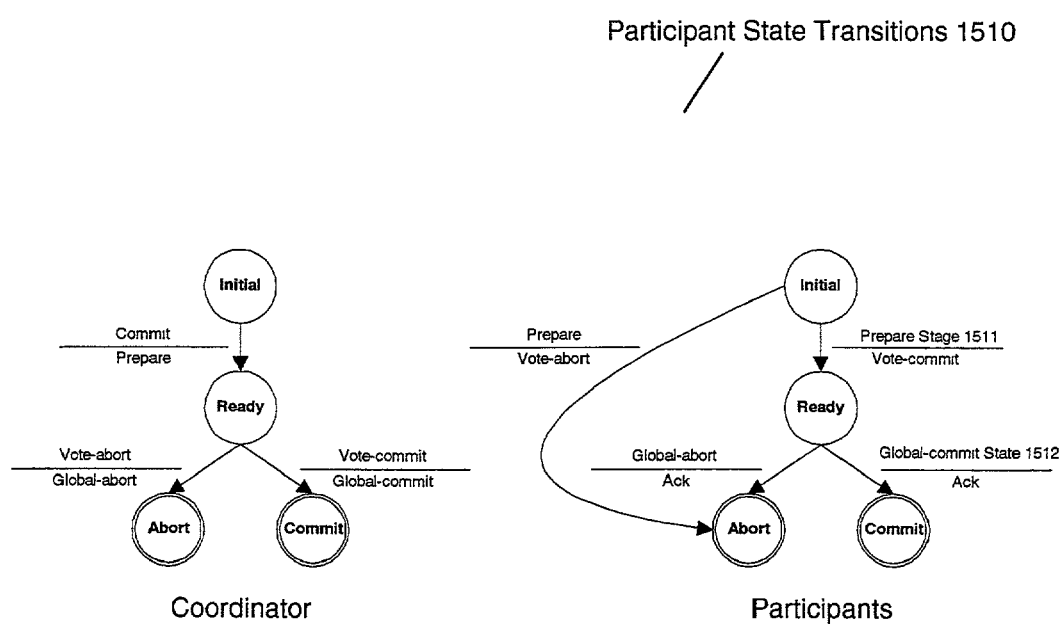
FIG. 15 is a state transition diagram that depicts a blocking 2PC protocol.

Before describing a 3PC protocol, it is necessary to lay a foundation by discussing a 2PC protocol. A 2PC protocol is necessary to provide a multiple user environment with ACID compliant transactions [78]. For example, in a 2PC protocol, a user may change a private data state by executing a pre-commit instruction and then make the change public by executing a commit instruction. In between the pre-commit and commit instructions without an exclusive lock on the data, the altered data-state is isolated from anyone but the user who made the change. If a second user then accesses the data without an exclusive lock before the change is made public and changes the data-state, there are two possibilities. First, if the first user to access and change the data executes a commit instruction before the second user, then the first user's altered data-state will be written as the current data-state. When the second user executes a commit instruction, the change will be disallowed because the original value has changed between the read and write operations—illustrating the consistency property of ACID compliant transactions [10]. Second, likewise to the first, if the second user to access and change the data executes a commit instruction before the first user, then the second user's altered data-state will be written as the current data-state and the first user's committed transaction subsequently rejected because the original value has changed. This anomalous behavior can be eliminated when a user secures an exclusive lock on the data or object such that it then imposes synchronization on the transaction components (e.g., a blocking protocol). For example, the second user must wait for the lock to be removed from the data or object before it can attempt to change the data or object. FIG. 15 is an orthogonal state transition diagram that depicts a blocking 2PC protocol [105].

Figure 16:
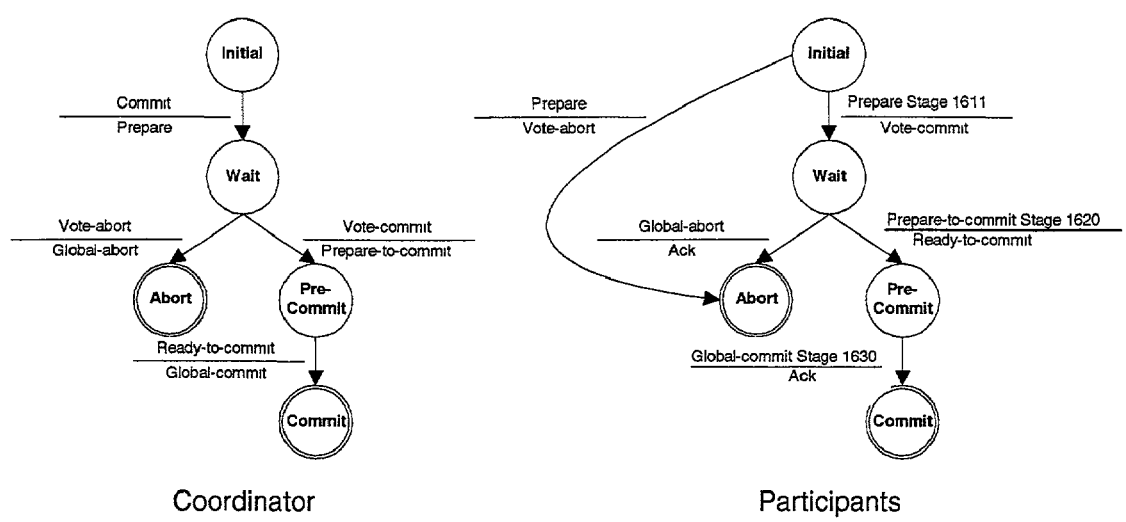
FIG. 16 is a state transition diagram that depicts a 3PC protocol.

The participant state transitions 1510 is a diagram that illustrates a prepare stage 1511 or pre-commit stage and global-commit stage 1512 or commit stage. The diagram fails to illustrate that if one of the participants fails to commit the transaction and at least one of the other servers succeeds by writing the transaction then the servers cease to be write-consistent across the group. At this point in a distributed transaction, manual recovery of the servers is required. FIG. 16 is an orthogonal state transition diagram that depicts a 3PC protocol. Participate state transactions 1610 illustrates stages for a participant in a 3PC protocol. In a 3PC protocol all participants must write the data-state three times. The first write is at prepare stage 1611 when the transaction is written as a local pre-commit global transaction and recorded by the transaction manager or DBMS to a transaction log file. The second write is at the prepare-to-commit stage 1620 when the transaction is written as a local commit global transaction and recorded by the transaction manager or DBMS to a transaction log file. The third write is at the global-commit-stage when the transaction is written as a local global-commit global transaction and recorded by the transaction manager or DBMS to a transaction log file.

Delineating the transaction type as global or local in scope enables the transaction manager or DBMS to judge whether the transaction is complete or incomplete. For example, the combination of a local pre-commit and commit for a local transaction type can be judged as correct to write the transaction to a public state whereas the same combination for a global transaction type would be considered inadequate to do so. Moreover, a global transaction type would require a local pre-commit, commit and global commit in the transaction log before it could be written as the permanent data-state and made public.

The addition of a global transaction type would enable the database server of an n-tier Internet transaction to support a 3PC protocol but it does not guarantee write consistency in a heterogeneous environment. The problem with a 3PC in a heterogeneous environment is that the global-commit transaction may not arrive at or be processed by all remote database servers in the transitory ORB transaction group. If the ORB OTS remote controller or transaction coordinator receives less than an acknowledgement from all participating servers, the transaction coordinator must rollback the transaction by resetting all affected servers to the prior data-state. Unfortunately, as discussed earlier, the data on any server that wrote the permanent state is no longer isolated or atomic. Also, any server that failed to write the permanent state will be forced to rollback temporary data-state to its previous permanent value(s).

Message Oriented Middleware (MOM)

CORBA 2.0 specification uses message-oriented middleware (MOM) and behavioral reflection. The behavioral reflection is used to reify objects that contain altered data on database servers in the context of an ORB complex compound transaction across the Internet and guarantee the isolation property of a nucleated transaction. MOM identifies and releases global transaction data-states.

MOM is a tremendous evolution in the abstraction of distributed messaging. MOM is a loosely coupled CORBA event, which in turn is a loosely coupled RPC. However, MOM is not part of the CORBA 2.0 specification but a planned component of CORBA 3.0 [106]. MOM is implemented in some commercial databases, like Oracle8, where it is a component of advanced queuing [107]. The CORBA model is fundamentally a synchronous request-reply or 2PC blocking protocol. However, CORBA does provide three mechanisms to override the request-reply limitations. The override mechanism are (1) declaring a method to be one way or a datagram, (2) employing the dynamic invocation interface (DII) and (3) using the CORBA event service. Unfortunately, these override mechanisms fall short of what MOM provides. For example, MOM provides the following capabilities:

1. Allows clients to make non-blocking requests through asynchronous requests that do not block the client's execution thread.
2. Allows clients and servers to run at different times which means a client can submit a request to the ORB and the ORB can defer processing to a later time. This processing model is ideally suited to a loosely coupled heterogeneous environment or inter-enterprise transaction.
3. Supports nomadic clients which supports time-independent queued service like the completion of a previously submitted inter-enterprise request.
4. Allows servers to determine when to retrieve messages off their queues and multiple servers can share persistent queues.

HTTP—Hypertext Transport Protocol

The Hypertext Transport Protocol (HTTP) is the by-product of research at the European Particle Physics Lab undertaken to develop a protocol that allows easy sharing information in different formats—like text, images, audio and video. HTTP is a TCP/IP application layer protocol within the context of the Open Systems Interconnection (OSI) model [87] [108]. The OSI model was adopted by the International Standards Organization (ISO) during the late 1970s. The purpose of the OSI model is to define a universal framework for a standard means of communication between different types of computers [109].

Figure 17:
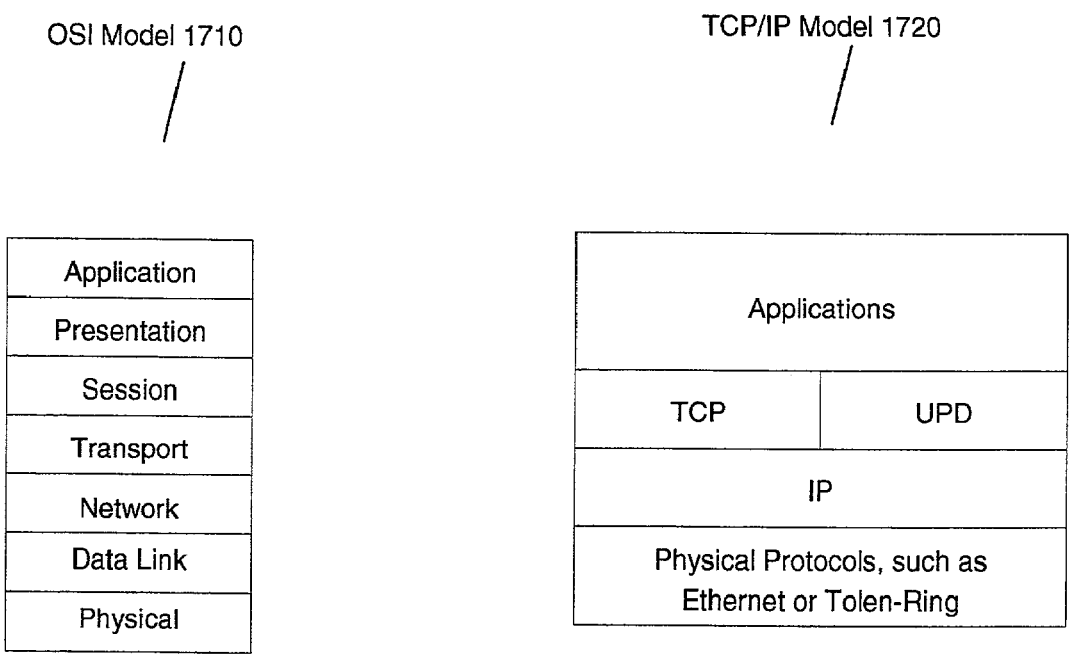
FIG. 17 is a block diagram that depicts the Open Systems Interconnection model and the Transmission Control Protocol/Internet Protocol models.

FIG. 17 is a block diagram that depicts the OSI model and TCP/IP model as OSI Model 1710 and TCP/IP Model 1720. The OSI model is composed of seven layers while the TCP/IP architecture contains only four layers (see FIG. 17) [108].

In comparing OSI to TCP/IP, the clearest difference is that the OSI application, presentation and session layers are collapsed into a single TCP/IP application layer [108]. The HTTP is a TCP/IP application layer protocol and as such delivers OSI application, presentation and session functionality in a single protocol layer [87]. For clarity, the definition of the OSI application, presentation and session layers are now briefly reviewed. The OSI session layer provides connection services, such as establishing and maintaining a session across a network. The OSI presentation layer relates to the way data is represented on the computer. The OSI application layer includes user programs, such as mail, file transfer or messaging.

The HTTP protocol is a simple protocol and has four basic characteristics that are important to understand in context to the TCP/IP application protocol. The defining characteristics of HTTP are [87]:

1. It is easy to implement—with a minimal HTTP server requiring approximately a few hundred lines of C programming code.
2. It is stateless—the server maintains no information about previous client activity other than basic logging information.
3. It is transient—with each request being made on a different network connection (i.e., at least according to the standard).
4. It is content neutral—the HTTP server does not need to maintain knowledge about the material (i.e., text, image, audio or video) that it is serving.

The implementation ease, transience and content neutrality of HTTP pose no challenges to transaction processing and are relatively speaking transparent with other networking transport protocols. However, the stateless nature of HTTP does pose challenges to transaction processing across a network. The challenges posed to transaction processing have previously been discussed in the transaction processing concepts section. However, it is appropriate to briefly recall one of the salient differences between homogeneous and heterogeneous environments like the Internet. A homogeneous environment may impose a blocking transaction protocol while a heterogeneous environment using a stateless transport protocol, like HTTP, cannot. The inability of heterogeneous environments to use a blocking protocol eliminates conventional implementations of 2PC protocols as an ACID compliant transaction processing solution [99]. However, as discussed in the Background section in Chapter Two, current CORBA ORB design relies on the X/Open DTP reference model which is based on a 2PC protocol [33] [44]. Therefore, it is necessary to resolve the properties of an ACID compliant transaction processing.

A Stateless Protocol

HTTP transactions consist of a client request to a server and server response to a client request in a single channel environment [87]. This single channel communication process is different from other protocols that have two channels open between client and server, like the File Transfer Protocol (FTP) [87] [110]. For example, FTP transactions use one channel to execute control commands, like put or get, and a second channel to communicate content, like a file or directory listing. The formal details of the HTTP request/response protocol are in RFC 1945 by Tim Berners-Lee, et al [87]. While, a complete review of the protocol is not necessary, a review of the general architecture is useful to understanding the single channel nature of HTTP.

HTTP supports two generalized command structures or methods; they are get and post within a uniform resource locator (URL). The get method is used for simple queries when the request information appended to the URL is less than 255 characters in length. The request information is a series of parameters appended to the uniform resource identifier (URI) and is composed of three parts. First, the executable CGI script or program. Second, a question mark that acts as a delimiter between the name of the CGI script and the parameters passed to the script. Third, the parameters passed to the CGI script. When the request information is greater than 254 characters in length, the post method may be used. The post method functions very much like the get method except that the parameters are passed via the standard in (STDIN) or standard out (STDOUT) arguments. The generalized structure of a URL request is:

http://{{username}{:password}@}host{:port}uniform_resource_identifier

The URL may request a static HTML page or request execution of a stored program on the target host computer. Stored programs using CGI may be written in C, C++, Java, Perl or PL/SQL. When the URL is requesting a program unit like a CGI script, the events below occur in each request [87]:

1. The web server spawns a new process.
2. The server then sets several environment variables.
3. The server invokes the main entry point function of the executable.
4. If called by a post request, the server passes the additional content to the script by standard input; otherwise, this step is skipped by a get request.
5. The invoked executable runs and writes the results to be returned to the user to standard output.
6. The server receives results back from the user code through standard output.
7. The server returns the results back to the browser.

In the HTTP 1.0 specification, after the server returns the results back to the browser the connection between the client browser and ORB is terminated. However, the draft HTTP 1.1 specification changes the behavior by extending the stateless protocol to one of limited duration that may span multiple single channel requests between the client and server. Unfortunately, the proposed extension of the specification is limited to transactions between a single client and server as opposed to complex compound transactions described herein. Therefor there is need for ACID compliance transactions for compound transactions that involve interaction between clients and a server using HTTP 1.0 specification and cookies.

Persistent State in a Stateless Protocol

The statelessness of HTTP limits the capability of developing robust n-tier computing solutions that support ACID compliant transactions. For example, the basic transaction model between a client browser, ORB and application server fails without some mechanism to preserve a distributed persistent state. As discussed in Chapter Two, the X/Open DTP reference model provides a means through the TX protocol to have a distributed transaction across the Internet or stateless HTTP. The TX protocol provides a message-oriented persistent state across HTTP by use of specially encoded URL values or cookies [111]. A cookie is basically a set of name and value pairs (e.g., a pair has the following context, "name=value") that is associated with a specific domain and optionally a specific realm within that domain. The concept of a cookie to preserve state information across a stateless HTTP originated with Netscape's Navigator™ Version 2.0 and is documented in RFC 2109 as an HTTP state management system [111]. RFC 2109 qualifies how web browsers implement cookies with at least the following minimal control [111]:

1. The ability to completely disable sending and saving cookies.
2. An indication as to whether the cookies are in use and preferably with a visual queue to the browser user.
3. A means of specifying a set of domains for which cookies should or should not be saved.

A cookie is an ASCII text file that a web server can pass into a user's instance at the beginning of a transaction. The cookie contains name and value pairs that are defined within the HTTP. Examples of which are: expires=time, domain=domain_name and path=control_program_directory. Cookies may be marked as secure but secure cookies can only be transmitted over connections running through a Secure Socket Layer (SSL) as discussed in the Introduction in Chapter One. Cookies are a robust addition to HTTP and provide some interesting security and privacy issues because they can remove the anonymity of transactions.

The question raised by the X/Open DTP reference model, is whether they provide fault tolerant and recoverable transaction states across the stateless HTTP or stateless Hypertext Transfer Protocol Secured (HTTPS). Provided the ORB does not suffer a global failure, encoded URLs and cookies do provide fault tolerant and recoverable transaction states between an ORB and single application server. In the context of an ORB-brokered transaction, a global failure occurs when the ORB and its persistent storage are lost before a transaction can complete or rollback and the encoded URL or cookie is permanently lost and non-recoverable. Catastrophic machine failure or global failure is rare and therefore not discussed herein in great detail. However, the transaction architectures discussed and introduced for performing complex compound transactions across dynamically bound independent heterogeneous, discretely administered and loosely coupled systems herein are ACID compliant in the event of a catastrophic machine failure because control is asynchronously distributed.

The X/Open DTP reference model, encoded URLs and cookies fail to provide fault tolerant and recoverable. The inability to vouchsafe a distributed ORB-brokered transaction exists because of two key points. First, the threads of control discussed earlier are distinct processes as opposed to threads of control within a single process [41]. Second, the X/Open DTP reference model supports a non-blocking protocol or weak termination that allows discrete operational sites to recover without waiting for explicit global recovery instructions [100]. A 3PC protocol is later described here that is ACID compliant across a stateless protocol and capable of managing distributed transaction states.

Transactions Across a Stateless Protocol

An ACID compliant transaction across a stateless protocol employs multi-tiered transaction architecture, fault tolerant containment, termination transaction control and complex compound transaction recoverability. Before describing the architectural structure of an ACID compliant complex compound transactions across dynamically bound independent heterogeneous, discretely administered and loosely coupled systems using HTTP, it is necessary to describe the ACID compliant transaction architecture between a single ORB and application server. A 3PC protocol may be used to implement an ACID compliant transaction when a distributed system does not support synchronization or a blocking protocol between nodes [99]. However, the 2PC protocol can only work to support peer-to-peer transactions between two physical machines. Transaction protocols have two components. First, there is the transaction coordinator that originates and manages the transaction state transitions. Second, there is the transaction participant(s) that is an agent or collection of agents that act in response to messages from the transaction coordinator (see FIG. 16).

A 2PC and 3PC transaction architecture will be labeled as a multi-tiered transaction architecture, where a multi-tiered transaction architecture is a transaction architecture with at least two transaction levels. The transaction levels are the macro and micro levels. Examples of the macro transaction or logical level are documented in the discussion of 2PC and 3PC protocols and their respective orthogonal state transition diagrams in FIG. 15 and FIG. 16. The 2PC and 3PC protocol state transition diagrams depict controller and participant transaction states, transitions and relationships. Specifically, transaction states are points in time where an object possesses certain conditions or properties and transitions between transaction states are composed of one or more events and each event may trigger an action. Actions triggered by events may be another event in the same state diagram or in another related state diagram. Orthogonal state transition diagrams are used to depict the interwoven dependencies between two state diagrams or more specifically to visually depict how actions in one become events in the other and vice versa [1±12]. Orthogonal state transition diagrams are also used to depict synchronicity between two or more processes or threads of execution [112] [113]. On the other hand, the micro transaction level represents the mechanical implementation details of how actions and events function. The micro-level transaction level is often left as implementation details and not captured in the state diagram [113]. The need to telescope to the physical-level of the transaction processing protocols requires that a Uniform Modeling Language (UML) sequence diagram qualify the micro-level of the 2PC and 3PC transaction protocols [114] [115].

Figure 18A:
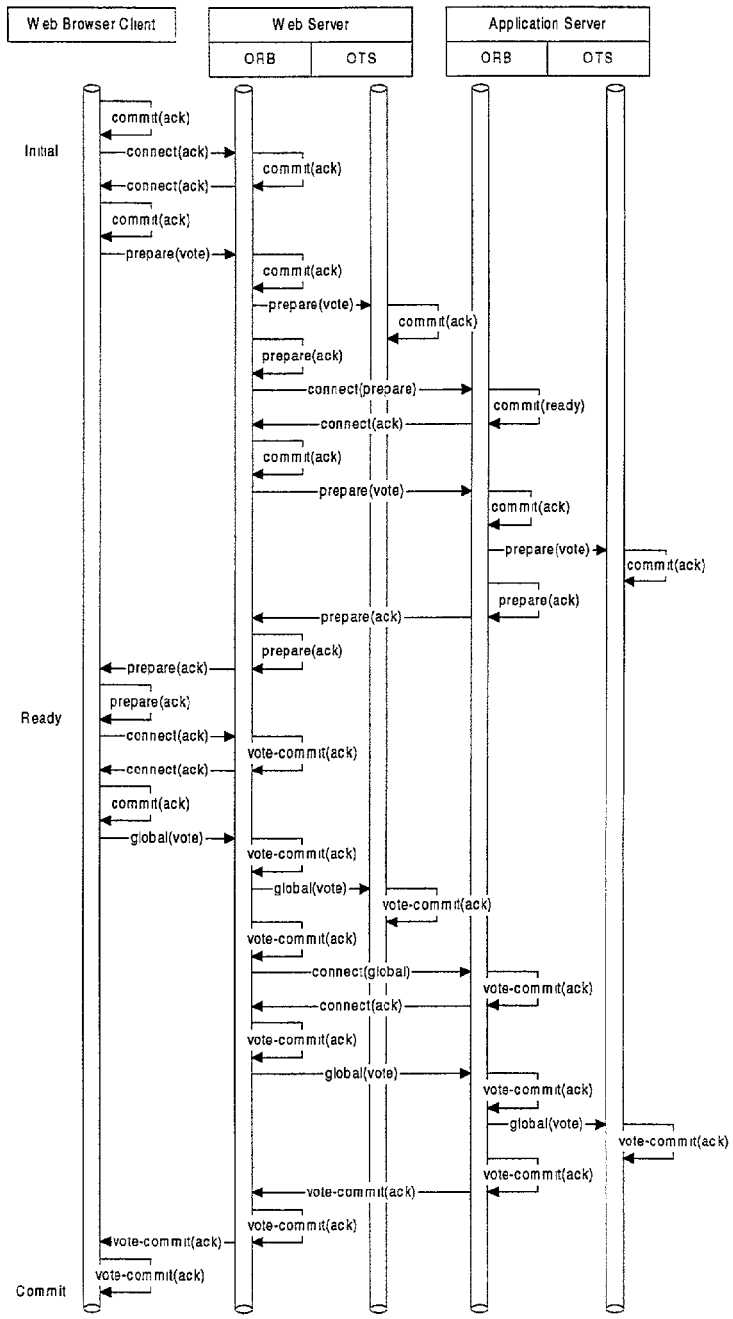
FIG. 18A is a diagram that depicts a successful outcome path of a flat transaction using a 2PC protocol.

The reason for delineating a clear-cut bifurcation between the state and events/actions will be qualified when techniques for ACID compliant transactions across a stateless protocol are described in greater detail. The ACID compliant complex compound transaction across HTTP will be illustrated with an UML sequence diagram. In this section, an UML sequence diagram will illustrate method and tool use between a web browser, web server and single application server. Moreover, the demarcation between the macro and micro transaction levels deserves qualification. The principal reason for separating these is to emphasize the nature of distributed asynchronous control when distributed transaction states are not maintained by a persistent network connection. Structuring an ACID compliant transaction across HTTP may be based upon the following. First, the transaction state is preserved as a persistent object on the web browser client, web server or ORB and application server. Second, the transaction has a single starting point with two possible termination outcomes—success or failure. For example, referring to FIG. 18A, UML sequence 1810 reflects the successful outcome path of a flat transaction using a 2PC protocol across HTTP and assumes any error condition triggers a rollback of all components of the transaction on all participating devices, as if the transaction never began.

The UML sequence 1810 depicts a flat transaction between a web browser client and application server through an intermediary CORBA ORB web server across HTTP. In the UML sequence 1810 there are three states represented on the left-hand side of the web browser client post. The three states correspond to the successful transaction states represented in the orthogonal state transition diagram for 2PC protocol (see FIG. 15). The transaction abort-state from the state diagram is not represented in the UML sequence diagram explicitly. However, the abort-state is implicitly represented as a conditional argument of the vote-commit (ack) function. For example, if the transaction is a success throughout, then the transmitted acknowledgement (e.g., ack is an acronym for acknowledgement) is an argument or token that indicates success. On the other hand, if the transaction is a failure at any point, then the transmitted acknowledgement is a failure. Hence, at the bottom of the web browser client post, the vote-commit(ack) will reverse any temporary states and return a failure code in some meaningful message to the end-user. Actually, in the example of a 2PC protocol, the prepare(ack) and vote-commit(ack) act to either confirm success and advance the transaction to completion or confirm failure and undo any previously completed components of the transaction.

It is important to review the mechanics of the UML sequence 1810 to lay a foundation for subsequent discussion of a write consistent and recoverable transaction protocol that does not encroach on the security and integrity of dynamically bound independent heterogeneous, discretely administered and loosely coupled systems. For example, beginning at the top-left of the UML sequence diagram at the initial-state, the transaction executes a series of actions and culminates at the lower-left of the UML sequence diagram with the commit-state. While the UML sequence diagram is a 2PC protocol, the step of writing the transaction to persistent storage within the web server OTS is optional; however, as will be shown later, the web server OTS must maintain persistent state to vouchsafe n-tier complex compound transactions. A detail of the activities represented in the UML sequence diagram follows:

1. The web browser client initializes a transaction state.
2. The web browser client transmits a URL request to establish a connection with a web server ORB.
3. The web server ORB receives the request and writes a local transaction cookie.
4. The web server ORB sends a successful message receipt token as an acknowledgment to the web browser client and an HTTP transaction cookie.
5. The web browser client writes a local transaction cookie.
6. The web browser sends a second URL with the content of the transaction and instructions to execute the transaction.
7. The web server ORB receives the request and writes the encoded information from the URL to the local transaction cookie.
8. The web server ORB spawns an internal process to write the data to persistent storage via the OTS and maintains an active session until receipt of a transaction status token (e.g., this is the prepare(vote) function shown in FIG. 18A).
9. The web server OTS writes the transaction to persistent storage and acknowledges the write transaction status token to the internal process call spawned by the web browser ORB. This may also include a write to a local database repository.
10. The web server ORB updates the local cookie after receiving the acknowledgment write transaction from the OTS process (e.g., this is the prepare(ack) shown function in FIG. 18A).
11. The web server ORB transmits a URL request to establish a connection with an application server ORB.
12. The application server ORB receives the request and writes a local transaction cookie.
13. The application server ORB sends a successful message receipt token as an acknowledgment to the web server ORB and an HTTP transaction cookie.
14. The web server ORB writes a local transaction cookie.
15. The web server ORB sends a second URL with the content of the transaction and instructions to execute the transaction.
16. The application server ORB receives the request and writes the encoded information from the URL to the local transaction cookie.
17. The application server ORB spawns an internal process to write the data to persistent storage via the OTS and maintains an active session until receipt of a transaction status token (e.g., this is the prepare(vote) function in UML Sequence 1810).
18. The application server OTS writes the transaction to persistent storage and acknowledges the write transaction status token to the internal process call spawned by the web browser ORB. This may also include a write to a local database repository.
19. The application server ORB updates the local cookie after receiving the acknowledgment write transaction from the OTS process (e.g., this is the prepare(ack) function in UML Sequence 1810).
20. The application server ORB transmits a URL transaction status token to the web server ORB.
21. The web server ORB writes the transaction status token to the local cookie.
22. The web server ORB transmits a URL transaction status token to the web browser client.
23. The web browser client writes to the local cookie and then begins the second phase of the 2PC commit.
24. The sequence of function calls and messaging at this point is a mirror image of those noted above in steps 21 to 23; if the second set of functions and messages succeed, then the end-user receives a dialog box that acknowledges the completion of the transaction. However, if a failure occurs in the pre-commit or commit cycle, the end-user receives a dialog box that the transaction failed.

Outwardly, the 2PC described above protocol appears capable of delivering an ACID compliant transactions across HTTP. Unfortunately, as discussed earlier in Chapter One the potential failure point of distributed transactions is the isolation property of ACID compliance. The 2PC protocol does provide a viable ACID compliant transaction on two conditions. First, if the OTS writes to a persistent data repository that cannot be altered by other users between the initial write and when the data is confirmed as complete, then the isolation property is maintained and the transaction is ACID compliant. Second, if the TCP/IP application protocol is not a stateless HTTP, then the isolation property is met provided that the data repository does not exercise implicit rollback and commit when communication sessions are abnormally terminated [12]. Unfortunately, all commercial databases exercise some algorithmic resolution of terminated-connections but they also support ANSI 92 save points that determine where the implicit commit should start. Hence, a remote connection across a state-aware connection protocol combined with good database coding practices can ensure ACID compliance with a 2PC protocol between a web browser client, web server ORB, like an Oracle Applications Form Cartridge, and application server.

Therefore, the 2PC protocol can support an ACID transaction between two physical machines across HTTP provided transaction isolation can be maintained. The multi-tiered transaction architecture is composed of a macro and micro level as described above and contains two transaction control levels. One transaction control level is represented in the UML sequence 1810, and it is the transaction state management control level. Moreover, the transaction state management control level writes changes in the transaction states to implementation specific structures that maintain the physical transaction events/actions and ensures the integrity of the logical transaction states—initial, ready and commit. The ownership of this transaction control level is distributed across the n-tiers involved in the distributed transaction because the transaction state management control level is a message-based global distributed state management system confined to a transaction context, where the transaction context is defined by CORBA ORB and HTTP specifications.

The other transaction control level has not been previously discussed. However, the transaction control level is implicitly presented in the UML sequence 1810 as a commit (ack) on the web server OTS and application server OTS posts. The transaction control for this function is typically owned by the file management or database management system employed as a persistent data repository. For example, if the persistent storage repository is an Oracle8™ database, then the commit(ack) is a distinctly separate 2PC protocol that records the transaction in one or more objects in a database. Unfortunately, once Oracle8™ has written the transaction, the transaction data-state is no longer isolated and the isolation property of ACID compliant transactions is violated. The separation of transaction control level from transaction state management control level is the key constraint to creating an ACID compliant transaction across HTTP. However, a 2PC protocol between a web browser client, web server and single application server is ACID compliant at the transaction state management control level independent of whether the transaction control is ACID compliant.

Figure 18B:
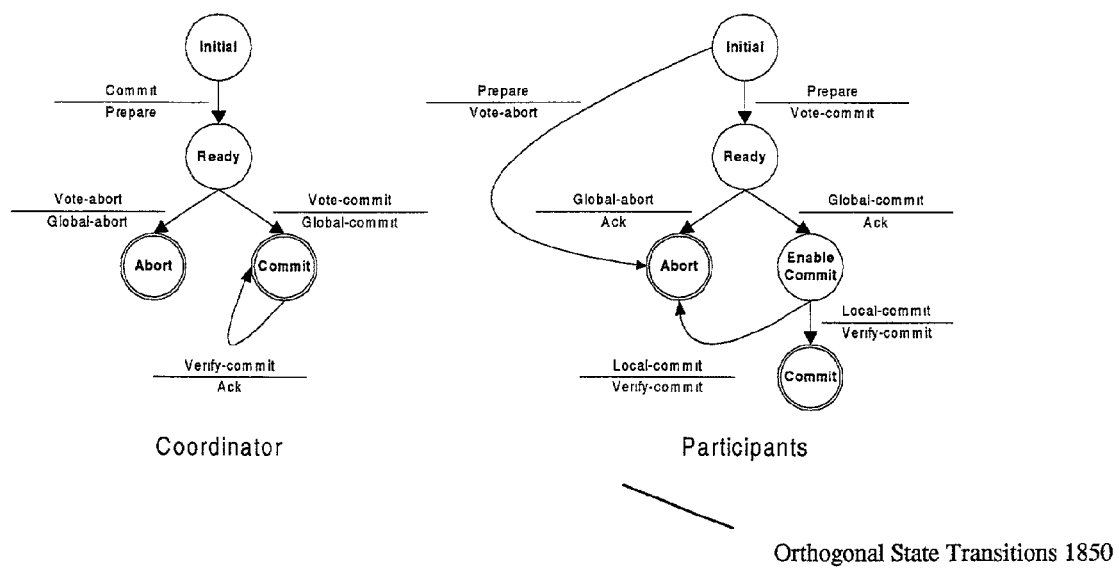
FIG. 18B is a diagram that depicts state transitions of a callback enabled 2PC protocol that may be used to implement transaction control that is ACID compliant.

FIG. 18B is a diagram that depicts orthogonal state transitions 1850 of a callback enabled 2PC protocol that may be used to implement transaction control that is ACID compliant. The callback enabled 2PC protocol may be implemented on a Oracle8™ persistent storage repository. The ACID compliance problems of the X/Open DTP reference model is resolved, at least in part, by migrating leaf node commitment to a dependency on the original server and the coordinator node through a leaf node database trigger. When a transaction on the database ends without an explicit commit, it surrenders control to the database trigger that then determines requirements to implicitly commit or rollback changes.

It should be noted that the transaction control level depicted in the orthogonal state diagram (FIG. 18B) has wide application, and, in particular, may be applied to a distributed operating system with a loosely coupled parallel processing architecture. A loosely coupled parallel processing architecture can be described as independent processors, typically with their own operating systems, working together to solve a problem, like Beowulf systems. This architecture is notably different from a tightly coupled parallel processing architecture often called shared-memory parallel processing, where independent processors work on the same copy of the data.

Multitiered ACID Compliant Transaction Architecture

This next section presents a multi-tiered complex compound ACID compliant transaction across HTTP where the data repository is a standard database management system, like Oracle8™. Further, the next section resolves the isolation property of ACID compliant transactions across a standard HTTP connection between a web browser, web server and application server and extends the architecture discussion to a complex compound transaction.

The multi-tiered transaction architecture section will present the foundation of an ACID compliant transaction architecture across HTTP. The ACID Compliant Transaction section will resolve the atomicity, isolation, consistency and durability properties of ACID compliant complex compound transactions across a standard HTTP between a web browser, web server and multiple application servers.

ACID Compliant Transaction Architecture

The previous discussion of ACID compliant transactions using a stateless protocol established that a 2PC protocol between a web browser client, web server and single application server is ACID compliant at the transaction state management control level independent of whether the transaction control is ACID compliant. The importance of a viable 2 PC protocol for transaction state management across HTTP is that the CORBA specification and X/Open DTP reference model can be used to deliver an ACID compliant transaction between one web browser and web server or web server and application server [16] [39].

However, as noted, the unresolved problem is that when the transaction has been written to the OTS persistent data repository, the transaction data-state is no longer isolated and the isolation property of ACID compliant transactions is violated. Therefore, before discussing the consistent and durable properties of complex compound transactions, it is necessary to structure a transaction architecture that can maintain isolation using a 2PC protocol across HTTP between two physical state machines. The ACID compliant architecture is demonstrated using Oracle Application Server (OAS) and Oracle8™ as the OTS persistent data repository, though many file management systems and databases could equally serve to deliver equivalent functionality.

The key to achieving stateless transaction integrity in an object relational database management system (ORDBMS) like Oracle8™ is not immediately obvious in general or to experienced database architects and developers. A stateless transaction may be achieved by writing a persistent state that does not alter the data while preventing modification of data by other users until the distributed transaction completes or fails. Oracle8™ offers a very powerful data structure that simplifies the development of this type of transaction architecture called an object type. For example, an Oracle8™ object type may contain an interface, procedural code and one or more interfaces or methods to repository objects where data is persistently stored. The UML sequence 1810 qualifies how a 2PC based transaction works but fails to highlight the transitory nature of an HTTP database session [116]. For example, the prepare(ack) and vote-commit(ack) may be an IPC or RPC transaction dependent on whether or not the web server is on the same physical platform as the OTS (e.g., Oracle8™ database); however, in either case, the database session is invoked, used to write the change and after successfully writing the change is broken. The nature of a transitory database session is that the written change instantly becomes available to any other user with access to the system. In the case of the vote-commit(ack) connection, the behavior is the desired outcome. However, in the case of the prepare(ack) connection, the behavior violates the isolation property of ACID compliant transactions because the transaction is only at the pre-commit phase of the 2PC protocol.

The nature of most commercial databases, and Oracle8™ is no exception, is to write the change either during or at the end of a database session. Moreover, the ACID compliant transaction architecture takes advantage of this behavior to guarantee the isolation property of ACID compliant transactions by introducing the following:

1. An object type at the web and application server that manages transactions through a standard interface and eight member methods (e.g., three functions and five procedures).
2. An additional attribute to each object repository potentially alterable by web-enabled transactions or web-enabled distributed transactions.
3. A transaction object repository for the web and application Oracle8™ OTS repositories.
4. A set of supporting object types and supporting database objects, like sequences, PL/SQL collections and common lookups tables.

An ACID compliant transaction architecture built with the components noted above supports an ACID compliant transaction between (1) a single web browser client and web server or web and application server, and (2) a single web browser client, web server and two or more application servers in a complex compound transaction. An illustration of several techniques of the ACID compliant transaction architecture follow. The first illustration shows how the transaction architecture may be used to provide an ACID compliant transaction between a single web browser, web server and application server. In particular, the logical components—web browser, web server and application server—of the ACID compliant transaction architecture solution will be described and then a technique to guarantee isolation in an ACID compliant complex compound transaction.

Web Browser Interface

The web browser interface is straightforward and requires three components. First, the web browser may be either at least Netscape 4.0 or Internet Explorer 4.0. Second, the browser must have a valid Intranet or Internet connection. Third, the web browser interface must marshal the queried values into a structure shown and then execute an initial_transaction method call to an instance of the web_transactions object. FIG. 19 is a table containing a definition of the Web-transactions initial transactions procedure. The execution of an initial_transaction method is a remote method invocation (RMI) of a distributed object and requires a constructor within the web browser interface. In the method call below, most attributes should be intuitive except the attribute and destination data types. These are collection data types or index-by tables within Oracle8™ and as such they are collections of one or more standard scalar data types.

Collections in the PL/SQL programming language can be of two types. First, a collection may be an index-by table type that is like an array in most 3GL programming languages with two exceptions—a PL/SQL index-by table is unbounded and may have non-consecutive subscripts [117]. Second, a collection may be a varray type that is equivalent to an array in most 3GL programming languages—a varray is bounded and must have consecutive subscripts [117]. A collection in the PL/SQL programming language is a close corollary to a container class in the C++ programming language [117] [118]. The collections used in the web_transactions object initial_transaction method are critical structures for abstracting the complexity of transactions and making a transactions structure generic. However, the collections used in the web_transactions object are a hybrid index-by table called a nested table. Nested tables differ in that they enable direct access to their elements through data manipulation language (DML) commands—select, insert, update and delete.

The web_transactions object initial_transaction method interface can support calls to select, update, insert or delete records from objects that have different defining attributes. Moreover, that is to say that the target object of the initial_transaction method may have (1) a different number of attributes and (2) the attributes may have different data types in the SQL insert and update predicates and an unbounded set of SQL where predicate conditions. The SQL where predicate conditions may be used in insert, update and delete SQL statements. Also, the initial_transaction method supports multiple destinations URL which enables it to support complex compound transactions provided the same RMI and container classes may be used at all sites. The web_transactions.initial_transaction RMI is the same when a single set of the container classes can be used in transactions at all sites participating in the transaction and all object names and attributes are the same across sites. A more comprehensive object type that supports different object names and attributes across sites is presented later when discussing complex compound transaction recoverability. In both this version and the complex compound transaction, the polymorphic capability of the web_transactions object initial_transaction method is provided through the use of PL/SQL collections, more specifically nested tables that contain an unbounded set of URL destinations, attribute names and data values.

Web Server Interface

The web server interface uses the Oracle Application Server (OAS), version 3.0 and a locally installed Oracle8™ database as the CORBA ORB and OTS. Though the ACID compliant transaction architecture described herein could be developed without the OAS and Oracle8™ products as solution components, the use of Oracle™ technology makes the implementation simpler and more efficient [119]. The web server interface requires four components. First, the web server interface has a CORBA 2.0 compliant web server (e.g., OAS 3.0). Second, the web server interface must has a locally installed object-relational database (e.g., Oracle8™). Third, the web server interface has a locally stored copy of the web_transactions object (e.g., as described in the web browser interface section) and supporting database objects, object types and common lookups table. Fourth, the web server interface contains the utility set of distributed artificial intelligent agents to reduce transaction messages through dynamic management of transaction quantum values, as covered in the Reducing Distributed Transactions section later in this chapter.

Application Server Interface

The web application server has four or five components. The fifth component is required when the web application server interface may be the direct connection point for a web browser initiated transaction. Moreover, when the web application server interface can support direct web browser connections, the web application server interface provides all the services of the web server interface, especially the utility set of distributed artificial intelligent agents to reduce transaction messages.

In a configuration where the web application server does not support direct web browser connections, the web application server requires four components. First, the web application server interface must have a CORBA 2.0 compliant web server like the web server interface (e.g., OAS 3.0). Second, the web application server must have a locally or Intranet installed database (e.g., Oracle8™). The latter implementation of an Intranet installed database on a separate physical device is the architecture because large commercial transactional load balancing and security issues will necessitate distribution of the two components. Third, the web server interface must have a locally stored copy of the web_transactions object (e.g., as described in the web browser interface section) and supporting database objects, object types and common lookups table. Fourth, the web application server interface requires the stateless transaction principal to be engineered into web-based applications by designing two components into the persistent repository—an attribute and database trigger.

The first component engineered into the application is an attribute column for each stored object (e.g., where the stored objects may be tables, views or nested tables). The object attribute described herein is transaction_id; however, this could easily be converted to fk_transation_id where an explicit referential key identifier is used for inherited attribute names. The attribute transaction_id stores a foreign key to a stored object encapsulated by the web_transactions object named web_transaction_records. The stored object web_transaction_records is a table that contains a history of web transactions and there current local state. The second component engineered into the application is a database trigger on every object accessed by web transactions. The database trigger ensures that isolation property of ACID compliant transactions is maintained absent a permanent database session and guarantees pessimistic locking of records, or object instances, participating or having participated in a web-brokered transaction. The combination of these two components are important concepts because they alter the current academic and commercial expectation that client-server two-tier pessimistic locking to prevent update—update and update-delete anomalies is impossible to implement in HTTP web-based applications [120]. For reference, pessimistic locking describes the ability to isolate state until a n-phase protocol commits a record; in two-tier client-server database computing, pessimistic locking describes a transaction across a state-enabled protocol that maintains an active connection to a database session and guarantees the isolation property of ACID compliant transactions. Absent pessimistic locking, optimistic locking may be used; however, as described earlier, use of optimistic locking may violate the isolation property ACID compliant in a multi-user environment.

ACID Compliant Transaction

As presented earlier in this chapter, a transaction between a web browser client, web server and single application server may not guarantee the isolation property of ACID compliant transactions across HTTP. Hence, current application design relies on optimistic locking which generally avoids update—update and update-delete anomalies in simple single object writes rather than pessimistic locking which guarantees transaction isolation during processing. Extension of the principle of optimistic locking can be engineered into a web browser client, web server and single application server architecture by employing the same object-oriented design methods such as those described herein. However, such a solution fails to scale to distributed-transactions.

The ACID compliant transaction architecture presented herein employs pessimistic locking by (1) distributing transaction state management and (2) introducing an activity-based distributed termination protocol. Because the activity-based termination protocol is distributed, the termination protocol is a strong termination protocol and incompatible with a 2PC protocol as discussed earlier [99]. Recognizing that strong distributed termination can be successful only with a 3PC protocol, the ACID compliant transaction architecture is based on a logical 3PC protocol superimposed over the existing CGI environment discussed earlier in this chapter. The combination of a distributed transaction state management, activity-based distributed termination protocol and logical 3PC protocol, enables the ACID compliant transaction architecture to work within the existing CORBA 2.0 architecture.

Figure 20:
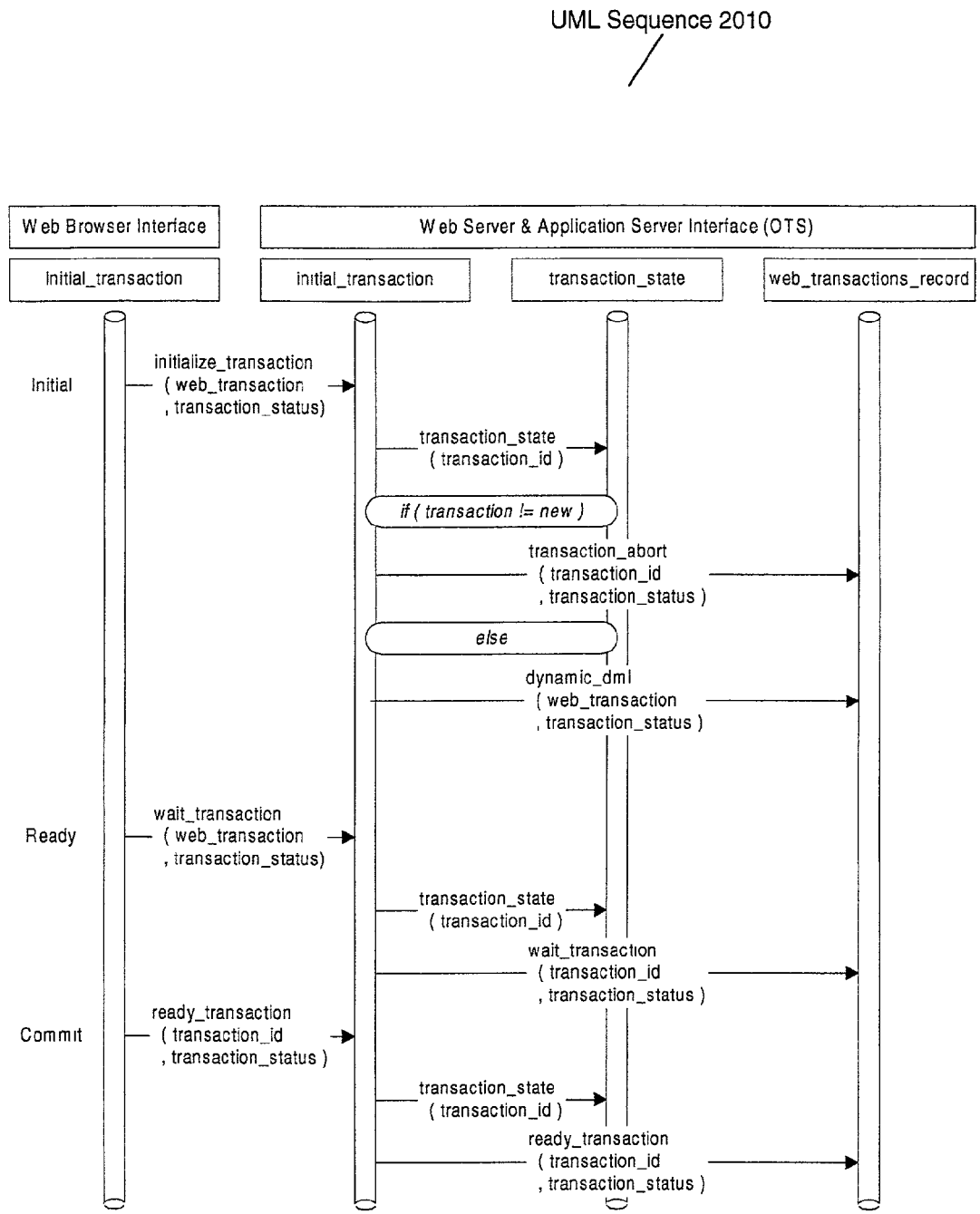
FIG. 20 is diagram that depicts in a uniform modeling language an application server participating, without a web-server, in the execution of a distributed transaction.

At this point, the generalized structure of the transaction will be discussed and then qualified against the proof criteria of atomicity, consistency, isolation and durability. The paper will discuss distributed transaction state management and then activity-based distributed termination. For example, the distributed transaction state management is accomplished by the set of activities depicted in the UML sequence 2010 depicted (FIG. 20) where the model has the application server acting without a web server.

The UML sequence 2010 economizes on space and simplifies the problem domain. For example, in a transaction brokered by an independent web server between the web browser and application server, the web server would issue the initial_transaction, wait_transaction or ready_transaction commands as RMI transactions against the application server after completing local OTS processing. Also, to contain the detail in the drawing the internal processes of abort_transaction are excluded. The abort_transaction method includes a validation against the transaction quantum to determine if the transaction has been allocated adequate time to complete. If the quantum has not expired, the abort_transaction method will return a failure status to the end-user. The reason for disallowing transaction termination for in-progress transactions is to reduce network messaging across the noisy HTTP network stack.

Distributed transaction state management ensures that normal processing works successfully; however, it does not qualify what happens when a fault occurs and transaction recovery is required. When a fault occurs, a strong termination protocol (i.e. activity-based distributed termination) is used to recover prior states. Activity-based distributed termination is so named because a transaction termination can occur under different scenarios. For example, a failed transaction state that does not interfere with other users in a multi-user system until (1) the transaction completes, (2) another transaction is submitted, or (3) a local batch utility requires cleanup of pending transactions. Hence, obsolete transaction states may be preserved beyond quantum values, or transaction time-out values, to reduce the cost of message retransmission. For example, activity-based distributed termination is triggered when one of four events occurs. First, activity-based distributed termination is triggered by the originating web browser interface when the web browser executes an initial_transaction RMI. Second, activity-based distributed termination is triggered when a web browser interface at a different transaction_source attempts to start a new transaction with the initial_transaction RMI and the previous transaction_quantum has expired. Third, a local transaction that attempts to (1) select for update, (2) update or (3) delete a record originally altered by a web-based transaction. Fourth, activity-based distributed termination is triggered when a local transaction attempts to cleanup pending transactions. The local transaction cleanup of pending transactions is not included as a method within the web_transactions object but built into the database trigger on each object accessed by the web_transactions object.

A key to effecting this ACID compliant transaction architecture is building pessimistic locking across a stateless protocol. The pessimistic locking mechanism is the activity-based transaction termination protocol that consists of three components. First, there must be a stored object type of web_transactions in the database that any schema participating in web-brokered transactions can access. Second, there must be a stored object (e.g., a table) of web_transaction_records that any schema participating in web-brokered transactions can access. Third, each native object (e.g., tables that store the actual transaction data) must have a valid database trigger that checks against the transaction_status column of the web_transaction_records table based on the transaction_id column.

The web_transactions object controls access to a set of standard methods that control access to the object web_transaction_records. The web_transaction_records table maintains a transaction state very similar to what a dedicated database session connection maintains to deliver pessimistic locking. The database triggers act as an asynchronous and activity-based event driven daemon that checks web-brokered transactions status before allowing updates or deletes. The combination of the three ensures that pessimistic locking across HTTP can be effected. For example, when the database trigger checks the transaction_status, the trigger needs to determine whether the web transactions (1) has completed successfully, (2) has aborted or (3) has been abandoned in a transaction state of initial or wait and is older than the transaction's quantum value. When the web transaction has completed or aborted successfully, the database trigger permits an update or delete. Otherwise, the database trigger attempts to kill the transaction by invoking a local method invocation (LMI) that evaluates whether the transaction quantum has expired. If the transaction quantum has expired, the database trigger recovers the prior object state and then allows an update. However, if the transaction quantum has not expired, the database trigger raises a processing exception that is returned to the web browser interface or local processing program that has attempted to update or delete the base-object (e.g., table or view) related to a web browser transaction. The error message returned is noted below:

ORA-20086: Distributed Transaction In-progress

As described above, the transaction_status is only changed when one of the three triggering events occurs. Absent a triggering event, a base-object or table may contain erroneous data and hence good software engineering practices should ensure that access to the base-objects are restricted until some batch process audits the base-object for stale transactions and recovers the prior states of the base-objects. The recapturing of the original transaction states for stale transactions is done by a call to the expire_transaction method of the web_transactions object. The prior state of the base object is captured before writing a new transaction in the web_transaction_records table by the initial_transaction method of the web_transactions object. The original copy of the data is stored under an inverse transaction_id value (e.g., the transaction_id column of the web_transaction_records table is the primary key). Hence, a SQL update statement without a qualifying SQL where predicate to a web transaction participating base-object or table can be made to a who-audit column, like last_update_date, which would call the row-level database trigger and in-turn the web_transactions.expire_transaction method.

There is always a risk of hardware or operating system software failure that would take one or more transaction repository offline for some time duration. In distributed object architectures like CORBA, the risk of component failure becomes more likely because the number of devices increase while the same likelihood of device failure exists for each component (i.e., physical hardware and operating software). The ACID compliant transaction architecture provides failure recoverability provided the selected OTS component guarantees write-consistency. OAS 3.0 may be used as the ORB and Oracle8™ object relational database as the OTS solution components. The Oracle8™ solution as an OTS guarantees write consistency because it takes advantage of a kernel level 2PC protocol with a single device weak termination protocol provided the database is not employed in its distributed architecture. Disallowing the use of the Oracle8™ database distributed functionality only limits deployment of symmetrical replication while asymmetrical snapshots may be used without loss of functionality provided the databases have archive mode enabled. Therefore, the ACID compliant transaction architecture is recoverable against machine or operating system failures.

Having presented the distributed transaction state management and activity-based distributed termination protocol, the ACID compliant transaction architecture will be measured against the four key properties of an ACID compliant transaction in the context of a web browser, web server and single application server. Following the individual discussion or ACID compliant properties, the application will describe how the ACID compliant transaction architecture's can be extended to a complex compound transaction.

Atomicity in a Stateless Transaction

The property of atomicity states that transactions have an all-or-nothing character. That is to say that a transaction may be a collection of steps applied individually but all must complete or be undone successfully. The ACID compliant transaction architecture employs a 3PC protocol and pessimistic locking to achieve atomicity. In the ACID compliant transaction architecture described herein, a transaction may complete, abort or be left in a disorderly state until a triggering event occurs. The triggering events that may occur are (1) the transaction completes, (2) another transaction is submitted, or (3) a local batch utility requires cleanup of pending transaction states. Moreover, the activity-based termination (e.g., a strong termination protocol) guarantees that transactions can only have a permanent state of complete, expired or abort. Therefore, the transaction protocol guarantees that either all of the operations in a transaction are performed or none of them are, in spite of failure.

Consistency in a Stateless Transaction

The consistency property states that a transaction applied to an internally consistent data repository will leave the data repository internally consistent. Typically, this means that the declarative integrity constraints imposed by the data repository are enforced for the entire transaction. Hence, if any portion of the transaction violated the data repository integrity constraints, the transaction would be aborted. The ACID compliant transaction architecture employs a 3PC protocol by RMI calls to a stored database object. The compilation process required to create stored database objects validates that declarative database integrity constraints are not violated. However, the internal dynamic_dml method invoked by the public initial_transaction method of the web_transactions object to build insert, update and delete statements poses a risk that declarative database integrity constraints may be violated. Fortunately, the structure of the initial_transaction method within the web_transactions object will raise an exception during RMI processing if a declarative database integrity constraint is violated and not write any change to the original base-object or target table. Therefore, the transaction protocol guarantees the execution of interleaved transactions is equivalent to a serial execution of the transactions in some order.

Isolation in a Stateless Transaction

The isolation property is a critical feature of ACID compliant transactions as has been discussed previously. Isolation requires that the behavior of a transaction is not affected by other transactions occurring in the same persistent data repository. There are two key implications of isolation. First, partial results of incomplete transactions are not visible to others before the transaction completes successfully. Second, partial results are not alterable by other concurrent users. The ACID compliant transaction architecture employs a 3PC protocol and pessimistic locking to achieve isolation.

The ACID compliant transaction architecture does not focus on guaranteeing the visible attribute of partially completed transactions. However, invisibility can be guaranteed by the use of a view to the base-object or table while encapsulating the base-objects in restricted schemas in the database, provided the view employs a function call in the SQL where predicate to the web_transactions.transaction_state function method.

As noted above, in the ACID compliant transaction architecture, a transaction may complete, abort or be left in a disorderly state until a triggering event occurs. The triggering events that may occur are (1) the transaction completes, (2) another transaction is submitted, or (3) a local batch utility requires cleanup of pending transaction states. The database trigger for any base-object or table guarantees that no change to the data can be written except when the quantum is expired and the prior data state is re-written to the base object. However, if the view paradigm is used to guarantee isolation from view, the need to recover prior state may be eliminated in Data Query Language (cases). Further, another web browser interface RMI to the web_transactions.initial_transaction cannot start unless it has aborted the prior transaction and recovered the base-object or table data states. Therefore, the transaction protocol guarantees isolation of partial results by making them not visible to or alterable by others before the transaction completes successfully when the transaction is between a web browser, web server and single application server. Further clarification of the ACID compliant transaction architectures capability to guarantee isolation of a transaction between a web browser, web server and more than one application server will be discussed later. Moreover, as will be shown, the transaction protocol will guarantee the isolation property for complex compound transactions.

Durability in a Stateless Transaction

The durability property states that once a transaction is applied, any effects of the transaction persist through a failure of the system. The Oracle8™ database is a write consistent database and extremely fault tolerant to all but a disk crash. Transactions written to an Oracle8™ database are first written to a file and then to the database in a 2PC protocol. When a database is brought down because of a hardware or software failure, the transaction if not written to the binary file structure of a data file has been written to the redo log file and it will be applied when recovering the database. Most commercial databases enjoy a similar and consistent approach to write consistency. Therefore, the ACID compliant transaction architecture guarantees the results of a committed transaction will be made permanent even if a failure occurs after the commitment based on the write consistency properties of the data repository used as the transaction OTS.

Complex Compound Transaction

The techniques described herein address compound multilevel or nested transactions across heterogeneous, discretely administered and loosely coupled systems as complex compound transactions. In the context of the Internet, a complex compound transaction is a transaction between a web browser client, web server and two or more application servers. To reiterate, a complex compound transaction can be supported by a 3PC protocol because a distributed transaction should contain a strong termination protocol [100] to be acid compliant.

Details of the HTTP protocol, CGI scripting and an ACID compliant transaction architecture have been provided. It has been established that the ACID compliant transaction architecture does indeed provide ACID compliant transactions between a web browser client, web server and single application server. As mentioned earlier, the existing CORBA 2.0 specification creates a write consistency problem because the remote controller object spawns independent processes rather than dependent threads while managing the context of forked transactions (see FIG. 9). The write consistency problem lies in three facts. First, one participant server may complete the transaction successfully while one or more other servers fail. Second, during the intervening time between recovering the transaction components, the successfully written data states are not isolated. Third, if recovery or completion of the transaction cannot be effected the atomicity of the transaction is violated.

The earlier introduction of the web browser interface provided the definition of the method invocation for transactions between a web browser, web server and one application server. However, the previously introduced RMI though adequate to support complex compound transaction, becomes overly complex when the structure of transactions differs between application servers. For example, the structure of transactions is defined by the DML command performed against a remote database. Hence, if the first application server needs to be updated against a table with a different name than the second application server, then the structure of the DML is different. Therefore, the RMI call is modified to support complex compound transactions across heterogeneous, discretely administered and loosely coupled systems by introducing another degree of abstraction, the argument transaction_detail object type.

FIG. 22 shows the structure of transaction object definition 2210, a Web-transaction object type that supports complex compound transactions. FIG. 21 shows Initial_transaction procedure definition 2110 for an initial_transaction method which accepts as an argument the transaction_detail object type. The transaction_detail object type replaces a set of argument object types into the initial_transaction method defined by initial-transaction procedure definition 1910. Specifically, the argument transaction_detail is an Oracle8™ object type, or container class. The object type is unique for each destination application server and contains nested tables that contain the unique components and the previously discussed nested tables, or container classes, of destination and attribute to represent the master and subordinate transactions.

The restructuring of the web_transaction.initial_transaction RMI simplifies two data structures. First, the object constructor and transaction management becomes generic so that the same code can be used for all iterations of a transaction. Second, the use of a single object moves the management of different DML commands within the structure of a complex compound transaction away from the web application developer to the interface programmer thereby encapsulating complexity of transaction management. The ACID properties of transaction consistency and durability remain the same whether or not the transaction is between a web browser, web server and single application server or a web browser, web server and more than one application server. Therefore the earlier proofs for consistency and durability of a web browser, web server and single application server work for a complex compound transaction.

However, the all-or-nothing property of atomicity, and the invisibility and inalterability property of isolation must be established. The paper will now discuss how the ACID compliant transaction architecture can guarantee ACID compliant properties of atomicity and isolation for complex compound transaction across heterogeneous, discretely administered and loosely coupled systems.

Atomicity in a Stateless Distributed Transaction

The discussion of how the ACID compliant transaction architecture maintains atomicity in a stateless distributed transaction or complex compound transaction is dependent on a clear understanding of nested and multilevel transactions. Nested transactions are commonly known as configured or declarative transactions and multilevel transactions are commonly known as programmed transactions. Declarative transactions have a definite begin and end point. The implementation of declarative transaction in relational databases is done through the use of explicit save points. Basically, save points act as a beginning point of a transaction with the commit as the ending point. These two actions demarcate the monad of a transaction. Programmed transactions are more complex to implement. For example, programmed transactions may have incremental commits between when they begin and end but have a containment transaction that monitors whether the entire transaction has completed or failed—an all-or-nothing atomicity—and ensures the entire transaction completes or is rolled back as described earlier. Programmed transactions typically identify transactional dependencies and ensure a sequenced series of activities, like first credit a checking account (e.g., withdraw money) then debit a savings account (e.g., deposit money).

The ACID compliant transaction architecture supports both declarative and programmed transactions with distributed state management effected through a distributed containment transaction. Sequencing of transactions is done at the web browser interface and determined by the order of precedence that transactions are stored in the object type. The atomicity proof of a stateless transaction between a web browser, web server and single application server does not explain how distributed subordinate transaction components—transaction leaf nodes—may maintain different completion states. For example, if one leaf node has a completed state while other leaf nodes may or may not have a completed state, how can atomicity be guaranteed? Hence, what should be demonstrated is a method or bottom-up transaction confirmation control that prevents any transaction leaf node from completing before all transaction leaf nodes complete.

The ACID compliant transaction architecture manages complex compound transaction by creating a top-level transaction unit that acts as a remote controller as described in the coverage of the X/Open DTP reference model in Chapter Two. The top-level transaction of the ACID compliant transaction architecture contains the aggregate transaction state and the data state information to spawn, manage and rollback leaf transaction nodes. When transaction leaf nodes execute, the web_transaction.ready_transaction method, the method determines whether they are dependent transactions within the context of a distributed top-level transaction. The determination is made by the web_transaction.ready_transaction method that contains a function to compare the transaction_id and transaction_parent_id and determine if the ID values are the same or not. If the two ID values are the same then the transaction is not a leaf node transaction. However, if the ID values are different, then the transaction is a leaf node transaction.

The behavior for top-level transactions was described earlier. As noted, if the transaction_id and transaction_parent_id are different, a transaction is a dependent leaf node. Then, the web_transaction.ready_transaction method invokes leaf node callback logic to validate that a global commit has occurred before altering the local state of the web_transaction_records.transaction_status from 'READY' to 'COMMIT.' The local instantiation of web_transaction.ready_transaction re-writes the current transaction time stamp by writing current time to web_transaction_records.transaction_time_stamp before executing the web_transaction.validate_global_commit RMI. This is done to ensure that the new transaction quantum is measured from the callback activity of the longest leaf node rather than the original time stamp of the calling RMI. If the top-level transaction on the native node returns a Boolean true, then each calling leaf exits. If the top-level transaction on the native node returns a Boolean false, then it will execute a web_transaction.leaf_transaction RMI to advise the leaf node transaction status and re-execute the web_transaction.validate_global_commit RMI. However, if the top-level transaction on the native node does not return a Boolean value at all, then the calling leaf node will re-execute the web_transaction.validate_global_commit RMI after resetting the transaction time stamp until the top-level transaction responds with a Boolean value or three attempts have occurred. If web_transaction.validate_global_commit RMI fails to respond with a Boolean value after three attempts, then the local transaction status will not be changed from 'READY' to 'COMMIT.' However, for the sake of discussion, this is the rarer case. Typically, a web_transaction.validate_global_commit RMI will return a Boolean true and the leaf node will write a committed state.

A top-level transaction will stop the sequential processing of subordinate transactions until it gets a response notifying it that the web_transaction.ready_transaction completed successfully. If the top-level transaction does not get a successful completion message within the leaf node transaction quantum, then the top-level transaction will attempt to verify the leaf node completion by executing the web_transaction.local_commit RMI. If verification fails within one additional leaf node quantum, then the top-level transaction will do the following:
  1. Write completed state to the local copy of web_transaction_records.
  2. Provide a notification to the end-user through the web browser client that the transaction is only partially completed and that a completion notification will be sent by email when the transaction completes.
  3. Spawn a message to a message queue that will trigger re-invocation of the transaction within one aggregate transaction quantum.

As may be noted, the disadvantage of the ACID compliant programmed transaction is that once executed, completion is assured but the time-event horizon may be distended if one or more participant application servers fail to respond. Likewise, it is possible to provide the end-user with a choice to terminate the aggregate transaction. If the web browser interface is capable of terminating the transaction and the end-user elects to terminate the transaction, then the web_transaction.rollback_transaction RMI will be submitted by the web browser client. This triggering event begins the process of rolling back the aggregate transaction beginning with the last initialized or invoked transaction. Notwithstanding these web browser client design issues, the complex compound transaction is atomic and ensures that all or none of the transaction occurs. However, it should be noted that some upward termination horizon should be set because all affected objects on the leaf node OTS platform are effectively locked pending successful aggregate transaction completion.

Isolation in a Stateless Distributed Transaction

Isolation in a distributed transaction requires two key behaviors. First, the behavior of a transaction cannot be affected by other transactions occurring in the same set of persistent data repositories. Second, the remote controller of a distributed transaction must guarantee that all subordinate components have completed successfully or rolled back before top-level and leaf node data states are visible to and alterable by other users. The proof of isolation in a stateless transaction between a web browser, web server and single application server established that the ACID compliant transaction architecture guarantees that the transaction is not affected by other transactions occurring in the same persistent data repository. At issue here, are two components. First, the remote controller, or top-level transaction, of a distributed transaction must guarantee that all subordinate transactions have completed successfully or rolled back before the remote controller can update its internal state to completed. Second, all leaf node transactions can only commit when the remote controller can acknowledge that all leaf node transactions are completed successfully. Hence, it should be demonstrated that the transaction protocol guarantees transaction isolation such that transaction isolation can be guaranteed at all transaction nodes—top-level transaction node and all leaf transaction nodes.

The proof to establish the ACID compliance of the isolation property in a stateless distributed transaction is dependent on the previously discussed proof of the atomicity property in a stateless distributed transaction. The top-level transaction protocol invokes the web_transaction-.ready_transaction RMI during each leaf node transaction. The execution of a local instance of web_transaction-.ready_transaction method does three things that guarantee leaf node isolation. First, the local method issues an explicit save point instruction that signals a declarative transaction to update a single row in the local web_transaction_records table. Second, the local method updates the row by setting web_transaction_records.transaction_status equal to 'COMMIT.' Third, the local method enters a loop and after three attempts forces an error that aborts to the explicit save point. During the execution of web_transaction.ready_transaction method, the local web_transaction_records table is locked and not visible to other users on the local system or remote users executing web_transaction.ready_transaction method RMI. Likewise, the top-level transaction explicitly sets a save point, updates the local web_transaction_records table and enters a loop to process all dependent leaf node transactions. If the top-level transaction is unable to complete and verify all leaf node transactions, after two attempts the top-level transaction forces an error that aborts to the explicit save point. During the execution of web_transaction.ready_transaction method, the local web_transaction_ records table is locked and not visible to other users on the local system or remote users executing web_transaction.ready_transaction method RMI.

If either one of the leaf node RMI processes fails or the top-level transaction fails, all transaction states are returned to a 'READY' transaction status and pre-commit changes were not visible to other users. Therefore, the transaction protocol meets the isolation property of ACID compliant transactions because:

1. The transaction cannot be affected by other transactions occurring in the same distributed set of persistent data repositories.
2. The remote controller of the distributed transaction can guarantee that all subordinate components have completed successfully or rolled back before the top-level and leaf node data states are visible and alterable to other users.

Figure 25A:
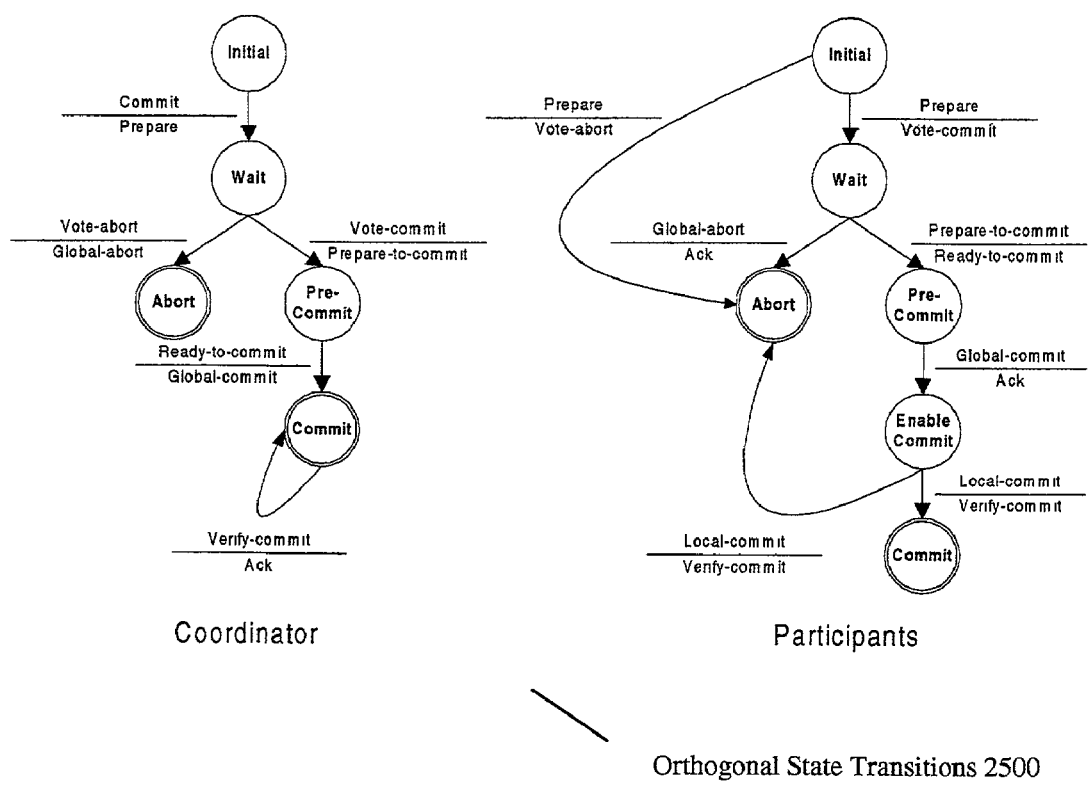
FIG. 25A is a state diagram that depicts a callback enabled 3PC protocol.

FIG. 25 is a diagram that depicts orthogonal state transitions 2500 of a callback enabled 3PC protocol. A leaf node callback to the remote controller ensures that all leaf nodes have completed the transaction. The callback enabled 3PC protocol builds upon the callback enabled 2PC protocol depicted by orthogonal state transitions 1850 (FIG. 18B). A distributed transaction architecture that is ACID compliant may be implemented using a callback enabled 3PC protocol with a leaf node callback to the remote controller to ensure that all leaf nodes have completed the transaction. Moreover, the adoption of leaf node serial transactions would require small modification to derive the aggregate transaction quantum as the longest leaf node transaction in a serial set of leaf node transactions. The callback enabled 2PC protocol may be implemented on a Oracle8™ persistent storage repository. The leaf node transaction may be written through a DML to the local database without an explicit commit of the transaction; however, the Oracle8™ database engine then assumes control and executes an implicit commit of the transaction. At this point, the local database trigger assumes transactional control and executes the callback to the remote controller node. The section that discusses orthogonal state transitions 1850 gives details of explicit and implicit commits that may occur in an implementation of a callback enabled 3PC protocol.

Though the implementation of a distributed transaction architecture has been discussed in terms of sequential processing, the transaction architecture is fully capable of supporting serialized transactions. Therefore, the transaction protocol for a flat transaction and a complex compound transaction is write consistent and ACID compliant across HTTP—on the Internet or Intranet. The architecture is environment neutral and can be implemented on CORBA 2.0.

Reducing Distributed Transaction Messaging

Figure 23:
FIG. 23 is a matrix showing a number of messaging events in a transaction executed across HTTP.

The earlier discussion of the HTTP clearly establishes that HTTP is simple and robust but noisy. A noisy network protocol is a verbose protocol with numerous messages per transaction or event. The ACID compliant transaction architecture is designed specifically for a noisy protocol with recovery distributed to transaction event nodes where possible. Rebroadcast messaging is limited within the transaction protocol to polling activities in the context of complex compound transaction types where polling may reduce messaging by avoiding rebroadcast of the transaction. For example, referring to FIG. 23, CORBA transaction-messaging matrix 2310 shows the messaging events for various invocation patterns of the ACID compliant transaction architecture across HTTP.

The CORBA transaction-messaging matrix 2310 is based on the assumption that web servers are not deployed in a multi-node configuration; however, if they are deployed in a multi-node configuration, then the web listener and metrics server will increase the degree of messaging differently under the scenarios of one to five application servers. However, messaging load as related to a multi-node deployment of web servers is not discussed because the structure of the web server implementation does not directly affect the ACID compliant transaction architecture.

As noted in the CORBA transaction-messaging matrix 2310, there are twenty-three messaging events for each phase of a 3PC protocol across HTTP when the CORBA OTS is used to maintain state. However, as the number of participating application servers increases and the transaction becomes a complex compound transaction, the number of messages increases by eleven for each application server. So, when a transaction becomes a complex compound transaction between two application servers, the number of messages increases by almost fifty percent (e.g., the actual increase is 47.8%). The almost fifty percent increase in messaging per additional server is why the ACID compliant transaction architecture may execute recovery transactions before re-broadcasting the whole transaction. For example, the leaf node or application servers may execute up to four transaction-state recovery messages while the top-level transaction or web server may execute one polling transaction-state recovery message per application server at the commit stage of the transaction. Clearly, the recovery and polling messaging cost and transaction latency incurred is undesired if the transaction subsequently must be rebroadcast. However, if the recovery and polling messaging can recover the transaction, the reduction in transaction latency and messaging cost is significant compared to re-broadcasting the transaction. In fact, the ACID compliant transaction architecture transaction-state recovery extends infrequently the transaction quantum values while generally eliminating assignable cause responses as events that trigger rebroadcast of the transaction (i.e., eliminating avoidable recovery processing).

Further improvement in messaging efficiency could not be engineered into the ACID compliant transaction architecture by manipulating the procedural logic. However, a close examination of the ACID compliant transaction architecture's dependencies identifies the transaction quantum as a critical value in deferring unnecessary transaction recovery. For example, a transaction recovery only occurs when one or more components have failed to execute within a prescribed quantum or time-out value. Therefore, the transaction quantum needs to represent the best forecast of maximum time to complete a transaction component, like a leaf node write to an application server OTS. If the transaction quantum is too short in duration, then a transaction recovery can occur unnecessarily and impose inordinate system messaging cost. Alternatively, when the transaction quantum's duration is too long, the transaction keeps resources too long while avoiding unnecessary recovery operations.

Therefore, the goal is to have a transaction quantum that is targeted for the scope of a transaction between the local and remote device. However, unlike optimizing internal routing configurations, the Internet prevents pre-planning or structured routing to optimize transaction quantum values. The Internet's advantage and disadvantage to e-commerce is that the Internet is a dynamic cyber-organism with routing and latency, a new frontier to system engineers, evolving each day, as discussed earlier. The variability of Internet routing, transaction load and database server resource limitations presents a problem that does not lend itself to mathematical resolution because the problem is too complex and variable to predict behavior accurately. Unfortunately, the Internet latency and routing problems change at multiple intervals during any given day and therefore eliminate approximation methods. The problem can be addressed by active simulation. Active simulation is a combination of distributed reflective artificial intelligence agents, statistical process control methods and a simulation engine.

Active simulation ensures that the transaction quantum is set to represent the real-world transaction quantum based on a constantly evolving repository of transaction quantum values across a set of IP addresses. Active simulation provides the means to reduce transaction messaging by optimizing the triggering value—transaction quantum—that controls extraneous messaging. The following description is divided into a two parts about reducing distributed transaction-messaging topic and then a summary. The first part discusses the method of using distributed reflective artificial intelligence agents. The second part discusses statistical process control methods used to minimize extraneous processing. The simulation engine structures referred to in the discussion of active simulation will be expanded when methodology is later discussed.

Reflective Distributed Artificial Intelligence Agents

The techniques described herein use reflective distributed artificial intelligence (DAI) agents that are (1) narrow in scope and (2) cyclically reified in context; the reflective DAI agents are deployed on the web server tier. There are two types of reflective DAI agents illustrated herein. The first reflective DAI agent simply pings IP addresses of known application servers—providing the transit time from the web server to the application server. The second monitors the time interval between writes to a transaction cookie—providing the remote device processing time. The results of the two reflective DAI agents provide the raw data to calculate the expected transaction quantum between a web server and application server. The transaction quantum is roughly double the transit time plus the processing time—the exact method of calculation will be shown later when methodology is discussed.

The scope of the reflective DAI agent that pings IP addresses is structured on four methods. First, the reflective DAI ping agent reads the contents of an Oracle8™ database object (e.g., a table, view or object type) to secure a list of valid IP addresses and transaction quantum boundaries (e.g., lower and upper control limits) on initialization and rereads the object every thirty minutes during runtime. Second, the reflective DAI ping agent executes a ping against each IP address returned from the read of the valid IP address list. Third, the reflective DAI ping agent compares the value returned from the ping to determine if the value is within the lower and upper control limit boundaries. Fourth, if the reflective DAI ping agent finds a value that is not within the lower and upper control limit boundaries, then it writes the IP address and new transit time value to an Oracle8™ object otherwise it ignores the value and pings the next IP address in the list. Out-of-bound transit time values are stored in an object that contains the history of transaction (e.g., transaction_ip_quantums) quantum values between the local device and IP address. The transaction_ip_quantums object is used by the simulation engine and will be described later in greater detail.

The scope of the reflective DAI agent that evaluates processing time is structured on five similar methods to the reflective DAI ping agent. First, the reflective DAI process ing-time agent reads the contents of an Oracle8™ database object (e.g., a table, view or object type) to secure a list of valid IP addresses and transaction quantum boundaries (e.g., lower and upper control limits) on initialization and rereads the object every thirty minutes during runtime. Second, the reflective DAI processing-time agent monitors the local directory where cookies are stored and reads the name and value pair for the transaction begin and end time stamps. Third, the reflective DAI processing-time agent converts the two time stamps to a numerical value in seconds. Fourth, the reflective DAI processing-time agent compares the value returned from the ping to determine if the value is within the lower and upper control limit boundaries. Fifth, if the reflective DAI processing-time agent finds a value that is not within the lower and upper control limit boundaries, then it writes the IP address and new processing-time value to an Oracle8™ object otherwise it ignores the value and evaluates the next IP cookie in the directory. Out-of-bound processing-time values are stored in an object that contains the history of transaction (e.g., transaction_ip_quantums) quantum values between the local device and IP address. As noted above, the transaction_ip_quantums object is used by the simulation engine and in manner that will be described greater detail. The term cyclically reified in context was introduced at the beginning of this section as an attribute of the reflective DAI agents. Reification is the process of making something explicit that is normally not part of the language or programming model; reification is necessary to enable non-functional, policy or meta level code [89]. Reification has two types—structural and behavioral. Both of the reflective DAI agents described herein use behavioral reflection. Basically, behavioral reflection reifies the structural components of a program, like inheritance and data types in object-oriented programming languages [89]. Moreover, the reflective DAI agents described herein reify their operating parameters, such as the IP address list and the lower and upper control limits for the transit and processing time values. For clarification, the term cyclically refers to the fact that a reflective object constantly improves its internal state knowledge about the object's domain through iterative re-instantiation of the reflective DAI agent's state variables. Therefore, the reflective DAI agents become more aware without human intervention or input because the reflective objects collect and analyze environmental conditions—transit and process time values. The increased knowledge about transaction quantum values (e.g., a combination as described above of transit and process time values) enables the reflective DAI agents to only take processing action when necessary and ignore unnecessary or normal transit and processing time activity values. The capability to focus on the meaningful out-of-bound conditions means that the reflective DAI agents impose progressively smaller overhead processing costs over time.

Active Simulation Statistical Process Control

Figure 29:
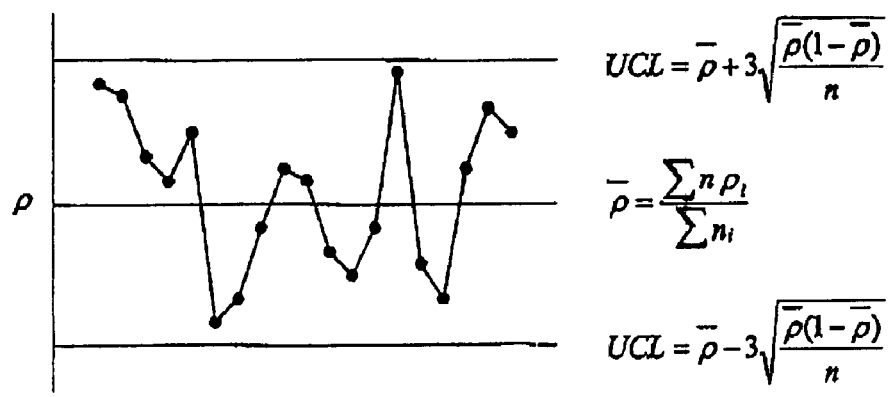
FIG. 29 depicts a p-chart according to an embodiment of the present invention

The reflective DAI agents discussed previously collect the data and the active simulation analyzes the data. However, for a simulation to be useful without human review of the simulation output data, there must be a set of normalized expected values. Further, in active simulation the expected value must become increasingly accurate and account for common and assignable cause variations. For example, in statistical process control the expected values exist between the inclusive lower and upper bounds—where bounds are formally called limits in statistical theory [121]. The method employed in collecting statistical data points beyond the lower and upper bounds compels the use of a p-chart approach to analyzing the data because the daily sample may be above ten and will be a variable sample size as shown in Chart 2901 (see FIG. 29) [121].

The active simulation engine is a goal seeking simulation and the goal is to set the lower and upper bounds at the most reasonable outward limits. It should be noted that if the purpose were to be statistically accurate, then the reflective DAI agents would write one hundred percent of the findings to the persistent data repository. However, the goal is to set an initial probable state through methodical collection of statistical data for a generic transaction, copy that set of data for each new IP address entered into the system and then collect data that falls outside of the limits. This approach decreases the centralizing tendency from the statistical model and over time will likely expand the range of the expected value. By employing this design, the number of messages written to the persistent data repository by the reflective DAI agents will become smaller over time. Likewise, the reflective DAI agents will minimize internal processing as observable transit and processing time values will less frequently fall outside of the lower and upper control limits.

The transit and process time values derived by the statistical process control method described above become the benchmark values against which the simulation results are analyzed. For example, when the simulation is run, the simulation engine stores output values from which minimum and maximum expected values can be derived. The results from the simulation should generally approximate the statistically derived expected result range; however, it is possible that the simulation may provide a smaller lower bound or larger upper bound. If the simulation returns a smaller lower or larger upper bound value, the simulation will be rerun to verify predicted values. If after rerunning the simulation and finding the limit values remain below the lower or above the upper bounds, then the simulation results will be used in lieu of the statistical process control lower and upper control limits.

The reasons for adopting this method for setting the lower and upper transit and processing time bounds is to maximize the strength of both approaches and use each as a check against one another. For example, the simulation engine uses the initial probability distribution for eighty percent of transactions (e.g., to mirror the generic transaction statistics) and the mean values of DAI agent-gathered data for ten percent of transactions on either end of the spectrum. Hence, the simulation engine should have a higher degree of statistical accuracy over time than the statistical database because the statistical database data collection process ceases to gather data points found within the lower and upper statistical limits. Naturally, the simulation engines may exhibit bias and bias may narrow or widen the lower and upper limits. When it narrows the lower and upper limits, the statistically derived lower and upper limits provide greater tolerance for minimizing rebroadcast transaction. On the other hand, when it enlarges the lower and upper limits, the statistically derived lower and upper limits provide a check against undo bias in a single run of the simulation and force a second validating simulation run. Therefore, the active simulation is tuned to reduce transaction messaging by providing greater latitude in the range of expected values while shielding decision making from single simulation run bias.

Summary—Reducing Distributed Transaction Messaging

The reduction of distributed transaction messaging has been discussed in the context of complex compound transactions because transactions between a single web browser client, web server and application server do not pose a consensus problem related to leaf node transactions. Though the ACID compliant transaction architecture is designed for a noisy protocol, like HTTP, and uses up to four transaction-state recovery messages on leaf node servers and one polling transaction-state recovery message on the web server, the ACID compliant transaction architecture relies on the efficacy of the transaction quantum value. For example, if the transaction quantum is too short in duration, then a transaction recovery can occur unnecessarily and impose inordinate system messaging cost. Alternatively, when the transaction quantum's duration is too long, the transaction keeps resources too long while avoiding unnecessary recovery operations.

Reducing distributed transaction messaging requires active awareness of the appropriateness of an assigned transaction quantum between a web server and IP address or application server. The active awareness is effected through a combination of reflective DAI agents, active simulation and a simulation engine. The reflective DAI agents collect statistical data points that are outside of the lower and upper statistical limits. The collected data is analyzed statistically and then run through the simulation engine to evaluate the potential for assignable cause variation outside of the lower and upper statistical control limits. If a single simulation identifies the likelihood of assignable cause variation, then the simulation is run a second time to ensure that the simulation engine's output does not exhibit bias. If after rerunning the simulation and finding the limit values remain below the lower or above the upper bounds, then the simulation results will be used in lieu of the statistical process control lower and upper control limits. Therefore, the active simulation is tuned to reduce transaction messaging by providing greater latitude in the range of expected values while shielding decision making from single simulation run bias. Also, the reflective DAI agents are targeted to consume the least amount of local system resources because they are enabled to focus on the meaningful out-of-bound conditions based their reification linked to the lower and upper limits returned from the active simulation. Therefore, the reflective DAI agents impose progressively smaller overhead processing costs over time while increasing the accuracy of transaction quantum values.

The combination of a cycle-of-life pattern between the reflective DAI agents, active simulation and simulation engine ensures that the least possible resources will be consumed to provide the most accurate lower and upper statistical control limits for transaction quantum values between a web server and any related application servers. Further the combination of reflective DAI agents, active simulation and simulation engine demonstrates reduced transaction overhead or the frequency of object messaging, transaction recovery and rebroadcast transactions across the Internet.

Acid Compliant Transaction Protocol

In the following sections, each of the four direct measurements of ACID compliance as applied to the ACID compliant complex compound transaction protocol described herein will be addressed. They are addressed in the sections that follow according to the following order: atomicity, consistency, isolation and durability.

1. The transaction protocol must guarantee that an all-or-nothing transaction occurs on each dynamically bound independent heterogeneous, discretely administered and loosely coupled systems when one or more transaction components possesses a strong termination protocol—atomicity. For example, if a transaction leaf node has control of whether it commits or aborts writing a permanent state, then the architecture must ensure that all other leaf node or the top-level transactions do the same. Moreover, if one leaf node commits, then all leaf nodes and the top-level transaction commit; or if one leaf node aborts, then all leaf nodes and the top-level transaction abort.

2. The transaction protocol must recover all permanently written transaction states on each dynamically bound independent heterogeneous, discretely administered and loosely coupled system when one or more transaction components within a transaction set has a potentially inconsistent transaction write-state—consistency. For example, if a transaction set is composed of two components where the first component is withdrawing money from a system and the second component is depositing money into another system, then a failure of either component requires the recovery of both component's write-states. This write-state asynchronous distributed transaction recovery pattern is analogous to the asynchronous distributed agreement consensus problem in the Fischer, Lynch and Peterson (FLP) theorem [28].

3. The transaction protocol must recover all permanently written transaction states on each dynamically bound independent heterogeneous, discretely administered and loosely coupled systems when the CORBA Object Request Broker (ORB) recovers after system-level failure—isolation. For example, if there is a power supply interruption of the physical device running a CORBA ORB then all CORBA ORB services, like any instances of a CORBA Object Transaction Service (OTS), experience catastrophic failure. If the CORBA OTS transaction protocol extension provides (a) persistent object states and (b) asynchronous distributed transaction recovery, then the transaction protocol must employ an a priori interrupt algorithm at program initialization. At program initialization, the OTS or web server needs to detect asynchronous distributed transaction write-states and then queue or delete pending transactions to recover the write-states before processing new transactions.

4. The transaction protocol must record to persistent storage all transaction states when creating a transaction that makes dynamically bound connections to one or more systems, and assign the transaction or complex compound transaction a unique transaction set identifier, transaction state identifier and transaction component identifier—durable. For example, a transaction that withdraws money from a bank account at Bank "A" and deposits money into a bank account at Bank "B" is a single complex compound transaction. The transaction set identifier qualifies uniqueness of a transaction, which may be a (a) single transaction, (b) composite transaction with any number of subordinate transactions or leaf node transaction, or (c) set of transaction components that may contain single or composite transactions.

Before addressing individual methodologies employed to validate an ACID compliant transaction architecture's durability, consistency and isolation, it is useful to illustrate an expository architecture upon which an ACID compliant transaction may be executed over a heterogeneous, discretely administered and loosely coupled systems. As is often the case, a big-picture view of the architecture is the best place to begin.

Figure 24:
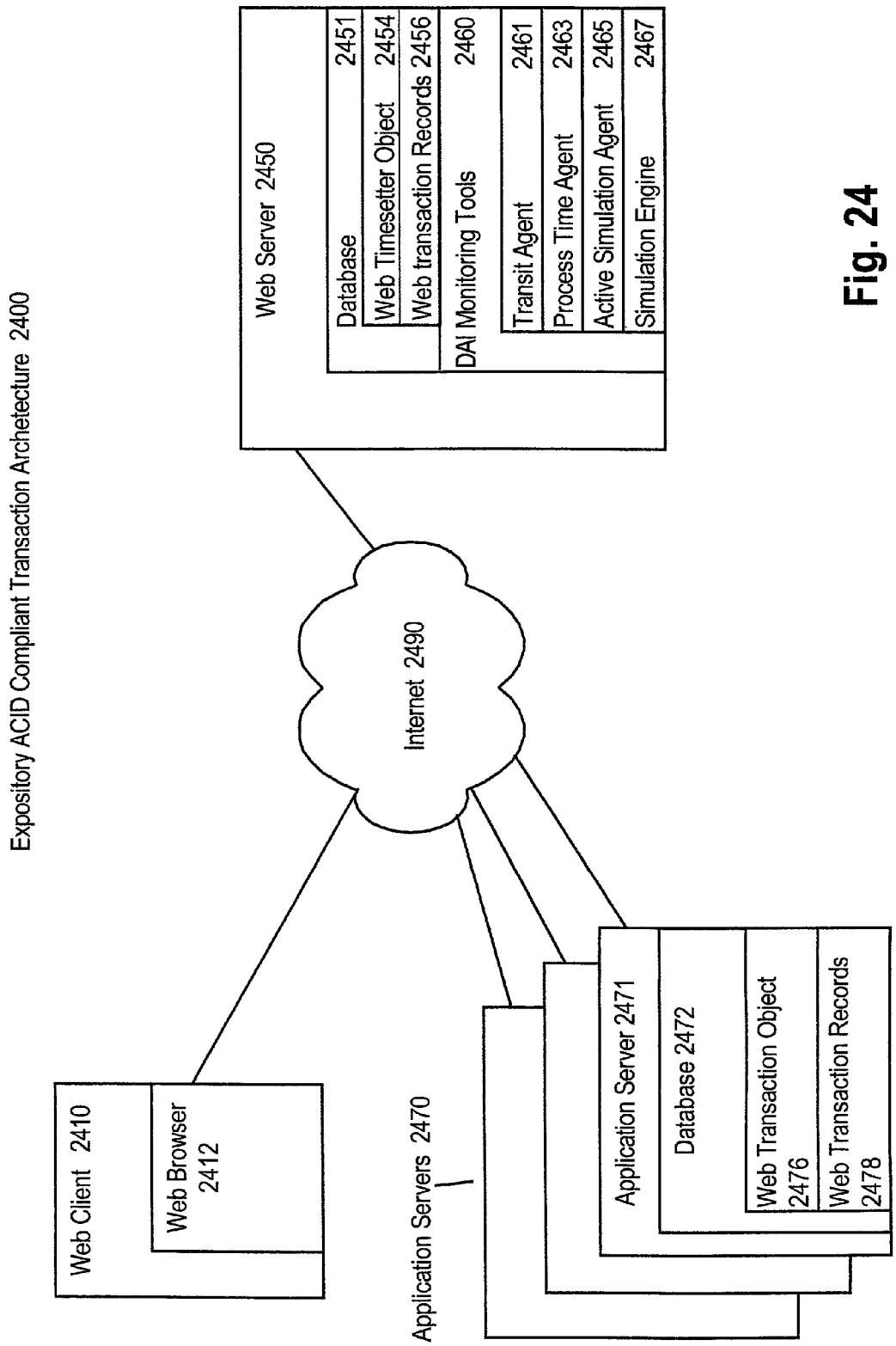
FIG. 24 is a block diagram that depicts an architecture upon which ACID compliant transaction may be implemented.

Referring to FIG. 24, it depicts expository ACID compliant transaction architecture 2400 as a three-tier architecture with any number of application servers 2470, a web server 2450, a web client 2410, coupled to together via internet 2490.

Application servers 2470 may be configured like Application server 2471, which runs Oracle's OAS 3.0 and database 2472 (e.g. Oracle8 database). Web_transaction object 2476, and web_transaction records 2478 reside on database 2472.

Web server 2450 may also run Oracle's OAS 3.0. In addition, web server 2450 includes database 2451 (e.g. Oracle8 database). Web_transaction object 2454, and web_transaction records 2456 reside on database 2451.

The web client may includes a web browser 2412. The browser may be browser Netscape's Navigator or Microsoft's Internet Explorer.

To reduce message, web server 2450 includes DAI monitoring tools 2460. The DAI monitoring tool 2460 includes the transit agent 2461, process time 2463, active simulation agent 2465, and simulation engine 2467.

Having described the basic distributed structure of ACID compliant transaction architecture 2400, a methodology that shows ACID compliant transaction architecture 2400 is ACID compliant transaction architecture's will now be described.

Atomicity in a Stateless Distributed Transaction

Atomicity requires that a transaction protocol must guarantee an all-or-nothing distributed transaction where all leaf nodes and the top-level or remote controller completes successfully. The ACID compliant transaction architecture 2400 uses a programmed transaction with distributed state management effected through a distributed containment transaction. Sequencing of transactions is done at the web browser interface and determined by the order of precedence that transactions are stored in the object type. In a distributed transaction, transaction leaf nodes may maintain different completion states. For example, if one leaf node has a completed state while the other leaf nodes may or may not have a completed state either the one must rollback or the others must complete before the top-level transaction can complete. ACID compliant transaction architecture 2400 employs a method of bottom-up transaction confirmation control that prevents any transaction leaf node from completing before all transaction leaf nodes complete.

ACID compliant transaction architecture 2400 manages a complex compound transaction by creating a top-level transaction unit that acts as a remote controller as described in the coverage of the X/Open DTP reference model previously discussed. The top-level transaction of ACID compliant transaction architecture 2400 contains the aggregate transaction state and the data state information to spawn, manage and rollback leaf transaction nodes. When transaction leaf nodes execute, the web_transaction.ready_transaction method determines whether they are dependent transactions within the context of a distributed top-level transaction. The determination is made by the web_transaction.ready_transaction method that contains a function to compare the transaction_id and transaction_parent_id and determine if the ID values are the same or not. If the two ID values are the same then the transaction is not a leaf node transaction. However, if the ID values are different, then the transaction is a leaf node transaction.

The behavior for top-level transactions has been previously described. As noted, if the transaction_id and transaction_parent_id are different, a transaction is a dependent leaf node. Then, the web_transaction.ready_transaction method invokes leaf node callback logic to validate that a global commit has occurred before altering the local state of the web_transaction_records.transaction_status from 'READY' to 'COMMIT.' The local instantiation of web_transaction.ready_transaction re-writes the current transaction time stamp by writing current time to web_transaction_records.transaction_time_stamp before executing the web_transaction.validate_global_commit RMI. This is done to ensure that the new transaction quantum is measured from the callback activity of the longest leaf node rather than the original time stamp of the calling RMI. If the top-level transaction on the native node returns a Boolean true, then each calling leaf exits. If the top-level transaction on the native node returns a Boolean false, then it will execute a web_transaction.leaf_transaction RMI to advise the leaf node transaction status and re-execute the web_transaction.validate_global_commit RMI. However, if the top-level transaction on the native node does not return a Boolean value at all, then the calling leaf node will re-execute the web_transaction.validate_global_commit RMI after resetting the transaction time stamp until the top-level transaction responds with a Boolean value or three attempts have occurred. If web_transaction.validate_global_commit RMI fails to respond with a Boolean value after three attempts, then the local transaction status will not be changed from 'READY' to 'COMMIT.' However, for the sake of discussion, this is the rarer case. Typically, a web_transaction.validate_global_commit RMI will return a Boolean true and the leaf node will write a committed state.

A top-level transaction will stop the sequential processing of subordinate transactions until it gets a response notifying it that the web_transaction.ready_transaction completed successfully. If the top-level transaction does not get a successful completion message within the leaf node transaction quantum, then the top-level transaction will attempt to verify the leaf node completion by executing the web_transaction.local_commit RMI. If verification fails within one additional leaf node quantum, then the top-level transaction will do the following:

1. Write completed state to the local copy of web_transaction_records.
2. Provide a notification to the end-user through the web browser client that the transaction is only partially completed and that a completion notification will be sent by email when the transaction completes.
3. Spawn a message to a message queue that will trigger re-invocation of the transaction within one aggregate transaction quantum.

Consistency in a Stateless Distributed Transaction

The transaction protocol is consistent provided that each leaf node transaction is written to a data repository that maintains consistency. For example, the consistency property states that a transaction applied to an internally consistent data repository will leave the data repository internally consistent. Typically, this means that the declarative integrity constraints imposed by the data repository are enforced for the entire transaction. Hence, if any portion of the transaction violated the data repository integrity constraints, the transaction would be aborted. ACID compliant transaction architecture 2400 employs a 3PC protocol by RMI calls to a stored database object. The compilation process required to create stored database objects ensures that declarative database integrity constraints are not violated. However, the internal dynamic_dml method invoked by the public initial_transaction method of the web_transactions object to build insert, update and delete statements poses a risk that declarative database integrity constraints may be violated. Fortunately, the structure of the initial_transaction method within the web_transactions object will raise an exception during RMI processing if a declarative database integrity constraint is violated and not write any change to the original base-object or target table. Therefore, the transaction protocol guarantees the execution of interleaved transactions is equivalent to a serial execution of the transactions in some order.

Isolation in a Stateless Distributed Transaction

A transaction protocol guarantees distributed isolation provided that each leaf node transaction meets two conditions. First, partial results of incomplete transactions are not visible to others before the transaction completes successfully. Second, partial results are not alterable by other concurrent users writing to the data repository that maintains consistency. The traditional definition that partial results are not alterable by other concurrent users expands in the context of programmed distributed transactions. For example, programmed distributed transactions can only guarantee partial results are not alterable if two conditions are met. The first condition for programmed distributed transactions is that any transaction, at the top-level or leaf node, cannot be affected by other transactions occurring in the same set of persistent data repositories. The second condition for programmed distributed transactions is that the remote controller or top-level transaction must guarantee that all subordinate components have completed successfully or rolled back before top-level and leaf node data states are visible to and alterable by other users. Additionally, the transaction must be fault tolerant at any level in the transaction hierarchy and recoverable.

The first condition, restricting visible results from other users, can be maintained in Oracle8™ by using invoker rights [122] and in general by applying the guideline of three-level architecture qualified by the ANSI-SPARC model [123]. Notwithstanding the Oracle specific terminology, the concept of invoker rights is that an object, like the transaction repository object web_transaction_records, is stored in a restricted database schema while access to the object is through one or more views in another database schema. For example, the following view definition would return no rows unless the transaction's aggregate status for the specific transaction ID value, stored in web_transaction_records.transaction_status, contains a string literal of a "C" or an "E." The string literal values stored in web_transaction_records.transaction_statuts maps to meaningful text string literal values through the web_transaction_lookups table.

CREATE OR REPLACE VIEW web_transaction_records AS
SELECT wtr.transaction_id
, wtr.transaction_status
, wtr.transaction_source
, wtr.transaction_detail
FROM web_transaction_records wtr1
WHERE web_transactions.transaction_status
(wzr.transaction_id) IN ('C', 'E')
AND wtr.transaction_id='&input1';

The second condition, ensuring partial results are not alterable by other concurrent users may also be guaranteed by using invoker rights design. Unfortunately, using invoker rights to shield the transaction data-state is a weak solution for any DML other than a select statement. One easily visible reason is that update or delete DML statements need to occur when the transaction quantum has expired and the transaction is in other than a commit or expired transaction status, as put forth in the proof of the isolation property. The only feasible way to guarantee isolation is through the use of a database trigger. The architecture is based on local database triggers that maintain isolation while ensuring that transaction status values other than commit and abort are updated to expired. The trigger essentially validates that the current time stamp is greater than the time stamp derived by the taking the sum of web_transaction_records.transaction_time_stamp and web_transaction_records.transaction_quantum. In fact as stated earlier, the transaction is isolated until one of two events occurs. The first event is a successful commitment of the transaction to the local repository. The second event is the expiration of the transaction quantum value. As discussed above, the isolation property of ACID compliant transaction architecture 2400 guarantees isolation by using a database trigger that constructs an instance of web_transactions and calls the web_transactions.transaction_status method. By way of example, the executable program portion of a trigger, used during unit testing of the ACID compliant transaction architecture, between a web browser client, web server and single application server is noted below.

```
DECLARE
    transaction           WEB_TRANSACTIONS;
    transaction_source    VARCHAR2(100)    := 'LOCAL';
    transaction_status    VARCHAR2(10);
    locked_row            EXCEPTION;
BEGIN
    transaction_status :=
        transaction.transaction_state(:old.transaction_id);
```

```
    IF     transaction_status NOT IN ('ABORTED', 'COMMIT', 'EXPIRED') THEN
    /*
    || Expire the transaction if the quantum value is old.
    */
       transaction.expire_transaction( :old.transaction_id
                                     , transaction_source
                                     , transaction_status);
       IF     transaction_status != 'EXPIRED' THEN
         RAISE locked_row;
       END IF;
    END IF;
EXCEPTION
    WHEN locked_row THEN
       RAISE_APPLICATION_ERROR ( -20086
                                , 'Distributed Transaction In-progress');
END;
```

The snippet of code used in the database trigger constructs an instance of the web_transactions object, executes a method call to determine the transaction status, and evaluates whether the transaction status is aborted, commit or expired. If the transaction status is not aborted, commit or expired, then the program executes the transactions.expire_transaction method to expire the transaction and if successfully altered returns control to the DML command that invoked the database trigger. However, if the attempt to expire the transaction failed, then the trigger will raise an exception and return the following error to the user:

ORA-20086: Distributed Transaction In-progress

The process is more complex when the trigger is designed to support a complex compound transaction across dynamically bound independent heterogeneous, discretely administered and loosely coupled systems. However, reviewing the method used by the code is more appropriate then a line-by-line code analysis. For example, the execution of a local instance of web_transaction.ready_transaction method does three things that guarantee leaf node isolation.

First, the local method issues an explicit save point instruction that signals a declarative transaction to update a single row in the local web_transaction_records table. Second, the local method updates the row by setting web_transaction_records.transaction_status equal to 'COMMIT.' Third, the local method enters a loop and after three attempts forces an error that aborts to the explicit save point. During the execution of web_transaction.ready_transaction method, the local web_transaction_records table is locked and not visible to other users on the local system or remote users executing web_transaction.ready_transaction method RMI. Likewise, the top-level transaction explicitly sets a save point, updates the local web_transaction_records table and enters a loop to process all dependent leaf node transactions. If the top-level transaction is unable to complete and verify all leaf node transactions, after two attempts the top-level transaction forces an error that aborts to the explicit save point. During the execution of web_transaction.ready_transaction method, the local web_transaction_records table is locked and not visible to other users on the local system or remote users executing web_transaction.ready_transaction method RMI.

If either one of the leaf node RMI processes fails or the top-level transaction fails, all transaction states are returned to a 'READY' transaction status and pre-commit changes were not visible to other users. Therefore, the transaction protocol meets the isolation property of ACID compliant transactions because:

1. The transaction cannot be affected by other transactions occurring in the same distributed set of persistent data repositories.
2. The remote controller of the distributed transaction can guarantee that all subordinate components have completed successfully or rolled back before the top-level and leaf node data states are visible and alterable to other users.

The method of testing the transaction protocol was to spawn transactions through the web browser and then run local database test. Select, update and delete DML statements were attempted against the base object for the known transaction ID value to determine if the row was isolated and that it remained so until the quantum expired in the web_transaction_records object. Additionally, a second iteration of the web browser client was run with a ten second lag from the first submitted transaction against the same base object and row; the second remote transaction returned the Distributed Transaction In-progress error. Therefore, ACID compliant transaction architecture 2400 maintains the ACID compliant property of isolation.

Durability in a Stateless Distributed Transaction

At issue, in establishing that the transaction protocol is durable, there are two items that needed to be shown. First, the transaction protocol should ensure that the transaction states during creation are written to a persistent data repository. Second, that the complex compound transaction is assigned a unique transaction set identifier for all components of the transaction. For reference, the durability property states that once a transaction is applied, any effects of the transaction persist through a failure of the system.

The structure of the transaction protocol is that it is accessed by an RMI of web_transactions.initial_transaction method. The web_transactions.initial_transaction method first writes the transaction to the local data repository (e.g., an Oracle8™ database). Each nested execution of the programmed transaction structure within the web_transactions.initial_transaction method on the web server is effected through an RMI of the web_transactions.initial_transaction method on the respective application servers in sequence to the transactions hierarchical completion submission criteria. ACID compliant transaction architecture 2400 imposes a transaction hierarchy as follows:

1. The top-level or master transaction is by design the first transaction stored in the nested transaction object type (e.g., see FIG. 22).

2. The first leaf node transaction is by design the second transaction stored in the nested transaction object type. All other leaf node transactions are stored in their designed order of dependence such that the second leaf node has an index value is one greater than the leaf node's execution cycle. The index value is maintained in the web_transactions.transaction.transaction_id column (e.g., Oracle8™ maintains nested tables as nested objects).

Once the web_transactions.initial_transaction RMI is executed as a CGI program, the durability of the transaction is now controlled by the Oracle8™ database. The Oracle8™ database is a write consistent database and extremely fault tolerant to all but a disk crash. Transactions written to an Oracle8™ database are first written to a file and then to the database in a 2PC protocol. When a database is brought down because of a hardware or software failure, the transaction, if not written to the binary file structure of a data file, has been written to the redo log file and will be applied when recovering the database. Most commercial databases enjoy a similar and consistent approach to write consistency. Therefore, ACID compliant transaction architecture 2400 guarantees the results of a committed transaction will be made permanent even if a failure occurs after the commitment based on the write consistency properties of the data repository used as the transaction OTS (e.g., Oracle8™).

Operating System Implementation of an Asynchronous Transaction Object Management System This section explores the limitations of the Common Object Request Broker Architecture (CORBA) Object Transaction Service (OTS) as a Multidatabase Management System (MDBMS) across the Internet and qualifies the techniques for transaction management discussed beforehand to an operating system. The previous section developed a method to (1) minimize transaction overhead costs and (2) provide transaction write consistency across heterogeneous, discretely administered and loosely coupled systems.

This section further analyzes the nature of an asynchronous socket capable of creating and maintaining transactional state with datagram sockets, or connectionless sockets [124], across state-aware TCP or stateless HTTP/HTTPS protocols. The asynchronous socket supports CORBA Object Transaction Service between two machines in a peer-to-peer paradigm and three or more machines in a distributed system paradigm. Further, the asynchronous socket guarantees (1) write consistency by surrendering leaf-node control, (2) clock synchronization by adopting a relative clock and (3) fault recovery through a collection of distributed persistent transaction objects on heterogeneous, discretely administered and loosely coupled systems. The asynchronous socket is based on the Asynchronous Transaction Object Management System (ATOMS) discussed in the previous section. This section examines how ATOMS can be implemented on the UNIX operating system with multithreaded client- and server-stubs using Pthreads and the Oracle8 database as a ubiquitous file subsystem [125].

This section explores the application of the previous section that resolved (1) write consistency by surrendering leaf-node control, (2) clock synchronization by adopting a relative clock and (3) fault recovery by placing a persistent transaction object on heterogeneous, discretely administered and loosely coupled systems. The previous section examined a implementation using an Oracle Application Server as the Common Object Request Broker Architecture (CORBA) Object Request Broker (ORB) and Oracle8 database as the CORBA persistent store.

Specifically, the previous section addressed the CORBA Object Transaction Service (OTS) failure to provide a reliable online transaction processing (OLTP) middle-tier to dynamically bound heterogeneous, discretely administered and loosely coupled systems. (See also *Achieving a Multidatabase Object Transaction Service through an Asynchronous Socket* [143]) The OTS failure occurs because it does not provide write-consistent and recoverable asynchronous symmetrical replication of data [126]. The failure of the OTS is related to the adoption of the X/Open Data Transaction Processing (DTP) Reference Model. Specifically, the X/Open DTP Reference Model uses a two-phase commit (2PC) protocol that does not guarantee write consistency or transaction recoverability in a heterogeneous, discretely administered and loosely coupled system architecture because the X/Open DTP Reference Model does not resolve leaf-node control of participating clients [127] [128].

The previous section discussed the limitations of the standard 2PC and three-phase commit (3PC) protocols [129] to provide ACID compliant transactions across a stateless network on HTTP/HTTPS [130]. The 2PC protocol can only support a blocking paradigm, which requires a stream socket, or full duplex persistent socket when used with a network transport protocol that is state-aware, like TCP, or an Internal Process Communication (IPC) paradigm across a hardware bus. Moreover, a 2PC protocol can only support a peer-to-peer paradigm. However, a 3PC protocol can support a distributed transaction and was designed to support a non-blocking protocol paradigm; however, it introduces leaf-node transaction control, which eliminates atomic transaction control for distributed transactions.

The standard orthogonal transaction state diagram for 2PC and 3PC protocols are illustrated in FIGS. 15 and 16 respectively. The 2PC protocol across a telnet session or TCP protocol stack can guarantee behavior in a peer-to-peer environment provided both the client and server segments of the socket remain active during the entire transaction. However, if the socket is broken, the data can be left in an unqualified state unless the program that manages access to the data uses a checkpoint paradigm and determines the transaction integrity guarantee independently of the parent process or client stub of the socket.

Commercial database management systems manage orphaned transaction states by different algorithms that work much like any Unix shell environment [131]. Moreover, unless an explicit checkpoint is available to determine what to save and abandon, they evaluate the return values of unqualified statements for a normal exit condition and save all work or data changes up to the last normal statement exit as qualified by Oracle's database implementation [132]. For example, in a peer-to-peer model using a 2PC protocol, the transaction state guarantee is provided by the application and not by the transaction protocol. Likewise, equivalent functionality can be achieved with any program that combines a buffer, temporary file and permanent file management paradigm provided the full buffer is flushed to the temporary file until the user explicitly saves the changes to the permanent file. Therefore, a database management system can be considered as an extension to the shell and utility of the operating system, almost on terms with an intelligent and self-auditing file subsystem.

The 2PC and 3PC protocols are capable of supporting a distributed transaction through two or more sockets. Unfortunately, the 2PC protocol would require an application component to manage the spawning of two child processes or two threads that manage individual 2PC protocol sockets, which would in turn mimic what a 3PC protocol would provide as a solution. The 3PC protocol is expensive in terms of additional network traffic and only provides an optimistic problem resolution because of leaf node control that may leave one or more nodes out of synchronization with the global state of the transaction. Leaf node control is the property of any system to take independent action by programmatic decision or system fault. For example, as illustrated in FIG. 16, if all participants in a distributed transaction transmit a Ready-to-commit signal to the coordinator and the coordinator transmits a Global-commit to all participants, there is no guarantee that all participants will commit [133]. Therefore, a 3PC protocol is an optimistic model because it lacks the guarantee of behavior due to the dynamic of leaf node control.

The previous section developed a method to (1) minimize transaction overhead costs and (2) provide transaction write consistency across heterogeneous, discretely administered and loosely coupled systems notwithstanding the problem of leaf node control. The solution in the previous section was an asynchronous socket capable of creating and maintaining transactional state with datagram sockets, or connectionless sockets [124], across state-aware TCP or stateless HTTP/HTTPS protocols. The previous section developed an asynchronous socket that guarantees (1) write consistency by surrendering leaf-node control, (2) clock synchronization by adopting a relative clock and (3) fault recovery through a collection of distributed persistent transaction objects on heterogeneous, discretely administered and loosely coupled systems. The asynchronous socket is based on the Asynchronous Transaction Object Management System (herein, ATOMS) developed in the previous section, which describes an implementation of ATOMS as a web browser HTML application built on a Netscape Navigator browser, an Oracle Application Server (OAS), which served as the Common Object Request Broker Architecture (CORBA) Object Transaction Service (OTS), and an Oracle8 database server. This section extends the original research and describes the preferred solution of ATOMS as an extension to any operating system platform, which is accomplished by considering the database as a ubiquitous operating system subsystem.

The previous section developed ATOMS to support an asynchronous socket because for any transaction architecture to transcend leaf-node control, the architecture would require persistent distributed state information on all participating nodes. ATOMS is a distributed object architecture that supports (1) write consistency by surrendering leaf-node control, (2) clock synchronization by adopting a relative clock and (3) fault recovery through a collection of distributed persistent transaction objects across heterogeneous, discretely administered and loosely coupled systems.

The ATOMS architecture is composed of five parts. First, it has a new transaction protocol that leverages 2PC and 3PC protocol archetypes. Second, it has a stored database object with methods to manage the transaction process on any tier of the peer-to-peer or distributed transaction. Third, it has a distributed persistent object that stores the participant transactions components and states while preserving the original data states of transaction target object on any given node participant. Fourth, it has database triggers that prevent changes to or access of transaction target objects at the row level and allow for recovery of original state information. Fifth, it has an active simulation engine that monitors and tunes the relative clock transaction quantum between any participant node in the transaction. This section will address how the first four components are implemented in the context of implementing an extension to Unix that enables fault tolerant asynchronous distributed computing.

Figure 25B:
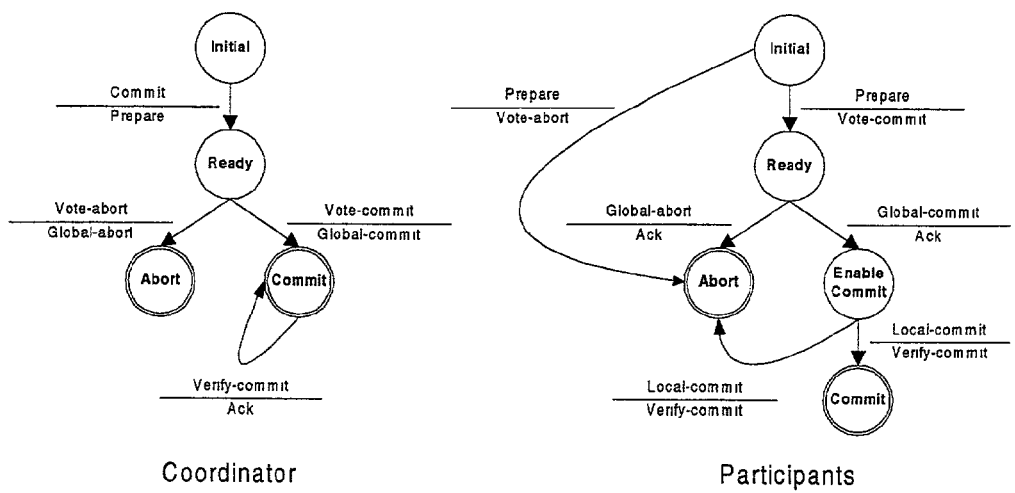
FIG. 25B is a state diagram that depicts a 2PC and 3PC protocol.
Figure 25C:
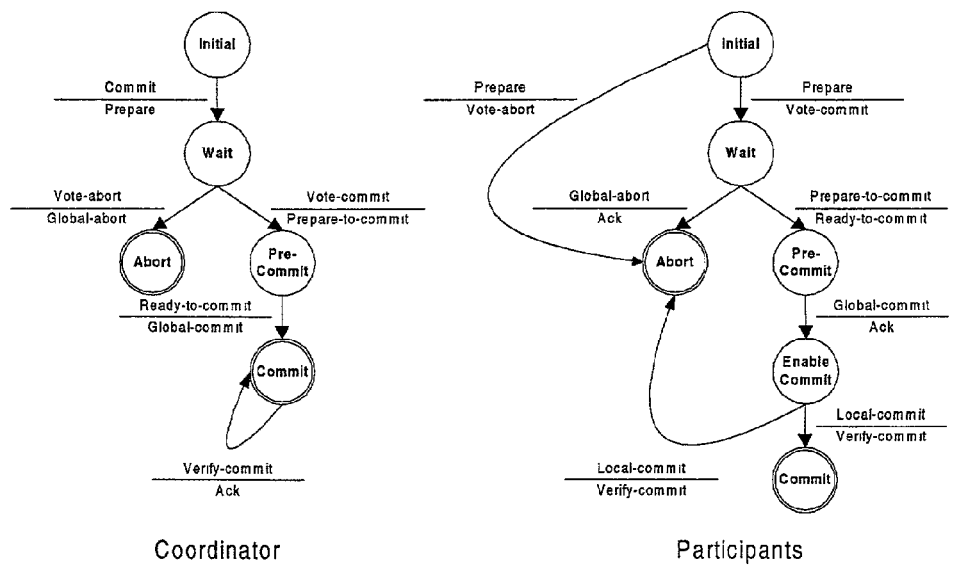
FIG. 25C is a state diagram that depicts a 2PC and 3PC protocol.

By way of foundation, this is brief overview of the transaction protocol architecture developed in the original research. The modification to 2PC and 3PC protocols made by the original research involves adding callback architecture and asynchronous distributed transaction states. FIG. 25B depicts orthogonal state diagrams 2510 of the 2PC and 3PC callback protocols.

In the introduction to this section, the concept is that, in a peer-to-peer model using a 2PC protocol, the transaction state guarantee is provided by an external application accessed by the server-side socket and not by the transaction protocol. This guarantee exists when the underlying transport layer is state-aware, like TCP. With a state-aware transport layer, the external application enables the client side of the socket to place a pessimistic, or exclusive, lock on a transaction object with a guarantee of an ACID compliant transaction process [130] [134] even if the socket terminates unexpectedly. However, a 2PC protocol cannot provide an ACID compliant transaction across a stateless transport layer, like HTTP or HTTPS.

The 2PC callback protocol in FIG. 25B can support an ACID compliant transaction across a stateless transport layer by building a distributed deferred transaction state, which can be accurately labeled an asynchronous socket. Fundamentally, there are two use cases for 2PC transactions. One is a use case for a simple peer-to-peer socket. The other is a use case for a synchronized set of peer-to-peer sockets, which would require a remote controller component, or external application, that would fork two or more client-side sockets to support symmetrical processes for a distributed transaction. As noted in the introduction, the latter use case is more suited to 3PC architecture.

The use case of a simple peer-to-peer socket can be guaranteed by using a 2PC callback protocol provided the client node maintains a listener daemon to receive the callback signal [135] [136]. In short, like the external application executed by the standard server-side socket that guarantees ACID compliant transactions, the asynchronous socket depends on external applications as full duplex pipe [137] interfaces to both the client and server stubs of the socket [138]. The ATOMS transaction architecture incorporates multithreaded socket stubs that use local external applications to maintain and manage persistent and transactional states. The external applications are completely contained within an Oracle8 database server. For example, in an ATOMS model using a 2PC protocol, the participant or server will issue a verify-commit signal to the coordinator or client before making permanent and visible the transactional state data. The participant's callback activity is signaled by a row-level database trigger event on the receipt of the local-commit signal to the transaction object, which is transmitted by the coordinator or client to the participant or server as noted in FIG. 25B above. While the trigger is attempting the callback activity, the transaction object is persistently locked even though there is no persistent connection to the database. If the callback cannot verify successful completion or failure, it will alter the persistent object by setting the transaction object's persistent state flag to pending-callback. The next attempt to access the transaction object for update will result in a message stating that the object is locked pending resolution of a distributed transaction. A daemon process periodically reviews the persistent object for a pending-Callback state, and then re-initiates callback activities to verify whether the transaction should be made permanent or recovered to a prior state.

The process will continue until the coordinator or client becomes available. The only risk of deadlock comes in the form of (a) a deadly embrace [125] when all the conditions noted below are met or (b) starvation can occur when another transaction is polling or queued for the locked transaction object, usually by way of an update statement. Otherwise, the ATOMS transactional model guarantees ACID compliant transactions and autonomous distributed state transactional recovery. The conditions that may cause a deadly embrace deadlock are:

1. A transaction has occurred for a transaction object.
2. The persistent object has marked the transaction object as "pending callback" transaction state.
3. The coordinator or client of the transaction has suffered a catastrophic failure before it could write the transaction to a recoverable repository.
4. The coordinator issues the same or a new transaction against the original transaction object, typically this would be an update statement.

The use case for a synchronized set of peer-to-peer sockets is not much more complex then the simple peer-to-peer use case. The significant difference is that there is more than one participant in some transactions. Moreover, the same behaviors noted for the simple peer-to-peer use case may occur in each of the participant nodes of a distributed transaction. For example, assume that the client stub is located on a server and the server is attempting to fork concurrent parallel threads or synchronized processes through the use of a 2PC protocol. After the coordinator sends the global-commit signal, the coordinator may receive less than one hundred percent of the transactional acknowledgements. In a 2PC protocol, this would force a failure of the transaction within the context of the asynchronous socket and a retransmission of the complete transactions. The overhead linked to retransmission is extremely high and should be avoided where possible. The use of a 3PC callback protocol, shown in Orthogonal State Transitions 2520 of FIG. 25C, ensures that generic failures to connect are caught with a lower cost of transmission and a minimized cost to the distributed object repositories to recover the prior state more effectively and quickly [140].

Figure 26:
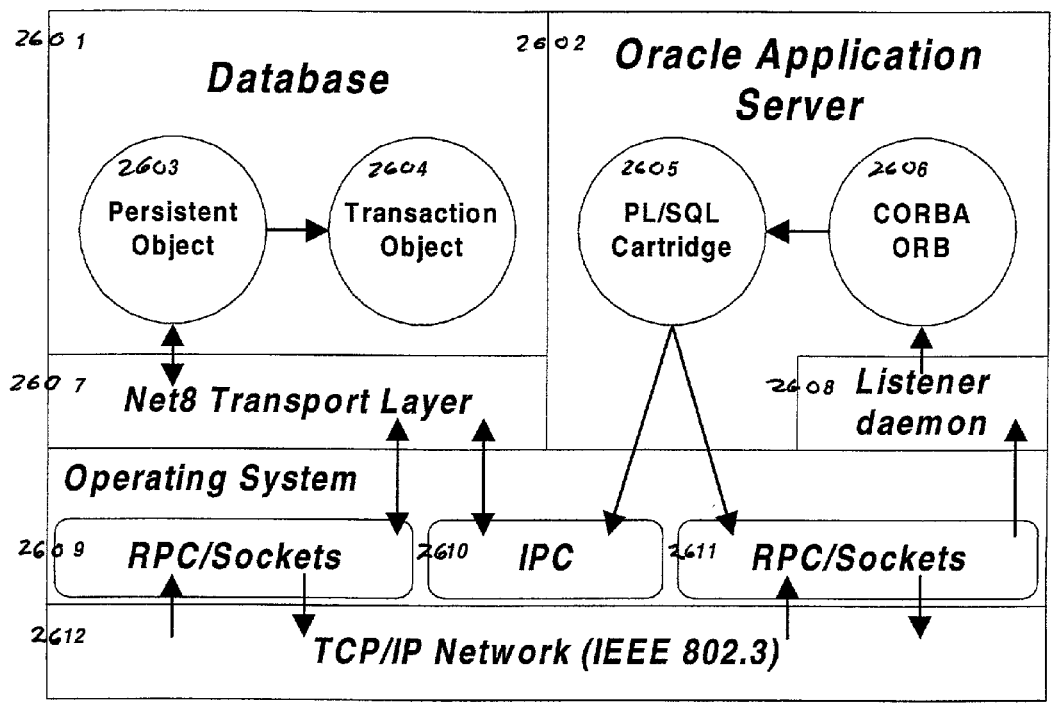
FIG. 26 is a block diagram depicting an asynchronous transaction object management system according to an embodiment of the present invention.

The generalized ATOMS architecture 2540 is shown in FIG. 26. The data flow of a transaction is qualified below. The data flow lines are unidirectional if only an acknowledgement is returned and bidirectional if they can send and receive along the data path, which is required to effect a callback protocol [138]. The ATOMS architecture 2540 is a distributed architecture and hence a copy will reside on all client-stub and server-stub socket machines participating in an asynchronous socket. In the configuration presented, the OAS 2602 component may or may not reside on the same physical machine. If the OAS 2602 is on the same physical machine, then communication will be effected by Internal Process Control 2610 (IPC) structures. Otherwise, the communication between the OAS 2602 and database 2601 will be through sockets across a state-aware transport layer. The following qualifies a simple peer-to-peer transaction where the coordinator is actually a middle-tier CORBA ORB 2606, or business-to-business interchange, and the actual client is an end-user accessing ORB 2606. The persistent object service of the CORBA ORB in the ATOMS architecture 2600 is an Oracle8 database.

1. The transaction begins when an end-user submits a Uniform Resource Locator (URL) request [141], which is delivered to a physical machine across an HTTP protocol to listener daemon 2608 or an HTTP server on the middle-tier.
2. On the middle-tier, a listener daemon 2608 or the HTTP server determines if the URL is for a static webpage, CGI program or dynamic cartridge and routes dynamic cartridge requests through the middle-tier CORBA ORB 2606.
3. The CORBA ORB 2606 on the middle-tier interprets the request and routes it to a specific cartridge 2605 on the middle-tier.
4. The specific cartridge 2605 on the middle tier, which has an embedded PL/SQL object [142] that accesses a persistent connection to an Oracle8 Database 2601 on the middle tier, which is done via RPC/Sockets 2611, TCP/IP Network 2612, RPC/Sockets 2609, and Net8 transport layer 2607.
5. The embedded PL/SQL object call invokes a method of a persistent object 2603 on the middle-tier and stores the structure of the PL/SQL transaction requested in a persistent object 2603 on the middle-tier. The embedded PL/SQL object then manages the remote transaction object 2604 by executing a remote method invocation for the prepare state as qualified in FIG. 25B by updating or inserting a row. It should be noted that the middle-tier does not contain a copy of a transaction object 2604 because it is only a broker in the transaction architecture.
6. The persistent object 2603 on the middle-tier records the desired transaction and then makes a call to a known server address to establish an asynchronous socket. The asynchronous socket may be with a distinctly different physical machine or separate environment on the same physical machine across an HTTP protocol via an HTTP listener daemon or server for the prepare state as qualified in FIG. 25B. The persistent object 2603 is transmitted from the middle-tier to the application-tier as a data stream, as a flattened or collapsed object.
7. On the application tier, a listener daemon 2608 or an HTTP server determines if the URL is for a static webpage, CGI program or dynamic cartridge and routes dynamic cartridge requests through the CORBA ORB 2606 on the application-tier for the prepare state as qualified in FIG. 25B.
8. The CORBA ORB 2606 on the application-tier interprets the request and routes it to a specific cartridge 2605 on the application-tier for the prepare state as qualified in FIG. 25B.
9. The specific cartridge 2605 on the application-tier, which has an embedded PL/SQL object [142] that accesses a persistent connection to the Oracles database 2601 on the application tier, which is done through the IPC 2610 or TCP socket through the Net8 transport layer 2607 for the prepare state as qualified in FIG. 25B.
10. The embedded PL/SQL object on the application-tier invokes a method of the persistent object 2603 on the application-tier, which then manages a transaction object 2604 on the application-tier for the prepare state as qualified in FIG. 25B. After altering the state of the transaction object 2604, the embedded PL/SQL object returns an acknowledgment to the PL/SQL persistent object 2603 on the middle-tier.
11. On the middle-tier, the embedded PL/SQL object call receives the acknowledgement from the participant and invokes a method of the persistent object 2603 on the middle-tier to change the transaction-state within the persistent object 2603.

12. The persistent object 2603 on the middle-tier records the desired transaction and then makes a call to a known server address to establish an asynchronous socket. The asynchronous socket may be with a distinctly different physical machine or separate environment on the same physical machine across an HTTP protocol via a HTTP listener daemon or server for the global-commit state as qualified in FIG. 25B.
13. On the application-tier, the listener daemon 2608 or HTTP server determines if the URL is for a static webpage, CGI program or dynamic cartridge and routes dynamic cartridge requests through the CORBA ORB 2606 on the application-tier for the global-commit state as qualified in FIG. 25B.
14. The CORBA ORB 2606 on the application-tier interprets the request and routes it to a specific cartridge 2605 on the application-tier for the global-commit state as qualified in FIG. 25B.
15. The embedded PL/SQL object in specific cartridge 2605 on the application-tier that accesses a persistent connection to the Oracle8 Database 2601 on the application-tier, which is done through an IPC 2610 or TCP socket through Net8 transport layer 2607 for the global-commit state as qualified in FIG. 25B.
16. The embedded PL/SQL object on the application-tier call invokes a method of the persistent object 2603 on the application-tier, which then manages the transaction object 2604 on the application-tier for the global-commit state as qualified in FIG. 25B and creates a database event that fires a database trigger that begins the callback process (e.g., see step 18 below). After altering the state of the transaction object 2604, the embedded PL/SQL object returns an acknowledgment to the persistent object 2603 on the middle-tier.
17. On the middle-tier, the embedded PL/SQL object call receives the acknowledgement from the participant and invokes a method of persistent object 2603 on the middle-tier to change the transaction-state within persistent object 2603 to completed.
18. The database trigger invokes a method of persistent object 2603 on the middle-tier that invokes a callback to the coordinator or client-server stub on the middle-tier to establish an asynchronous socket and verify that the transaction-state is completed.
19. If the coordinator or client-side stub on the middle-tier verifies persistent object 2603 for the transaction ID value is completed, then the middle-tier returns an affirmative acknowledgment to the participant or application-tier persistent object 2603 instance.
20. On the application-tier, the embedded PL/SQL object in specific cartridge 2605 that updates persistent object 2603 with the information and the transaction is concluded; however, if the transaction is not completed, then the state of the unqualified transaction is set to pending-callback. This is done so that recovery of prior state is deferred until the next attempt to lock transaction object 2604 record, which may in some cases facilitate a transaction recovery if the middle-tier becomes available and the clean-up batch program runs.
21. A batch program periodically runs through to attempt to cleanup pending-callback transactions. The batch program is not depicted in FIG. 26 above.

The difference between the simple peer-to-peer use case and the synchronized set of peer-to-peer sockets is two parts. First, the synchronized set of peer-to-peer sockets would use 3PC callback protocol to minimize the risk of consuming machine processing resources when a distributed transaction is unable to secure one or more participant servers. Second, the step 12 through 21 would be done for each instance of a participant server in a distributed transaction.

Exemplary Operating System Implementation of Atoms

The feasibility of ACID compliant transactions across a stateless network through an asynchronous socket has been established. The asynchronous socket guarantees (1) write consistency by surrendering leaf-node control, (2) clock synchronization by adopting a relative clock and (3) fault recovery through a collection of distributed persistent transaction objects on heterogeneous, discretely administered and loosely coupled systems. However, the implementation of the asynchronous socket provided a limited architecture and data type and structure dependencies because of its dependency on the Oracle Application Server (OAS) as the CORBA ORB. Therefore, a possibly more generic and structure independent architecture is described as an extension to the UNIX operating system, which can support the CORBA or Java Remote Method Invocation (RMI) paradigms.

Figure 27B:
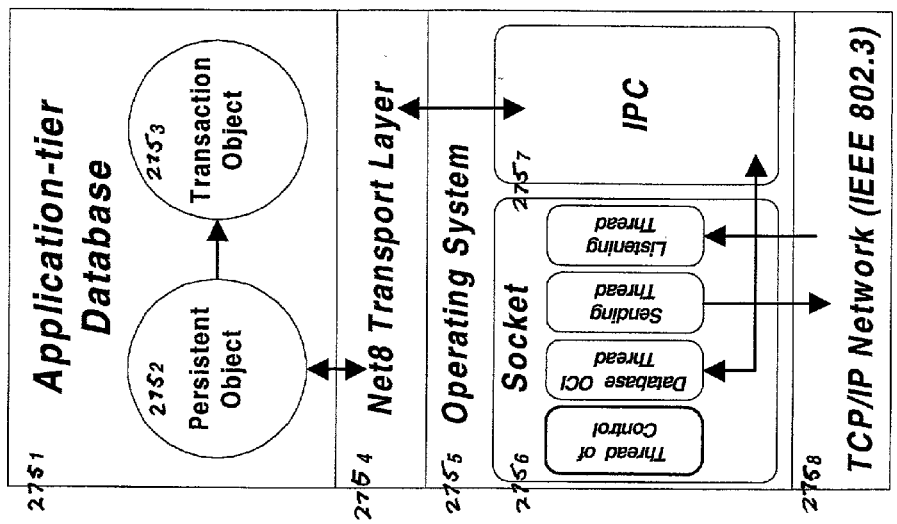
FIG. 27B is a block diagram depicting an asynchronous transaction object management system for an operating system according to an embodiment of the present invention.
Figure 27A:
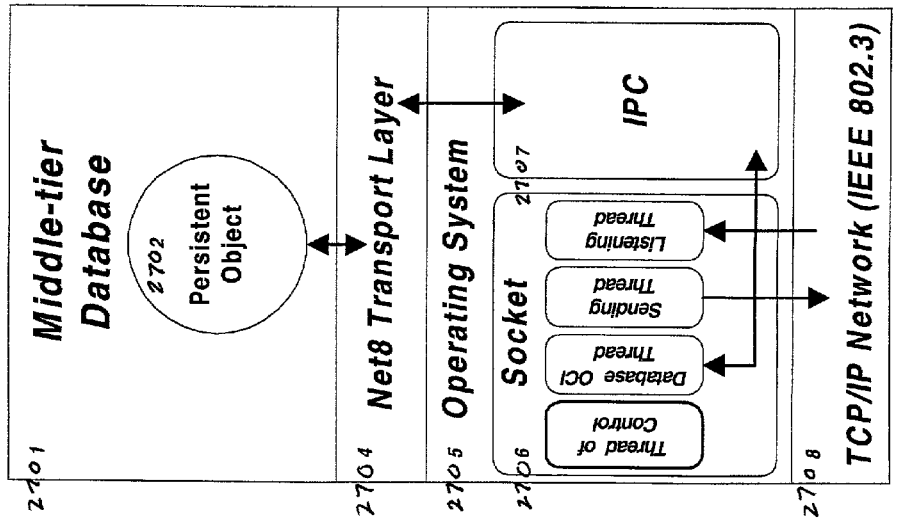
FIG. 27A is a block diagram depicting an asynchronous transaction object management system for an operating system according to an embodiment of the present invention.

The ATOMS architecture when incorporated within an operating system may reduce the complexity of the solution because it eliminates the need for an OAS, an PL/SQL Cartridge, a Spyglass listener, and potential faults introduced by remote procedure calls (RPC) and TCP/IP sockets. The latter two components are found in FIG. 26 as items 2609 and 2610. They exist because of the deployment configuration options that exist with the OAS product. These components are replaced by providing a POSIX compliant multithreaded socket, shown as socket daemons 2706 and 2756 in FIGS. 27A and 27B. FIG. 27A shows Middle Tier ATOMS Operating System Architecture 2700 for the middle-tier nodes, which does not have a transaction object, and Application-Tier ATOMS Operating System Architecture 2750 for the application-tier or participant server nodes, which has transaction object 2753.

ATOMS architecture 2600 components are replaced by OS asynchronous socket threads in an asynchronous socket daemons 2706 and 2756. First, the OAS Spyglass listener daemon 2608 is replaced by listening threads in socket daemons 2706 and 2756 dedicated to HTTP listening. Second, the OAS CORBA ORB 2606 is replaced by thread of control in socket daemons 2706 and 2756, which manages thread pools and global state structures shared between threads. Third, the PL/SQL Cartridge is replaced by a pool of Oracle Call Interface (OCI) threads in socket daemons 2706 and 2756. Oracle Call Interface (OCI) threads in socket daemon 2706 maintain persistent connections to middle-tier database 2701, and Oracle Call Interface (OCI) threads in socket daemon 2756 maintain persistent connections to application-tier database 2751. Fourth, the RPC and TCP/IP sockets become standard throughout the implementation as the combination of listener and sending threads in socket daemons 2706 and 2756. The elimination of the RPC and TCP/IP sockets means that all communication will be via the HTTP/HTTPS protocol and URL commands.

The HTTP/HTTPS specification is a stateless protocol and supports two command structures or methods and they are the get and post methods. The get method has a limitation of 254 characters for arguments, whereas the post method passes arguments via standard in (STDIN) and standard out (STDOUT). The Middle-Tier ATOMS Operating System Architecture 2700 and Application-Tier ATOMS Operating System Architecture 2750 implement URL commands with the post method; transaction cookies will not be maintained in the file system but will be maintained in the persistent objects 2702 and 2752 within in an Oracle8 database along with instances of the persistent class. An instance of the persistent class fills the role of a distributed application that maintains the state and relative scope of the transaction across all participating nodes. For expanded scope on the functions of the persistent object, please refer to the original paper on ATOMS.

The asynchronous socket daemon 2706 and 2756 are built on a principal of a pipeline threaded model [139], which assumes a long stream of data, a series of subtasks and distinct processing components. Asynchronous socket daemons 2706 and 2756 employ the thread of control as a thread pool resource monitor and global repository for shared information between the threads. Each instance of the persistent object must be stored in a native C++ class array within the thread of control's global repository. Mutex variables control access to instances of the C++ class in the global repository by enforcing preemptory locking. The thread of control will periodically monitor actual load on pre-spawned thread pools, determine whether additional threads need to be added or existing threads removed from the pools, and add or remove threads from the pools as needed.

The OCI threads will act as an interpreter for the asynchronous socket daemons 2706 and 2756. In particular, an OCI thread in asynchronous socket daemon 2756 will monitor the array of C++ class instances for new or updated instances of the array and establish a mutex lock on the instance. Then, the OCI thread invokes persistent object 2752 methods to (a) create new instances of the persistent object in the application-tier database 2751 or (b) modify transaction states in the application-tier database 2751. The OCI thread will receive acknowledgements from the persistent object 2752, transfer the state information to the global state repository's array of C++ class instances, and then remove the mutex lock on the object instance. OCI threads in asynchronous socket 2706 operate similarly to those in asynchronous sockets 2756.

The sending threads in asynchronous socket daemons 2706 and 2756 have two roles. For the middle-tier (i.e. Middle-Tier ATOMS Operating System Architecture 2700), the sending thread listens for new and updated instances of the C++ array of class instances and sends initial messages to new participants and update messages to existing participants. On the application-tier, (i.e. Application-Tier ATOMS Operating System Architecture 2750) the sending thread listens for updates in the array of C++ class instances, examines those that are not locked by mutex variables and sends the acknowledgement back to the middle-tier socket that generated the request.

The listening thread in asynchronous socket daemons 2706 and 2756 are HTTP listeners that route an incoming data stream to the thread of control's array of C++ class instances and mimics the behavior of a traditional server-stub socket. Each listening thread is linked to a specific port but additional listening threads can be added for different ports. However, attention to the management of the global state becomes an issue when two or more threads are simultaneously adding to the array of C++ class instances as opposed to updates.

Asynchronous socket daemons 2706 and 2756 localize four components of the ATOMS Architecture into a single multi-threaded process, an implementation not constrained by resource overhead costs or supported platforms limitations of the OAS server. The use of a multi-threaded process ensures that the application will be more fault tolerant by eliminating synchronization and integration issues while improving response time at a lower resource cost.

The OCI threads in asynchronous socket daemons 2706 and 2756 interact with databases 2701 and 2751 using OCI. However, databases 2701 and 2751 may be any commercially available database system, many of which support an interface different than OCI. In an implementation that uses an non-Oracle database system, threads that perform the function of the OCI threads described herein may instead interact with the database system using a different interface standard or protocol. Therefore, it should be understood that the present invention should not be limited to databases that support OCI, or databases developed by a particular database system developer, such as Oracle Corporation.

The operating system solution provided is capable of easy integration into CORBA or into the evolving Java specification for RMI, by expanding the Java virtual machine (JVM) engine with ATOMS enabled socket stubs. The elimination of a complex set of pieces into a multi-threaded process positions the Middle-Tier ATOMS Operating System Architecture 2700 and Application-Tier ATOMS Operating System Architecture 2750 or asynchronous socket for wide adoption in distributed computing solutions.

Alternative Embodiments

Atoms

ATOMS can be written into the Java API to support RMI asynchronous sockets. ATOMS can be used for guaranteed multicast to network connected computers or cellular devices, like pagers. ATOMS that is based on operating system sockets can be implemented in network interface cards (NICs) by extending the IEEE 802.3 specification, which would increase throughput. However, this solution will require an integration code segment in the hardware control layer of the operating system that would enable the ATOMS socket in the NIC to call the persistent object in the database.

Monitoring Latency

DAI components can include a node avoidance component that would examine routing packet information for latency issues on one or more nodes. The additional information can be used to pre-route packets away from specific intermediate nodes on the Internet. The DAI components could be deployed on a router to do tunnel pair analysis and then compare the classic routing table link-cost against aggregate and relative packet transit times. This effectively makes the router self-optimizing while not directly increase algorithmic resolution of the problem.

Hardware Overview

Figure 28:
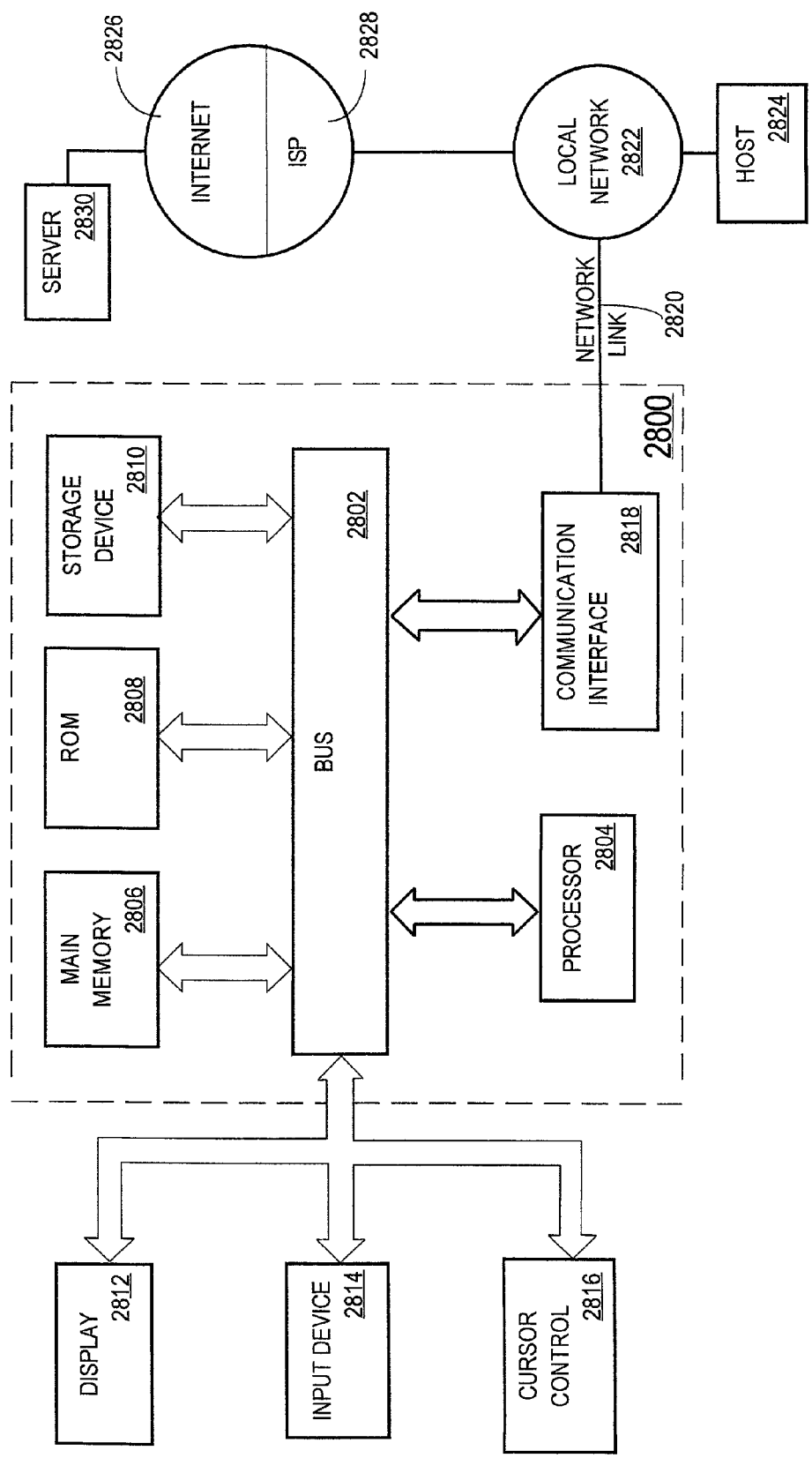
FIG. 28 is a block diagram of a computer system which may be used to implement an embodiment of the present invention.

FIG. 28 is a block diagram that illustrates a computer system 2800 which may be used to implement an embodiment of the invention. Computer system 2800 includes a bus 2802 or other communication mechanism for communicating information, and a processor 2804 coupled with bus 2802 for processing information. Computer system 2800 also includes a main memory 2806, such as a random access memory (RAM) or other dynamic storage device, coupled to bus 2802 for storing information and instructions to be executed by processor 2804. Main memory 2806 also may be used for storing temporary variables or other intermediate information during execution of instructions to be executed by processor 2804. Computer system 2800 further includes a read only memory (ROM) 2808 or other static storage device coupled to bus 2802 for storing static information and instructions for processor 2804. A storage device 2810, such as a magnetic disk or optical disk, is provided and coupled to bus 2802 for storing information and instructions.

Computer system 2800 may be coupled via bus 2802 to a display 2812, such as a cathode ray tube (CRT), for displaying information to a computer user. An input device 2814, including alphanumeric and other keys, is coupled to bus 2802 for communicating information and command selections to processor 2804. Another type of user input device is cursor control 2816, such as a mouse, a trackball, or cursor direction keys for communicating direction information and command selections to processor 2804 and for controlling cursor movement on display 2812. This input device typically has two degrees of freedom in two axes, a first axis (e.g., x) and a second axis (e.g., y), that allows the device to specify positions in a plane.

The invention is related to the use of computer system 2800 for implementing the techniques described herein. According to one embodiment of the invention, those techniques are implemented by computer system 2800 in response to processor 2804 executing one or more sequences of one or more instructions contained in main memory 2806. Such instructions may be read into main memory 2806 from another computer-readable medium, such as storage device 2810. Execution of the sequences of instructions contained in main memory 2806 causes processor 2804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2804 for execution. Such a medium may take many forms, including but not limited to, non-volatile media, volatile media, and transmission media. Non-volatile media includes, for example, optical or magnetic disks, such as storage device 2810. Volatile media includes dynamic memory, such as main memory 2806. Transmission media includes coaxial cables, copper wire and fiber optics, including the wires that comprise bus 2802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2804 for execution. For example, the instructions may initially be carried on a magnetic disk of a remote computer. The remote computer can load the instructions into its dynamic memory and send the instructions over a telephone line using a modem. A modem local to computer system 2800 can receive the data on the telephone line and use an infra-red transmitter to convert the data to an infra-red signal. An infra-red detector can receive the data carried in the infra-red signal and appropriate circuitry can place the data on bus 2802. Bus 2802 carries the data to main memory 2806, from which processor 2804 retrieves and executes the instructions. The instructions received by main memory 2806 may optionally be stored on storage device 2810 either before or after execution by processor 2804.

Computer system 2800 also includes a communication interface 2818 coupled to bus 2802. Communication interface 2818 provides a two-way data communication coupling to a network link 2820 that is connected to a local network 2822. For example, communication interface 2818 may be an integrated services digital network (ISDN) card or a modem to provide a data communication connection to a corresponding type of telephone line. As another example, communication interface 2818 may be a local area network (LAN) card to provide a data communication connection to a compatible LAN. Wireless links may also be implemented. In any such implementation, communication interface 2818 sends and receives electrical, electromagnetic or optical signals that carry digital data streams representing various types of information.

Network link 2820 typically provides data communication through one or more networks to other data devices. For example, network link 2820 may provide a connection through local network 2822 to a host computer 2824 or to data equipment operated by an Internet Service Provider (ISP) 2828. ISP 2828 in turn provides data communication services through the world wide packet data communication network now commonly referred to as the "Internet" 2828. Local network 2822 and Internet 2828 both use electrical, electromagnetic or optical signals that carry digital data streams. The signals through the various networks and the signals on network link 2820 and through communication interface 2818, which carry the digital data to and from computer system 2800, are exemplary forms of carrier waves transporting the information.

Computer system 2800 can send messages and receive data, including program code, through the network(s), network link 2820 and communication interface 2818. In the Internet example, a server 2830 might transmit a requested code for an application program through Internet 2828, ISP 2828, local network 2822 and communication interface 2818. In accordance with the invention, one such downloaded application implements the techniques described herein.

The received code may be executed by processor 2804 as it is received, and/or stored in storage device 2810, or other non-volatile storage for later execution. In this manner, computer system 2800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

Bibliography

[1] R. Orfali, D. Harkey, and J. Edwards, *Essential Client/Server Survival Guide*. New York, N.Y.: John Wiley & Sons, 1994, pp. 30–32.

[2] FTP, *PC/TCP Interoperability*: FTP Software, Incorporated, 1993, pp. 4.1–4.23.

[3] A. S. Tanenbaum, *Modern Operating Systems*. Upper Saddle River: Prentice Hall, 1992, pp. 366–373.

[4] A. S. Tanenbaum, *Modern Operating Systems*. Upper Saddle River: Prentice Hall, 1992, pp. 402–417.

[5] P. A. Bernstein and E. Newcomer, *Principles of Transaction Processing for the Systems Professional*. San Francisco, Calif.: Morgan Kauffmann Publishers, 1997, pp. 23–28.

[6] N. E. Fenton and S. L. Pfleeger, *Software Metrics*, 2nd Edition ed. London, UK: PWS Publishing Company, 1996, pp. 36–45.

[7] M. K. Chandy, A. Rifkin, P. Sivilotti, A. G., J. Mandelson, M. Richardson, W. Tanaka, and L. Weisman, "A World-Wide Distributed System Using Java and the Internet," presented at IEEE International Symposium on High Performance Distributed Computing, Syracuse, 1996.

[8] P. A. Bernstein and E. Newcomer, *Principles of Transaction Processing for the Systems Professional*. San Francisco, Calif.: Morgan Kauffmann Publishers, 1997, pp. 35–72.

[9] J. Gray and A. Reuter, *Transaction Processing: Concepts and Techniques*. San Francisco, Calif.: Morgan Kauffman Publishers, 1993, pp. 5–7.

[10] R. Chow and T. Johnson, *Distributed Operating Systems & Algorithms*. Reading: Addison-Wesley, 1997, pp. 124–125.

[11] J. Gray and A. Reuter, *Transaction Processing: Concepts and Techniques*. San Francisco, Calif.: Morgan Kauffman Publishers, 1993, pp. 159–221.

[12] Oracle, *Oracle7 PL/SQL User's Guide and Reference*, vol. Part #A32542-1, Release 7.3 ed. Redwood Shores, Calif., 1996, pp. 5.43.

[13] J. E. B. Moss, "Nested Transactions: An Approach to Reliable Computing," Massachusetts Institute of Technology, Cambridge, Mass. LCS-TR-260, 1981.

[14] J. Gray and A. Reuter, *Transaction Processing: Concepts and Techniques*. San Francisco, Calif.: Morgan Kauffman Publishers, 1993, pp. 239–290.

[15] J. Gray and A. Reuter, *Transaction Processing: Concepts and Techniques*. San Francisco, Calif.: Morgan Kauffman Publishers, 1993, pp. 293–371.

[16] X/Open, *Distributed Transaction Processing: The TX Specification*. Reading, UK: X/Open Company Ltd., 1993.

[17] X/Open, *Distributed Transaction Processing: The XA Specification*. Reading, UK: X/Open Company Ltd., 1993.

[18] E. Simons, *Distributed Information Systems: from client/server to distributed multimedia*. Berkshire, UK: McGraw-Hill Publishing Company, 1996, pp. 265–285.

[19] T. M. Connolly, C. E. Begg, and A. Strachan, *Database Systems: A Practical Approach to Design, Implementation, and Management*, 2nd ed. Harlow, U.K.: Addison-Wesley, 1999, pp. 645–727.

[20] R. Orfali, D. Harkey, and J. Edwards, *The Essential Distributed Objects Survival Guide*. New York, N.Y.: John Wiley & Sons, Inc., 1996, pp. 1–20.

[21] OMG, "CORBAservices: Common Object Services Specification," Object Management Group, Farmingham, Mass., Specification CORBAspecification, November 1997.

[22] R. Orfali, D. Harkey, and J. Edwards, *Instant CORBA*. New York, N.Y.: John Wiley & Sons, 1997, pp. 3–28.

[23] R. Geraghty, S. Joyce, T. Moriarty, and G. Noone, *COM-CORBA Interoperability*. Upper Saddle River, N.J.: Prentice-Hall, 1999, pp. 53–88.

[24] R. Grimes, *Professional DCOM Programming*. Birmingham, U.K.: WROX Press, 1997, pp. 32.

[25] E. Cobb, "Issues when making object middleware scalable," *Middleware Spectra*, vol. 12, 1998.

[26] E. Cobb, "The Impact of Object Technology on Commercial Transaction Processing," *VLDB Journal*, vol. 6, pp. 173–190, 1997.

[27] A. S. Gokhale and D.C. Schmidt, "Measuring and Optimizing CORBA Latency and Scalability Over High-Speed Networks," *IEEE Transactions on Computers*, vol. 47, pp. 391–413, 1998.

[28] R. Chow and T. Johnson, *Distributed Operating Systems & Algorithms*. Reading, Mass.: Addison-Wesley, 1997, pp. 404–412.

[29] E. Felten, D. Balfanz, D. Dean, and D. Wallach, "Web Spoofing: An Internet Con Game," *Technical Report* 540–96 (revised), Department of Computer Science, Department of Computer Science, Princeton University, 1997.

[30] A. K. Ghosh, *E-Commerce Security: Weak Links, Best Defenses*. New York, N.Y.: Wiley Computer Publishing, 1998, pp. 97–156.

[31] A. K. Ghosh, *E-Commerce Security: Weak Links, Best Defenses*. New York, N.Y.: Wiley Computer Publishing, 1998, pp. 157–204.

[32] OMG, "CORBAservices: Common Object Services Specification," Object Management Group, Farmingham, Mass., Specification CORBAspecification, November 1997.

[33] OMG, "CORBAservices: Common Object Services Specification," Object Management Group, Farmingham, Mass. November 1997.

[34] Oracle, *Oracle7 Server Distributed Systems: Volume 1: Distributed Data*, vol. Part #A32542-1, Release 7.3 ed. Redwood Shores, Calif., 1996.

[35] Oracle, *Oracle8 Server Distributed Database Systems*, vol. Part #A54645-01, Release 8.0 ed. Redwood Shores, Calif.: Oracle Corporation, 1997.

[36] N. E. Fenton and S. L. Pfleeger, *Software Metrics*, 2nd Edition ed. London, UK: PWS Publishing Company, 1996, pp. 45–53.

[37] J. T. McClave and P. G. Benson, *Statistics for Business and Economics*, 6th Edition ed. Englewood Cliffs: Prentice Hall, 1994, pp. 304–309.

[38] OMG, "CORBAservices: Common Object Services Specification," Object Management Group, Farmingham, Mass., Specification CORBAspecification, November 1997.

[39] OMG, "CORBAservices: Common Object Services Specification," Object Management Group, Farmingham, Mass., Specification CORBAspecification, November 1997.

[40] OMG, "CORBAservices: Common Object Services Specification," Object Management Group, Farmingham, Mass., Specification CORBAspecification, November 1997.

[41] OMG, "CORBAservices: Common Object Services Specification," Object Management Group, Farmingham, Mass., Specification CORBAspecification, November 1997.

[42] OMG, "CORBAservices: Common Object Services Specification," Object Management Group, Farmingham, Mass., Specification CORBAspecification, November 1997.

[43] T. M. Connolly, C. E. Begg, and A. Strachan, *Database Systems: A Practical Approach to Design, Implementation, and Management,* 2nd ed. Harlow, U.K.: Addison-Wesley, 1999, pp. 708–711.

[44] E. Simons, *Distributed Information Systems: from client/server to distributed multimedia.* Berkshire, UK: McGraw-Hill Publishing Company, 1996, pp. 271–273.

[45] R. Chow and T. Johnson, *Distributed Operating Systems & Algorithms.* Reading, Mass.: Addison-Wesley, 1997, pp. 53–59.

[46] J. A. O'Brien, *Management Information Systems: A Managerial End User Perspective,* 2nd ed. Burr Ridge: Richard D. Irwin, 1993, pp. 308–309.

[47] J. A. O'Brien, *Management Information Systems: A Managerial End User Perspective,* 2nd ed. Burr Ridge: Richard D. Irwin, 1993, pp. 152–153.

[48] N. Nissanke, *Realtime Systems.* London: Prentice Hall, 1997, pp. 1–14.

[49] J. A. O'Brien, *Management Information Systems: A Managerial End User Perspective,* 2nd ed. Burr Ridge: Richard D. Irwin, 1993, pp. 310–315.

[50] N. Nissanke, *Realtime Systems.* London: Prentice Hall, 1997, pp. 51–62.

[51] N. Nissanke, *Realtime Systems.* London: Prentice Hall, 1997, pp. 2.

[52] J. Gray and A. Reuter, *Transaction Processing: Concepts and Techniques.* San Francisco, Calif.: Morgan Kauffman Publishers, 1993, pp. 246.

[53] N. Nissanke, *Realtime Systems.* London: Prentice Hall, 1997, pp. 354–359.

[54] Oracle, *Oracle Applications Installation Manual, Release 10 for MS Windows Clients,* vol. Part #A54985-02, 10.7.16.1SC ed. Redwood Shores: Oracle Corporation, 1997, pp. 2.1–2.28.

[55] Oracle, *Oracle Installer Programmer's Reference,* vol. Part #A47444-2, Release 3.1 ed. Redwood Shores: Oracle Corporation, 1996, pp. 2.1–2.22.

[56] Oracle, *Oracle Applications, Release 11 for Windows NT Architecture,* vol. Part #A63472–01. Redwood Shores: Oracle Corporation, 1998, pp. 1.1–1.16.

[57] S. Schatt, *Data Communications for Business.* Englewood Cliffs: Prentice Hall, 1994, pp. 187–197.

[58] S. Schatt, *Data Communications for Business.* Englewood Cliffs: Prentice Hall, 1994, pp. 204–235.

[59] Oracle, *Developer/2000, Release 1.6, Deploying Applications on the Web,* vol. Part #A57514-01, Release 1.6.1: Deploying Applications on the Web ed. Redwood Shores: Oracle Corporation, 1998, pp. 1.1–1.20.

[60] T. M. Connolly, C. E. Begg, and A. Strachan, *Database Systems: A Practical Approach to Design, Implementation, and Management,* 2nd ed. Harlow, U.K.: Addison-Wesley, 1999, pp. 896–899.

[61] E. F. Codd, "A Relational Model of Data for Large Shared Databanks," *Communications of the ACM,* pp. 377–387, 1970.

[62] J. A. O'Brien, *Management Information Systems: A Managerial End User Perspective,* 2nd ed. Burr Ridge: Richard D. Irwin, 1993, pp. 240–248.

[63] T. M. Connolly, C. E. Begg, and A. Strachan, *Database Systems: A Practical Approach to Design, Implementation, and Management,* 2nd ed. Harlow, U.K.: Addison-Wesley, 1999, pp. 1–37.

[64] D. M. Kroenke, *Database Processing, Fundamentals, Design, and Implementation,* 6th ed. Englewood Cliffs: Prentice Hall, 1998, pp. 16–20.

[65] T. M. Connolly, C. E. Begg, and A. Strachan, *Database Systems: A Practical Approach to Design, Implementation, and Management,* 2nd ed. Harlow, U.K.: Addison-Wesley, 1999, pp. 38–70.

[66] D. M. Kroenke, *Database Processing, Fundamentals, Design, and Implementation,* 6th ed. Englewood Cliffs: Prentice Hall, 1998, pp. 25–46.

[67] T. M. Connolly, C. E. Begg, and A. Strachan, *Database Systems: A Practical Approach to Design, Implementation, and Management,* 2nd ed. Harlow, U.K.: Addison-Wesley, 1999, pp. 441–448.

[68] D. M. Kroenke, *Database Processing, Fundamentals, Design, and Implementation,* 6th ed. Englewood Cliffs: Prentice Hall, 1998, pp. 111–136.

[69] T. M. Connolly, C. E. Begg, and A. Strachan, *Database Systems: A Practical Approach to Design, Implementation, and Management,* 2nd ed. Harlow, U.K.: Addison-Wesley, 1999, pp. 728–737.

[70] T. M. Connolly, C. E. Begg, and A. Strachan, *Database Systems: A Practical Approach to Design, Implementation, and Management,* 2nd ed. Harlow, U.K.: Addison-Wesley, 1999, pp. 737–753.

[71] Oracle, *Oracle8 Server Concepts,* vol. Volume 1, Part #A54646-01. Redwood Shores: Oracle Corporation, 1998, pp. 10.1–11.16.

[72] E. F. Codd, "The 1981 ACM Turing Award Lecture: A practical foundation for productivity," *Communications of the ACM,* vol. 25, pp. 109–117, 1982.

[73] T. M. Connolly, C. E. Begg, and A. Strachan, *Database Systems: A Practical Approach to Design, Implementation, and Management,* 2nd ed. Harlow, U.K.: Addison-Wesley, 1999, pp. 557–602.

[74] Oracle, *Oracle Applications, Release 11 for Unix Installation,* vol. Part #57983-02. Redwood Shores: Oracle Corporation, 1998, pp. 4.10–4.38.

[75] T. M. Ozsu and P. Valduriez, *Principles of Distributed Database Systems,* 2nd ed. Upper Saddle River, N.J.: Prentice Hall, 1999, pp. 82–96.

[76] A. S. Tanenbaum, *Distributed Operating Systems.* Upper Saddle River: Prentice-Hall, 1995, pp. 9–15.

[77] E. Simons, *Distributed Information Systems: from client/server to distributed multimedia.* Berkshire, UK: McGraw-Hill Publishing Company, 1996, pp. 269–273.

[78] R. Chow and T. Johnson, *Distributed Operating Systems & Algorithms.* Reading: Addison-Wesley, 1997, pp. 425–463.

[79] J. Banks, J. S. Carson, and B. L. Nelson, *Discrete-Event System Simulation.* Upper Saddle River: Prentice Hall, 1996, pp. 1–19.

[80] W. Duncan, *A Guide to the Project Management Body of Knowledge*: Project Management Institute, 1996, pp. 29–34.

[81] R. N. Charette, "Large-Scale Project Management Is Risk Management," *IEEE Software,* vol. 7, pp. 110–117, 1996.

[82] E. Turban, *Decision Support and Expert Systems: Management Support Systems,* 3rd ed. New York: Macmillan Publishing Company, 1993, pp. 40–49.

[83] B. Stroustrup, *The C++ Programming Language,* 3rd ed. Reading, Mass.: Addison-Wesley, 1997, pp. 221–259.

[84] B. Stroustrup, "Run Time Type Identification for C++," presented at USENIX C++, Portland, Oreg., 1992.

[85] C. Bekker and P. Putter, "Reflective Architectures: Requirements for Future Distributed Environments," *Proceedings of the 4th Workshop on Future Trends of Distributed Computing,* pp. 579–585, 1993.

[86] J. Kleinoder and M. Golm, "MetaJava: An Efficient Run-Time Meta Architecture for Java," presented at Proceedings of the International Workshop on Object Orientation in Operating Systems, Seattle, Wash., 1996.

[87] L. Dynamic Information Systems, *Oracle Web Application Server Handbook*. Berkeley, Calif.: Osborne/McGraw-Hill, 1998, pp. 30–40.

[88] P. Maes, "Computational Reflection (Technical Report 87-2)," Vrieje Universiteit Brussel, Brussel, Belgium, Technical Report 87–2, 1987.

[89] J. Ferber, "Computational Reflection in class based Object-Oriented Languages," presented at Proceedings of the Conference on Object-Oriented Programming, Systems, Languages, and Applications, OOPSLA '89, New Orleans, La., 1989.

[90] J. McManus, "A Proposed Methodology for Knowledge Based System Development," *Software Engineering Notes*, vol. 21, pp. 22–31, 1996.

[91] P. Mi and W. Scacchi, "A Knowledge-Based Environment for Modeling and Simulating Software Engineering Processes," *IEEE Transactions on Knowledge and Data Engineering*, vol. 2, pp. 283–294, 1990.

[92] S. Henninger, "An Evolutionary Approach to Constructing Effective Software Reuse Repositories," *ACM Transactions on Software Engineering and Methodology*, vol. 6, pp. 111–140, 1997.

[93] C. F. Nourani, "Multi-agent Object Level AI Validation and Verification," *Software Engineering Notes*, vol. 21, pp. 70–72, 1996.

[94] J. L. Fiadeiro and T. Maibaum, "Interconnecting Formalisms: Supporting Modularity, Reuse and Incrementality," *Software Engineering Notes*, vol. 20, pp. 72–80, 1995.

[95] G. F. Luger and W. A. Stubblefield, *Artificial Intelligence: Structures and Strategies for Complex Problem Solving*, 3rd ed. Reading: Addison Wesley Longman, Inc, 1997, pp. 613–620.

[96] M. Stefik, *Introduction to Knowledge Systems*. San Francisco: Morgan Kaufmann, 1998, pp. 680–690.

[97] T. M. Ozsu and P. Valduriez, *Principles of Distributed Database Systems*, 2nd ed. Upper Saddle River, N.J.: Prentice Hall, 1999, pp. 545–553.

[98] T. M. Ozsu and P. Valduriez, *Principles of Distributed Database Systems*, 2nd ed. Upper Saddle River, N.J.: Prentice Hall, 1999, pp. 419–434.

[99] N. A. Lynch, *Distributed Algorithms*. San Francisco, Calif.: Morgan Kaufmann, 1996, pp. 184–185.

[100] N. A. Lynch, *Distributed Algorithms*. San Francisco, Calif.: Morgan Kaufmann, 1996, pp. 185–189.

[101] T. M. Ozsu and P. Valduriez, *Principles of Distributed Database Systems*, 2nd ed. Upper Saddle River, N.J.: Prentice Hall, 1999, pp. 380–381.

[102] R. Chow and T. Johnson, *Distributed Operating Systems & Algorithms*. Reading: Addison-Wesley, 1997, pp. 336–344.

[103] N. A. Lynch, *Distributed Algorithms*. San Francisco, Calif.: Morgan Kaufmann, 1996, pp. 715–728.

[104] R. Orfali, D. Harkey, and J. Edwards, *Instant CORBA*. New York, N.Y.: John Wiley & Sons, 1997, pp. 99.

[105] T. M. Ozsu and P. Valduriez, *Principles of Distributed Database Systems*, 2nd ed. Upper Saddle River, N.J.: Prentice Hall, 1999, pp. 390–396.

[106] R. Orfali, D. Harkey, and J. Edwards, *Instant CORBA*. New York, N.Y.: John Wiley & Sons, 1997, pp. 256–262.

[107] Oracle, *Oracle8 Server Concepts*, vol. Volume 1, Part #A54644-01. Redwood Shores: Oracle Corporation, 1998, pp. 10.1–11.16.

[108] FTP, *PC/TCP Interoperability*. North Andover: FTP Software, 1993, pp. 2.4–2.5.

[109] FTP, *PC/TCP Interoperability*. North Andover: FTP Software, 1993, pp. 2.1–2.3.

[110] FTP, *PC/TCP Interoperability*. North Andover: FTP Software, 1993, pp. 3.1–3.19.

[111] S. Garfinkel and G. Spafford, *Web Security & Commerce*. Sebastopol, Calif.: O'Reilly & Associates, 1997, pp. 90–94.

[112] D. Harel, "Statecharts: A Visual Formalism for Complex Systems," *Science of Computer Programming*, pp. 231–274, 1987.

[113] H. Eriksson and M. Penker, *UML Toolkit*. New York, N.Y.: John Wiley & Sons, Incorporated, 1998, pp. 122–131.

[114] C. Larman, *Applying UML and Patterns: An Introduction to Object-Oriented Analysis and Design*. Upper Saddle River, N.J.: Prentice Hall PTR, 1997, pp. 169–170.

[115] H. Eriksson and M. Penker, *UML Toolkit*. New York, N.Y.: John Wiley & Sons, Incorporated, 1998, pp. 136–147.

[116] D. Harvey and S. Beitler, *The Developer's Guide to Oracle Web Application Server 3*. Reading, Mass.: Addison-Wesley, 1998, pp. 32.

[117] Oracle, *PL/SQL User's Guide and Reference 8.1.5*, vol. Part #A67842-01. Redwood Shores: Oracle Corporation, 1999, pp. 4.2–4.29.

[118] B. Stroustrup, *The C++ Programming Language*, 3rd ed. Reading, Mass.: Addison-Wesley, 1997, pp. 431–442.

[119] D. Harvey and S. Beitler, *The Developer's Guide to Oracle Web Application Server 3*. Reading, Mass.: Addison-Wesley, 1998, pp. 1–12.

[120] D. Harvey and S. Beitler, *The Developer's Guide to Oracle Web Application Server 3*. Reading, Mass.: Addison-Wesley, 1998, pp. 158.

[121] H. Kume, *Statistical Methods for Quality Improvement*: The Association for Overseas Technical Scholarship (AOTS), 1985, pp. 231.

[122] Oracle, *PL/SQL User's Guide and Reference 8.1.5*, vol. Part #A67842-01. Redwood Shores: Oracle Corporation, 1999, pp. 7.30–7.31.

[123] T. M. Connolly, C. E. Begg, and A. Strachan, *Database Systems: A Practical Approach to Design, Implementation, and Management*, 2nd ed. Harlow, U.K.: Addison-Wesley, 1999, pp. 39–41.

[124] Gray, J. S., *Interprocess Communications in UNIX*. 2nd ed. 1998, Upper Saddle River, N.J.: Prentice Hall PTR. 272–273.

[125] Nichols, B., D. Buttlar, and J.P. Farrell, *Pthreads Programming*. 1998, Sebastopol, Calif.: O'Reilly. 235–241.

[126] OMG, *CORBA services: Common Object Services Specification*, 1997, Object Management Group: Farmingham, Mass. p. 10–53.

[127] X/Open, Distributed Transaction Processing: The XA Specification. 1993, Reading, UK: X/Open Company Ltd.

[128] OMG, *CORBAservices: Common Object Services Specification*, 1997, Object Management Group: Framingham, Mass.

[129] Lynch, N. A., *Distributed Algorithms*. The Morgan Kaufmann Series in Data Management Systems, ed. J. Gray. 1996, San Francisco, Calif.: Morgan Kaufmann. 184–185.

[130] Gray, J. and A. Reuter, *Transaction Processing: Concepts and Techniques*. 1993, San Francisco, Calif.: Morgan Kauffman Publishers. 5–7.

[131] Rosenblatt, B., *Learning the Korn Shell*. 1994, Sebastopol: O'Reilly & Associates, Inc. 121.

[132] Oracle, *Oracle7 PL/SQL User's Guide and Reference*. Release 7.3 ed. Vol. Part #A32542-1. 1996, Redwood Shores, Calif. 5.43.

[133] Lynch, N. A., *Distributed Algorithms*. The Morgan Kaufmann Series in Data Management Systems, ed. J. Gray. 1996, San Francisco, Calif.: Morgan Kaufmann. 185–189.

[134] Chow, R. and T. Johnson, *Distributed Operating Systems & Algorithms*. 1997, Reading: Addison-Wesley. 124–125.

[135] Harvey, D. and S. Beitler, *The Developer's Guide to Oracle Web Application Server* 3. 1998, Reading, Mass.: Addison-Wesley. 40–43.

[136] Brown, B. D., R. J. Niemiec, and J.C. Trezzo, *Oracle8i Web Development*. 2000, Berkeley: Osborne/McGraw Hill. 293–300.

[137] Gray, J. S., *Interprocess Communications in UNIX*. 2nd ed. 1998, Upper Saddle River, N.J.: Prentice Hall PTR. 124–132.

[138] Gray, J. S., *Interprocess Communications in UNIX*. 2nd ed. 1998, Upper Saddle River, N.J.: Prentice Hall PTR. 278–313.

[139] Nichols, B., D. Buttlar, and J.P. Farrell, *Pthreads Programming*. 1998, Sebastopol, Calif.: O'Reilly. 76–77.

[140] Lynch, N. A., *Distributed Algorithms*. The Morgan Kaufmann Series in Data Management Systems, ed. J. Gray. 1996, San Francisco, Calif.: Morgan Kaufmann. 715–728.

[141] Harvey, D. and S. Beitler, *The Developer's Guide to Oracle Web Application Server* 3. 1998, Reading, Mass.: Addison-Wesley. 32.

[142] Dynamic Information Systems, L., *Oracle Web Application Server Handbook*. 1998, Berkeley, Calif.: Osborne/McGraw-Hill. 124–125.

[143] McLaughlin, M., *Achieving a Multidatabase Object Transaction Service through an Asynchronous Socket*, in *Computer Science*. 1999, Colorado Technical University: Colorado Springs, Colo.

What is claimed is:

1. A method of managing execution of a distributed transaction that includes one or more transactions, each of said one or more transactions being executed by a respective participant of one or more participants participating in said distributed transaction, the method comprising the steps of:
   a first participant receiving from a coordinator of said distributed transaction a request for a vote of whether to commit said distributed transaction, said first participant executing a first transaction of said one or more transactions;
   in response to receiving said request for a vote, said first participant transmitting to said coordinator a message specifying that said first participant votes to commit;
   after said first participant transmitting to said coordinator a message specifying that said participant votes to commit, said first participant receiving from said coordinator a request to commit the first transaction;
   in response to receiving said request to commit and before said first participant commits said first transaction, said first participant transmitting a request to said coordinator for said coordinator to acknowledge that said coordinator has committed said distributed transaction; and
   if said coordinator acknowledges that said coordinator has committed said distributed transaction, then said first participant committing said first transaction.

2. The method of claim 1, wherein said coordinator commits said distributed transaction when each participant of said one or more participants acknowledges that the respective transaction of said each participant will be committed by said each participant.

3. The method of claim 1, wherein said coordinator and said first participant cooperate to execute the distributed transaction by transmitting messages to each other over a network.

4. The method of claim 3, wherein the step of said first participant receiving a request to commit a first transaction includes receiving a request transmitted over said network to said first participant.

5. The method of claim 4, wherein said network is the Internet.

6. The method of claim 3, wherein said first participant receives said request as a message transmitted over a network using a stateless protocol.

7. The method of claim 6, wherein said stateless protocol is HTTP or HTTPS.

8. The method of claim 1, further including the step of said first participant aborting said first transaction when said coordinator has not acknowledged committing said distributed transaction.

9. The method of claim 1, wherein:
   said first transaction includes a first modification to an object;
   the method includes said first participant receiving a request to execute a second transaction, wherein said second transaction includes a second modification of said object;
   said first participant determining whether said first transaction satisfies termination criteria before allowing said second modification to said object.

10. The method of claim 9, wherein said termination criteria includes one or more criteria for aborting said first transaction that are based on a transaction quantum value that indicates a period of time between transmitting a message to said first participant and receiving an acknowledgement that said request has been processed;
   wherein the step of determining whether said first transaction satisfies termination criteria includes determining whether said first transaction satisfies said one or more criteria; and
   if said first transaction satisfies said one or more criteria, then aborting said first transaction.

11. The method of claim 9, wherein:
   said object is a database table associated with a trigger executed before modifying a row on said database table; and
   the step of determining is performed while executing said database trigger.

12. A method of managing the execution of a distributed transaction that includes one or more transactions, each of said one or more transactions being executed by a respective participant of a plurality of participants participating in said distributed transaction, the method comprising the steps of:
   a coordinator of said distributed transaction transmitting to a first participant a request for a vote of whether to commit said distributed transaction, said first participant executing a first transaction of said one or more transactions;
   said coordinator receiving from said first participant, as a response to said request for a vote, a message that specifies that said first participant votes to commit;

after said coordinator receiving from said first participant a message that specifies that said first participant votes to commit:
said coordinator transmitting to said first participant a first request to commit said first transaction,
said coordinator transmitting to a second participant in said distributed transaction a second request to commit a second transaction of said one or more transactions;
wherein said coordinator transmits said first request and said second request via a network using a stateless protocol;
after said coordinator transmits said first request and said second request, said coordinator committing said distributed transaction;
after said coordinator committing said distributed transaction, said coordinator receives a request from said first participant to acknowledge whether said coordinator has committed said distributed transaction;
in response to said coordinator receiving a request from said first participant to acknowledge whether said coordinator has committed said distributed transaction, said coordinator transmitting a message to said first participant to indicate that said coordinator has committed the distributed transaction; and
said coordinator transmitting a message to said second participant to indicate that said coordinator has committed the distributed transaction.

13. The method of claim 12, wherein:
the method further includes the step of determining that said first participant and said second participant are commencing committing of said first transaction and said second transaction respectively; and
the step of said coordinator committing said distributed transaction occurs in response to said coordinator determining that said first participant and said second participant are commencing committing of said first transaction and said second transaction respectively.

14. The method of claim 13, wherein the step of determining that said first participant and said second participant are commencing is performed by determining that:
said first participant has acknowledged receiving said first request, and
said second participant has acknowledged receiving said second request.

15. A computer-readable storage medium carrying one or more sequences of instructions for managing execution of a distributed transaction that includes one or more transactions, each of said one or more transactions being executed by a respective participant of one or more participants participating in said distributed transaction, wherein execution of the one or more sequences of instructions by one or more processors causes the one or more processors to perform the steps of:
a first participant receiving from a coordinator of said distributed transaction a request for a vote of whether to commit said distributed transaction, said first participant executing a first transaction of said one or more transactions;
in response to receiving said request for a vote, said first participant transmitting to said coordinator a message specifying that said first participant votes to commit;
after said first participant transmitting to said coordinator a message specifying that said participant votes to commit, said first participant receiving from said coordinator a request to commit the first transaction;
in response to receiving said request to commit and before said first participant commits said first transaction, said first participant transmitting a request to said coordinator for said coordinator to acknowledge that said coordinator has committed said distributed transaction; and
if said coordinator acknowledges that said coordinator has committed said distributed transaction, then said first participant committing said first transaction.

16. A computer-readable storage medium carrying one or more sequences of instructions for managing the execution of a distributed transaction that includes one or more transactions, each of said one or more transactions being executed by a respective participant of a plurality of participants participating in said distributed transaction, wherein execution of the one or more sequences of instructions by one or more processors causes the one or more processors to perform the steps of:
a coordinator of said distributed transaction transmitting to a first participant a request for a vote of whether to commit said distributed transaction, said first participant executing a first transaction of said one or more transactions;
said coordinator receiving from said first participant, as a response to said request for a vote, a message that specifies that said first participant votes to commit;
after said coordinator receiving from said first participant a message that specifies that said first participant votes to commit:
said coordinator transmitting to said first participant a first request to commit said first transaction,
said coordinator transmitting to a second participant in said distributed transaction a second request to commit a second transaction of said one or more transactions;
wherein said coordinator transmits said first request and said second request via a network using a stateless protocol;
after said coordinator transmits said first request and said second request, said coordinator committing said distributed transaction;
after said coordinator committing said distributed transaction, said coordinator receives a request from said first participant to acknowledge whether said coordinator has committed said distributed transaction;
in response to said coordinator receiving a request from said first participant to acknowledge whether said coordinator has committed said distributed transaction, said coordinator transmitting a message to said first participant to indicate that said coordinator has committed the distributed transaction; and
said coordinator transmitting a message to said second participant to indicate that said coordinator has committed the distributed transaction.

17. The computer-readable storage medium of claim 15, wherein said coordinator commits said distributed transaction when each participant of said one or more participants acknowledges that the respective transaction of said each participant will be committed by said each participant.

18. The computer-readable storage medium of claim 15, wherein said coordinator and said first participant cooperate to execute the distributed transaction by transmitting messages to each other over a network.

19. The computer-readable storage medium of claim 18, wherein the step of said first participant receiving a request to commit a first transaction includes receiving a request transmitted over said network to said first participant.

20. The computer-readable storage medium of claim 19, wherein said network is the Internet.

21. The computer-readable storage medium of claim 18, wherein said first participant receives said request as a message transmitted over a network using a stateless protocol.

22. The computer-readable storage medium of claim 21, wherein said stateless protocol is HTTP or HTTPS.

23. The computer-readable storage medium of claim 15, further including the step of said first participant aborting said first transaction when said coordinator has not acknowledged committing said distributed transaction.

24. The computer-readable storage medium of claim 15, wherein:
- said first transaction includes a first modification to an object;
- the steps include said first participant receiving a request to execute a second transaction, wherein said second transaction includes a second modification of said object;
- said first participant determining whether said first transaction satisfies termination criteria before allowing said second modification to said object.

25. The computer-readable storage medium of claim 24, wherein said termination criteria includes one or more criteria for aborting said first transaction that are based on a transaction quantum value that indicates a period of time between transmitting a message to said first participant and receiving an acknowledgement that said request has been processed;
- wherein the step of determining whether said first transaction satisfies termination criteria includes determining whether said first transaction satisfies said one or more criteria; and
- if said first transaction satisfies said one or more criteria, then aborting said first transaction.

26. The computer-readable storage medium of claim 24, wherein:
- said object is a database table associated with a trigger executed before modifying a row on said database table; and
- the step of determining is performed while executing said database trigger.

27. The computer-readable storage medium of claim 16, wherein:
- the steps include the step of determining that said first participant and said second participant are commencing committing of said first transaction and said second transaction respectively; and
- the step of said coordinator committing said distributed transaction occurs in response to said coordinator determining that said first participant and said second participant are commencing committing of said first transaction and said second transaction respectively.

28. The computer-readable storage medium of claim 27, wherein the step of determining that said first participant and said second participant are commencing is performed by determining that:
- said first participant has acknowledged receiving said first request, and
- said second participant has acknowledged receiving said second request.

\* \* \* \* \*